(12) United States Patent
Kodenkandath et al.

(10) Patent No.: US 11,664,498 B2
(45) Date of Patent: May 30, 2023

(54) COMPOSITIONALLY GRADIENT NICKEL-RICH CATHODE MATERIALS AND METHODS FOR THE MANUFACTURE THEREOF

(71) Applicant: Hazen Research, Inc., Golden, CO (US)

(72) Inventors: Thomas A. Kodenkandath, Highlands Ranch, CO (US); Steve D. Will, Golden, CO (US)

(73) Assignee: Hazen Research Inc., Golden, CO (US)

( * ) Notice: Subject to any disclaimer, the term of this patent is extended or adjusted under 35 U.S.C. 154(b) by 443 days.

(21) Appl. No.: 16/876,922

(22) Filed: May 18, 2020

(65) Prior Publication Data

US 2020/0365890 A1 Nov. 19, 2020

Related U.S. Application Data

(60) Provisional application No. 62/849,832, filed on May 17, 2019.

(51) Int. Cl.
*H01M 4/505* (2010.01)
*H01M 4/525* (2010.01)
*H01M 10/0525* (2010.01)
*H01M 4/02* (2006.01)

(52) U.S. Cl.
CPC .......... *H01M 4/505* (2013.01); *H01M 4/525* (2013.01); *H01M 10/0525* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 8,277,683 B2 | 10/2012 | Deng et al. | |
| 8,354,191 B2 | 1/2013 | Shizuka et al. | |
| 9,136,534 B2 | 9/2015 | Frianeza-Kullberg | |
| 2007/0202405 A1 | 8/2007 | Shizuka et al. | |
| 2014/0328729 A1 | 11/2014 | Chen | |
| 2017/0054146 A1 | 2/2017 | Frianeza-Kullberg et al. | |

OTHER PUBLICATIONS

Y.-K Sun, S.-T. Myung, B.-C. Park, J. Prakash, I. Belharouak, K. Amine. High-energy cathode material for long-life and safe lithium batteries, Nature Materials, vol. 8, Apr. 2009, 320-324.*

Y.-K Sun, B.-R. Lee, H.-J. Noh, H. Wu, S.-T. Myung, K. Amine. A novel concentration-gradient Li[Ni0.83Co0.07Mn0.10]O2 cathode material for high-energy lithium-ion batteries, J. Mater. Chem., 2011, 21, 10108-10112.*

(Continued)

*Primary Examiner* — Carlos Barcena
(74) *Attorney, Agent, or Firm* — Sheridan Ross P.C.

(57) ABSTRACT

The present invention relates to lithium rechargeable battery cathode materials. More specifically, the cathode materials are compositionally gradient nickel-rich cathode materials produced using single-source composite precursor materials containing inorganic and/or metalorganic salts of lithium, nickel, manganese, and cobalt. Methods and systems for manufacturing the cathode materials by a combined spray pyrolysis/fluidized bed process are also disclosed.

11 Claims, 48 Drawing Sheets

(56) References Cited

OTHER PUBLICATIONS

C. Hua, K. Du, C. Tan, Z. Peng, Y. Cao, G. Hu. Study of full concentration-gradient Li(Ni0.8Co0.1Mn0.1)O2 cathode material for lithium ion batteries, Journal of Alloys and Compounds 614 (2014) 264-270.*

Y. Sun, Z. Zhang, H. Li, T. Yang, H. Zhang, X. Shi, D. Song, L. Zhang. Influence of Ni/Mn distributions on the structure and electrochemical properties of Ni-rich cathode materials, Dalton Trans., 2018, 47, 16651-16659.*

Lin et al. "Metal Segregation in Hierarchically Structured Cathode Materials for High-Energy Lithium Batteries," Nature Energy, 2016, vol. 1, No. 1, Article 15004.

International Search Report and Written Opinion for International (PCT) Patent Application No. PCT/US20/33193, dated Oct. 6, 2020 17 pages.

\* cited by examiner

COMPOSITIONALLY GRADIENT NICKEL-RICH CATHODE MATERIALS AND METHODS FOR THE MANUFACTURE THEREOF

CROSS-REFERENCE TO RELATED APPLICATION

This application claims the benefit of priority of U.S. Provisional Patent Application 62/849,832, filed 17 May 2019, the entirety of which is incorporated herein by reference.

STATEMENT REGARDING FEDERALLY SPONSORED RESEARCH

This invention was made with government support under Grant No. DE-SC0017765 awarded by the United States Department of Energy. The government has certain rights in the invention.

FIELD OF THE INVENTION

The present invention relates to lithium ion battery (LiB) cathode materials, and more specifically to compositionally gradient nickel-rich cathode materials and methods and systems for manufacturing the same by a combined spray pyrolysis/fluidized bed reaction process using single-source composite precursor materials comprising inorganic and/or metalorganic salts of lithium, nickel, manganese, and cobalt.

BACKGROUND OF THE INVENTION

Next-generation cathodes for LiBs are often made from nickel-rich materials, and in particular lithium nickel-manganese-cobalt (NMC) oxides, which have the generalized stoichiometry $Li(Ni_{1-(x+y)}Mn_xCo_y)O_2$. In one of the most common types of process for making LiB cathodes, the NMC material is synthesized as a powder, which is then mixed with appropriate solvents to form a mixture that can be cast and heated and/or dried to form the cathode layer. The synthesis of NMC cathode powders by conventional methods generally involves five steps: (1) mixing nickel-manganese-cobalt components, without lithium, in solution; (2) precipitation of nickel-manganese-cobalt components as hydroxides using sodium and ammonium hydroxides; (3) washing of the hydroxide precursor powders to eliminate sodium contamination; (4) reaction with a lithium component to form the NMC cathode powders; and (5) washing of the NMC cathode powders to eliminate any residual lithium impurities. Cathodes comprising NMC materials made by these and similar methods generally exhibit desirable electrochemical performance characteristics, including initial capacity, voltage stability, energy density, coulombic efficiency, and capacity retention.

Conventional methods for synthesizing NMC powders, particularly high-performance and/or especially nickel-rich NMC powders, suffer from several drawbacks. Such processes are frequently highly complex, requiring many steps and significant investments of time, energy, and/or costly labor and materials, especially in the case where precise control over the compositional gradient (i.e. spatial variation of the composition of the powder within a particle or agglomerate) is desired. These conventional methods are also generally practicable only as batch, rather than continuous, processes, limiting throughput and increasing the time and difficulty required to increase or decrease production, and produce significant quantities of chemical waste that must be subsequently remediated. Moreover, the NMC powders thus produced are often difficult to store and/or work with; they may be difficult to pour, further limiting their applicability to a continuous cathode manufacturing process, and often have particle sizes and shapes that make the powder prone to aerosolizing and/or "dusting" the manufacturing space or equipment therein. Previous attempts to address these drawbacks have generally resulted in the production of NMC powders that exhibit inferior performance when incorporated into cathodes.

There is thus a need in the art for low-cost, high-throughput, continuous processes for producing high-performance nickel-rich NMC cathode materials for LiBs. It is further advantageous for such methods to allow precise control over the compositional gradient of the NMC material, and for the NMC materials produced by such processes to be free-flowing and non-dusting.

SUMMARY OF THE INVENTION

It is one aspect of the present invention to provide a method for synthesizing a lithium nickel-manganese-cobalt oxide (NMC) powder having a layered structure, comprising (a) spray-pyrolyzing a mixture comprising at least one lithium salt, at least one nickel salt, at least one manganese salt, and at least one cobalt salt at a temperature of less than about 750° C. to form a powder, wherein a ratio of a molar concentration of lithium in the mixture to a combined molar concentration of nickel, manganese, and cobalt in the mixture is between about 0.9 and about 1.1; and (b) reacting the powder in a fluidized bed reactor at a temperature of less than about 1,000° C.

In embodiments, the NMC powder may comprise a substantially spherical secondary particle having a surface texture composed of primary particles, wherein a concentration of nickel in the primary particle decreases with increasing distance from a center of the primary particle and a concentration of manganese in the primary particle increases with increasing distance from the center of the primary particle.

In embodiments, the mixture may comprise at least one inorganic salt and at least one metalorganic salt.

In embodiments, a molar concentration of manganese in the mixture and a molar concentration of cobalt in the mixture may be approximately equal, and a ratio of a molar concentration of nickel in the mixture to the sum of the molar concentrations of manganese and cobalt in the mixture may be between about 0.5 and about 4.

In embodiments, the mixture of salts may be defined by at least one condition selected from the group consisting of (i) the at least one lithium salt comprises at least one selected from the group consisting of lithium carboxylate, fluorinated lithium carboxylate, lithium nitrate, and another water-soluble lithium salt; (ii) the at least one nickel salt comprises at least one selected from the group consisting of nickel carboxylate, fluorinated nickel carboxylate, nickel nitrate, and another water-soluble nickel salt; (iii) the at least one manganese salt comprises at least one selected from the group consisting of manganese carboxylate, fluorinated manganese carboxylate, manganese nitrate, manganese propionate, manganese trifluoroacetate, and another water-soluble manganese salt; and (iv) the at least one cobalt salt comprises at least one selected from the group consisting of cobalt carboxylate, fluorinated cobalt carboxylate, cobalt nitrate, and another water-soluble cobalt salt.

In embodiments, the temperature in step (a) may be at least about 500° C.

In embodiments, the temperature in step (b) may be about 875° C.

In embodiments, step (b) may be conducted for no more than about five hours.

In embodiments, at least one of steps (a) and (b) may be carried out under an atmosphere comprising at least one gas selected from the group consisting of air, oxygen gas ($O_2$), and combinations and mixtures thereof.

It is another aspect of the present invention to provide a lithium nickel-manganese-cobalt oxide (NMC) powder, comprising a substantially spherical secondary particle having a surface texture composed of primary particles, wherein a concentration of nickel in the primary particle decreases with increasing distance from a center of the primary particle and a concentration of manganese in the primary particle increases with increasing distance from the center of the primary particle.

In embodiments, the NMC powder may be made by the method comprising (a) spray-pyrolyzing a mixture comprising at least one lithium salt, at least one nickel salt, at least one manganese salt, and at least one cobalt salt at a temperature of less than about 750° C. to form a powder, wherein a ratio of a molar concentration of lithium in the mixture to a combined molar concentration of nickel, manganese, and cobalt in the mixture is between about 0.9 and about 1.1; and (b) reacting the powder in a fluidized bed reactor at a temperature of less than about 1,000° C. At least one of steps (a) and (b) may, but need not, be carried out under an atmosphere comprising at least one gas selected from the group consisting of air, oxygen gas ($O_2$), and combinations and mixtures thereof.

In embodiments, a molar concentration of manganese in the primary particle and a molar concentration of cobalt in the primary particle may be approximately equal, and a ratio of a molar concentration of nickel in the primary particle to the sum of the molar concentrations of manganese and cobalt in the particle may be between about 0.5 and about 4.

In embodiments, the primary particle may comprise a core, an intermediate layer, and a surface layer, and at least one of the following may be true: (i) a Li:Ni:Mn:Co molar ratio in the core is approximately 10:8:1:1; (ii) a Li:Ni:Mn:Co molar ratio in the intermediate layer is approximately 10:6:2:2; and (iii) a Li:Ni:Mn:Co molar ratio in the surface layer is approximately 10:5:3:2.

In embodiments, the NMC powder may have a primary or secondary particle size between about 10 µm and about 20 µm.

It is another aspect of the present invention to provide a free-flowing, non-dusting lithium nickel-manganese-cobalt oxide (NMC) powder, comprising an agglomerate of NMC particles, the agglomerate having a size of less than about 300 µm.

In embodiments, the NMC particles may comprise a substantially spherical particle having a surface texture composed of fine crystallites, wherein a concentration of nickel in the substantially spherical particle decreases with increasing distance from a center of the particle and concentrations of manganese and cobalt in the particle increase with increasing distance from the center of the particle. A molar concentration of manganese in the substantially spherical particle and a molar concentration of cobalt in the substantially spherical particle may be approximately equal, and a ratio of a molar concentration of nickel in the substantially spherical particle to the sum of the molar concentrations of manganese and cobalt in the substantially spherical particle may be between about 0.5 and about 4. The substantially spherical particle may comprise a core, an intermediate layer, and a surface layer, and at least one of the following may be true: (i) a Li:Ni:Mn:Co molar ratio in the core is approximately 10:8:1:1; (ii) a Li:Ni:Mn:Co molar ratio in the intermediate layer is approximately 10:6:2:2; and (iii) a Li:Ni:Mn:Co molar ratio in the surface layer is approximately 10:5:3:2.

In embodiments, the NMC powder may be made by the method comprising (a) spray-pyrolyzing a mixture comprising at least one lithium salt, at least one nickel salt, at least one manganese salt, and at least one cobalt salt at a temperature of less than about 750° C. to form a powder, wherein a ratio of a molar concentration of lithium in the mixture to a combined molar concentration of nickel, manganese, and cobalt in the mixture is between about 0.9 and about 1.1; and (b) reacting the powder in a fluidized bed reactor at a temperature of less than about 1,000° C. In embodiments, the mixture of salts may be defined by at least one condition selected from the group consisting of (i) the at least one lithium salt comprises at least one selected from the group consisting of lithium carboxylate, fluorinated lithium carboxylate, lithium nitrate, and another water-soluble lithium salt; (ii) the at least one nickel salt comprises at least one selected from the group consisting of nickel carboxylate, fluorinated nickel carboxylate, nickel nitrate, and another water-soluble nickel salt; (iii) the at least one manganese salt comprises at least one selected from the group consisting of manganese carboxylate, fluorinated manganese carboxylate, manganese nitrate, manganese propionate, manganese trifluoroacetate, and another water-soluble manganese salt; and (iv) the at least one cobalt salt comprises at least one selected from the group consisting of cobalt carboxylate, fluorinated cobalt carboxylate, cobalt nitrate, and another water-soluble cobalt salt. At least one of steps (a) and (b) may, but need not, be carried out under an atmosphere comprising at least one gas selected from the group consisting of air, oxygen gas ($O_2$), and combinations and mixtures thereof.

In embodiments, the agglomerate may break into substantially spherical particles having a particle size of no more than about 5 µm upon deagglomeration.

The advantages of the present invention will be apparent from the disclosure contained herein.

As used herein, the term "NAC ABC," where A, B, and C are numbers, refers to a lithium nickel-aluminum-cobalt (NAC) powder, or precursors for making an NAC powder, having an Ni:Al:Co stoichiometric ratio of A:B:C. For example, "NAC 622" refers to an NAC powder having an Ni:Al:Co stoichiometric ratio of 6:2:2 (or, equivalently, 3:1:1), and "NAC 811" refers to an NAC powder having an Ni:Al:Co stoichiometric ratio of 8:1:1.

As used herein, the term "NMC ABC," where A, B, and C are numbers, refers to an NMC powder, or precursors for making an NMC powder, having an Ni:Mn:Co stoichiometric ratio of A:B:C. For example, "NMC 622" refers to an NMC powder having an Ni:Mn:Co stoichiometric ratio of 6:2:2 (or, equivalently, 3:1:1), and "NMC 811" refers to an NMC powder having an Ni:Mn:Co stoichiometric ratio of 8:1:1.

As used herein, unless otherwise specified, the terms "about," "approximately," etc., when used in relation to numerical limitations or ranges, mean that the recited limitation or range may vary by up to 10%. By way of non-limiting example, "about 750" can mean as little as 675 or as much as 825, or any value therebetween. When used in relation to ratios or relationships between two or more numerical limitations or ranges, the terms "about," approximately," etc. mean that each of the limitations or ranges may vary by up to about 10%; by way of non-limiting example, a statement that two quantities are "approximately equal" can mean that a ratio between the two quantities is as little as 0.9:1.1 or as much as 1.1:0.9 (or any value therebetween), and a statement that a four-way ratio is "about 5:3:1:1" can mean that the first number in the ratio can be any value between 4.5 and 5.5, the second number in the ratio can be any value between 2.7 and 3.3, and so on.

As used herein, "at least one," "one or more," and "and/or" are open-ended expressions that are both conjunctive and disjunctive in operation. For example, each of the expressions "at least one of A, B, and C," "at least one of A, B, or C," one or more of A, B, and C," "one or more of A, B, or C," and "A, B, and/or C" means A alone, B alone, C alone, A and B together, A and C together, B and C together, or A, B, and C together.

It is to be noted that the term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The embodiments and configurations described herein are neither complete nor exhaustive. As will be appreciated, other embodiments of the invention are possible utilizing, alone or in combination, one or more of the features set forth above or described in detail below.

DETAILED DESCRIPTION OF THE INVENTION

Figure 1:
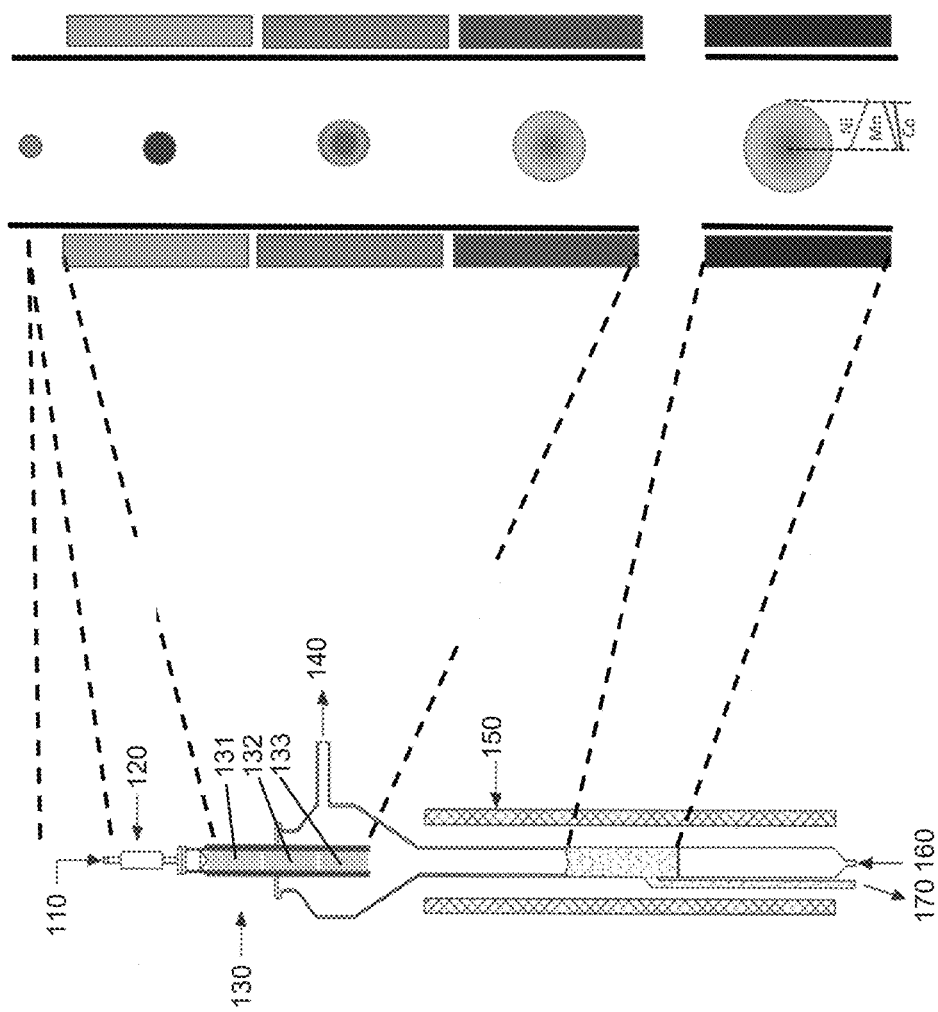
FIG. 1 is a schematic of a spray pyrolysis/fluidized bed reaction process for producing a nickel-rich NMC powder from inorganic-metalorganic precursors, according to embodiments of the present invention.

Unless defined otherwise, all technical and scientific terms used herein have the same meaning as is commonly understood by one of ordinary skill in the art. All patents, applications, published applications, and other publications to which reference is made herein are incorporated by reference in their entirety. In the event that there is a plurality of definitions for a term herein, the definition provided in the Summary of the Invention prevails unless otherwise stated.

The present inventors have demonstrated a method for the production of advanced LiB cathodes of the type $Li(Ni_{1-(x+y)}Mn_xCo_y)O_2$, wherein x+y<0.4, using single-source inorganic-organic composite precursors in a process comprising spray pyrolysis and a fluidized bed reactors. The single-source inorganic-organic composite precursors, which have not been previously described in the literature or prior art, were developed as part of the inventive work and are within the scope of the present invention.

The single source inorganic-metalorganic composite precursors and the combined spray pyrolysis/fluidized bed reaction process developed by the present inventors produced layered nickel-rich NMC cathode materials having spatial variation in their chemical compositions, wherein particles of the NMC cathode materials generally had a nickel-rich core and a manganese-rich surface. Using nitrate, acetate, propionate (OPr) and trifluoroacetate (TFA) salts of lithium, nickel, manganese, and cobalt, powders having a stoichiometry of the general form $Li(Ni_{1-(x+y)}Mn_xCo_y)O_2$, wherein x+y<0.4, were produced.

As described in further detail throughout this Detailed Description, and particularly in the Examples, the present inventors have built and operated a combined vertical spray pyrolysis/fluidized bed reactor apparatus. Spray pyrolysis at temperatures between about 500 and about 750° C. produced amorphous particles, which upon reaction in a fluidized bed at temperatures between about 750 and about 1000° C. produced substantially spherical, free-flowing, non-dusting soft agglomerates of well-crystallized, layered, nickel-rich NMC particles. These soft agglomerates, which were less than about 250 to about 300 μm in size, easily disintegrated into smaller particles of about 4 to about 6 μm or less upon sonication or when mixed with a solvent for casting as cathodes. The cathode materials and cathodes made therefrom were evaluated electrochemically and showed acceptable electrochemical performance, having initial capacities of more than about 150 to about 250 mAh/g, voltage stabilities between about 2.5 V and about 5.0 V and preferably between about 3.0 V and about 4.5 V, energy densities of more than about 750 to about 850 Wh/kg, coulombic efficiencies of more than about 85% to about 95%, and capacity retentions of about 65% to about 75% over 100 cycles.

Table 1 illustrates compositions of various precursors suitable for use in the present invention, and their thermal decomposition and reaction pathways to form compositionally gradient nickel-rich NMC cathode powders.

TABLE 1

| | Precursor compositions | | | |
|---|---|---|---|---|
| | | | Fluidized bed reactor product | |
| | Spray pyrolysis decomposition | | Particle layer | |
| Precursor components | Temp, ° C. (approx.) | Product | Ni:Mn:Co ratio Formula | Battery property |
| $LiNO_3$ | 150-450 | $Li_2O$ | Core | Capacity Cost |
| $Ni(NO_3)_2 \cdot 6\ H_2O$ | 260 | NiO | 8:1:1 | |
| $Mn(NO_3)_2 \cdot 6\ H_2O$ | 250 | $Mn_2O_3$ | $Li(Ni_{0.8}Mn_{0.1}Co_{0.1})O_2$ | |
| $Co(NO_3)_2 \cdot 6\ H_2O$ | 270 | $Co_3O_4$ | | |
| $Li(COOCH_3)_2 \cdot 2\ H_2O$ | 470 | $Li_2O$ | Intermediate layer | |
| $Ni(COOC_2H_5)_2$ | 450 | NiO | 3:1:1 | |
| $Mn(COOC_2H_5)_2$ | 600 | $Mn_2O_3$ | $Li(Ni_{0.6}Mn_{0.2}Co_{0.2})O_2$ | Capacity retention |
| $Co(COOCH_3)_2$ | 350-600 | CoO, $Co_2O_3$ | | |
| $Mn(COOCF_3)_2$ | 500-750 | $MnF_2$, $Mn_2O_3$ | Surface 3:4:3 $Li(Ni_{0.3}Mn_{0.4}Co_{0.3})O_2$ | Thermal stability Cycling |

Referring now to FIG. 1, an embodiment of a combined spray pyrolysis/fluidized bed reaction process for producing nickel-rich NMC cathode powders from inorganic-metalorganic precursors is illustrated (left), as are simplified cross-sections of the particles at each stage therein (right). As illustrated in FIG. 1, a stream 110 of droplets of a combined lithium-nickel-manganese-cobalt precursor are fed to an ultrasonic nozzle 120 at approximately ambient temperatures, i.e. up to about 25° C. The ultrasonic nozzle feeds the precursor droplets to a three-zone electrical resistance heater 130, from which off gases are removed to a filter via outlet 140. In a first zone 131 of the heater 130, having a temperature of between about 225° C. and about 325° C., preferably between about 250° C. and about 300° C., nitrates of lithium, nickel, manganese, and cobalt undergo thermolysis and/or other chemical reactions to form a nickel-rich core of the NMC particle. In a second zone 132 of the heater 130, having a temperature of between about 425° C. and about 525° C., preferably between about 450° C. and about 500° C., carboxylates, acetates, and/or propionates of nickel, manganese, and cobalt undergo thermolysis and/or other chemical reactions to form a gradient layer of the NMC particle, in which the concentration of nickel decreases, and the concentration of manganese increases, with increasing distance from the nickel-rich core. In a third zone 133 of the heater 130, having a temperature of between about 525° C.

and about 825° C., preferably between about 600° C. and about 750° C., carboxylates of nickel and cobalt and manganese trifluoroacetate undergo thermolysis and/or other chemical reactions to form a manganese-rich surface of the NMC particle. The NMC particles thus formed with three layers (nickel-rich core, gradient layer, manganese-rich surface) then exit the heater into a fluidized bed furnace 150, having a temperature of between about 675° C. and about 975° C., preferably between about 750° C. and about 900° C., where they crystallize to form layered nickel-rich NMC particles. A fluidizing gas, which may in embodiments be air, oxygen gas ($O_2$), or a combination or mixture thereof, is provided to the furnace 150 via inlet 160, and the layered nickel-rich NMC particles can be removed from the furnace 150 via product discharge outlet 170.

The atmosphere in the furnace 150 and/or any one or more of the zones 131,132,133 of the heater 130 may be an appropriate oxidizing gas, which may in embodiments be air, oxygen gas ($O_2$), or a combination or mixture thereof. In some embodiments in may be desirable to provide an atmosphere of pure air or pure $O_2$ gas, while in other embodiments it may be desirable to provide an atmosphere of "enriched" air, i.e. air combined or mixed with $O_2$ to increase the oxygen content.

The following disclosed Examples illustrate and describe various embodiments and features of the present invention.

Example 1

Formulation and Characterization of Precursors

The prepared precursor solutions for use in the following Examples contained various combinations of nitrate, acetate, propionate, and TFA salts of lithium, nickel, manganese, and cobalt. High-purity nitrates and acetates of lithium, nickel, manganese, and cobalt, propionic acid, and TFA acid were purchased from commercial sources; the nitrate and acetate salts were used as precursors directly and as sources of cation for the synthesis of other precursors. The precursor solutions contained 0.5, 0.75, and 1.5 M Li, and molar concentrations of the other metals were proportional to their coefficients in the targeted $Li(Ni_{1-(x+y)}Mn_xCo_y)O_2$ stoichiometries. Solutions were prepared targeting Ni:Mn:Co stoichiometric ratios of 2:2:1, 3:1:1, and 8:1:1.

Manganese OPr and manganese TFA were synthesized by reacting the corresponding acetate salts with excess propionic and TFA acids, respectively, under reflux conditions for extended time periods. Typically, 25 g of metal acetate was reacted with a 25% stoichiometric excess of the acid at between about 275° C. and about 300° C. for about 3 hours. The byproduct acetic acid was removed by rotoevaporation, and the products were isolated, cleaned by repeated washing with deionized water, and dried overnight.

Figure 2A:
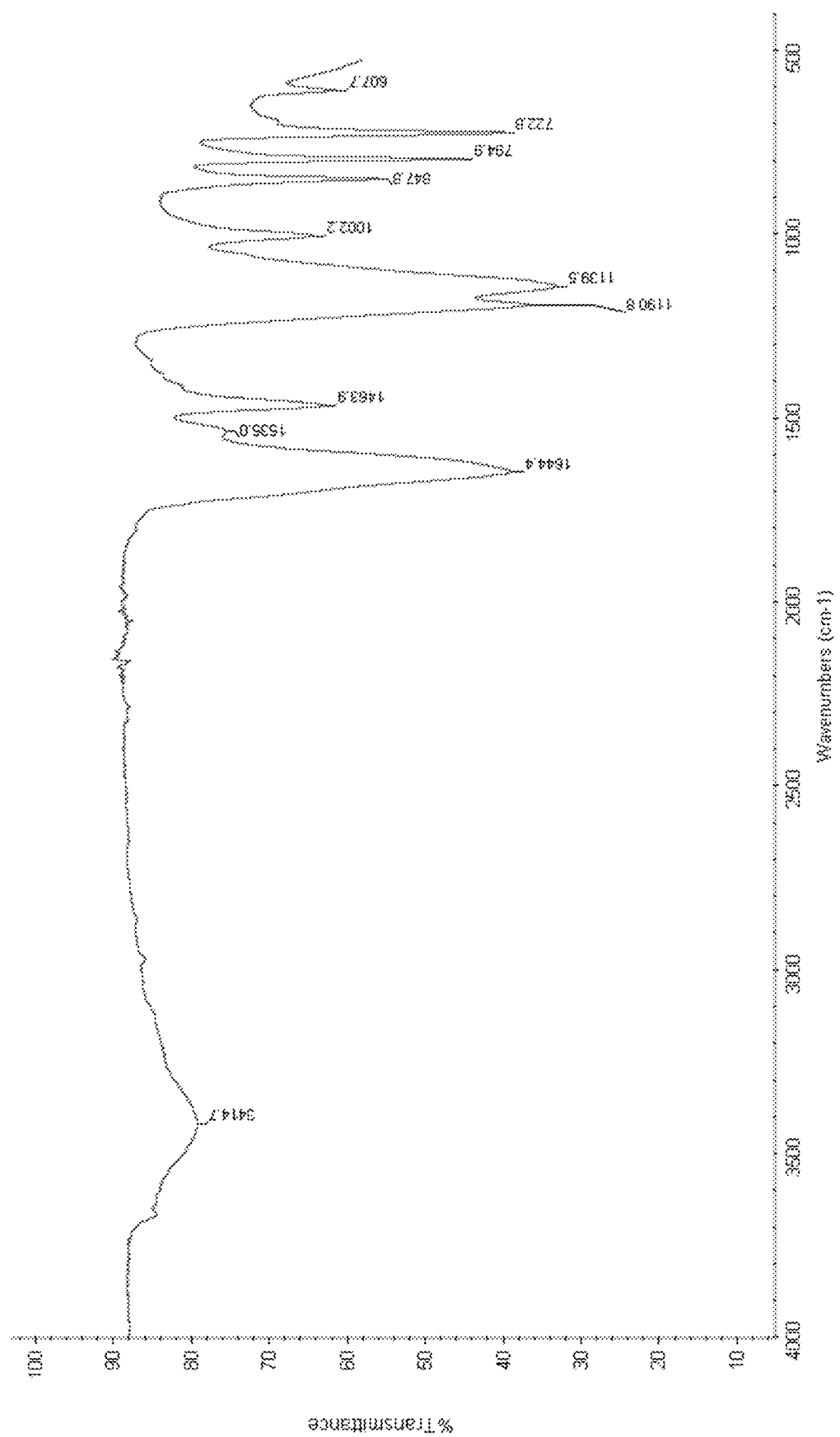
FIG. 2A is a Fourier transform infrared (FTIR) plot of a synthesized manganese propionate, according to embodiments of the present invention.
Figure 2B:
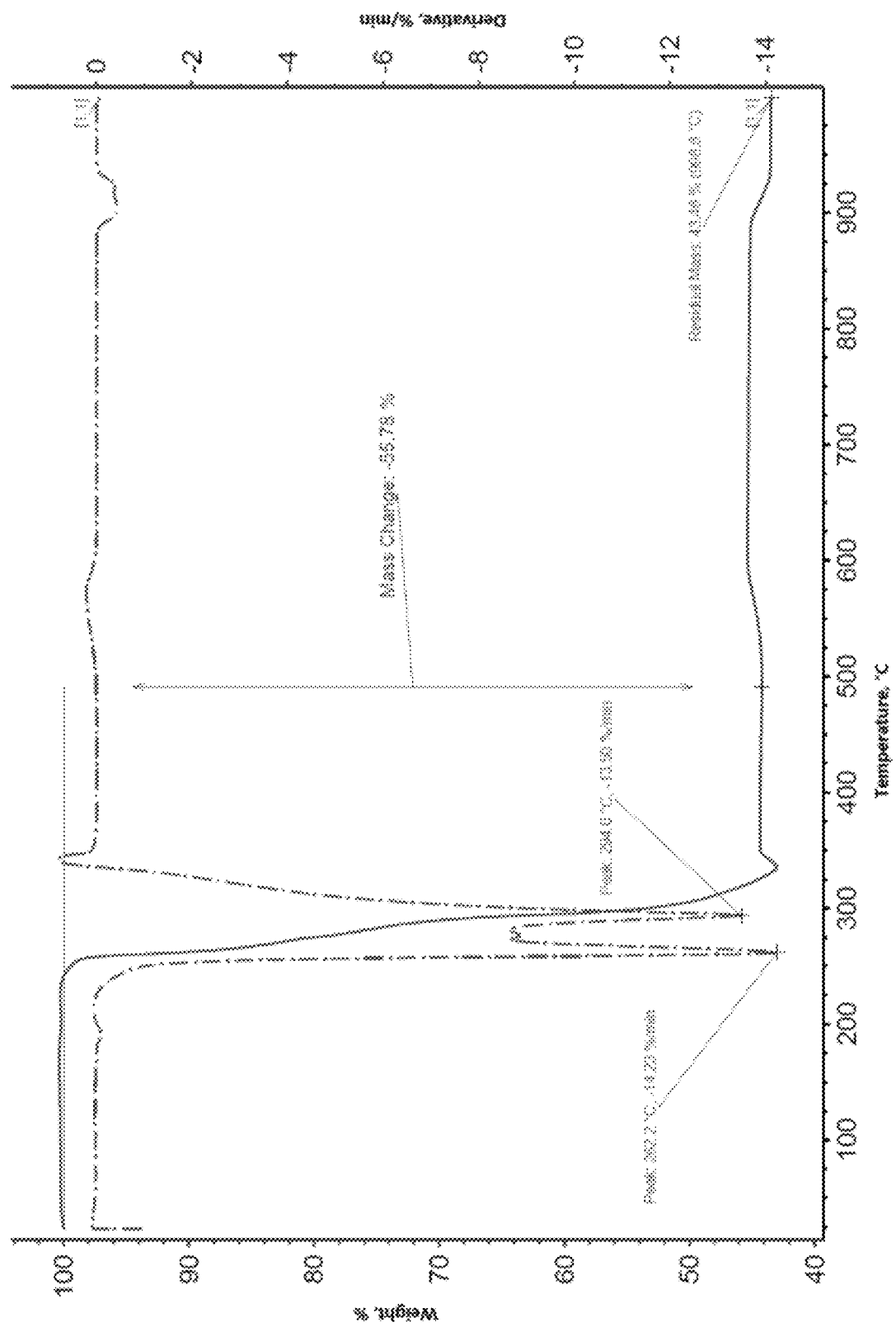
FIG. 2B is a thermogravimetric analysis (TGA) plot of a synthesized manganese propionate, according to embodiments of the present invention.
Figure 2C:
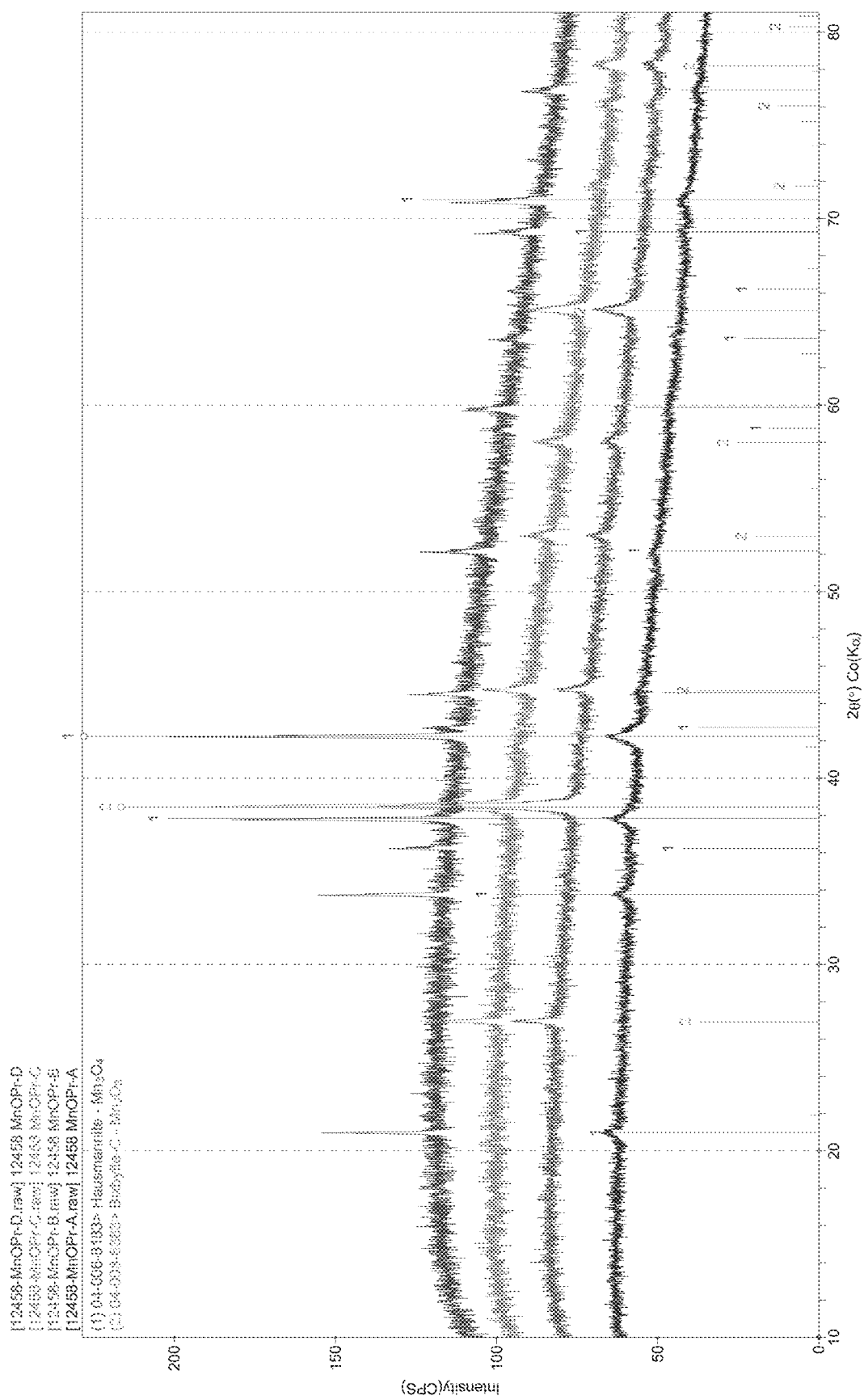
FIG. 2C illustrates x-ray diffraction (XRD) patterns of the thermolysis products of manganese propionate, according to embodiments of the present invention.
Figure 3A:
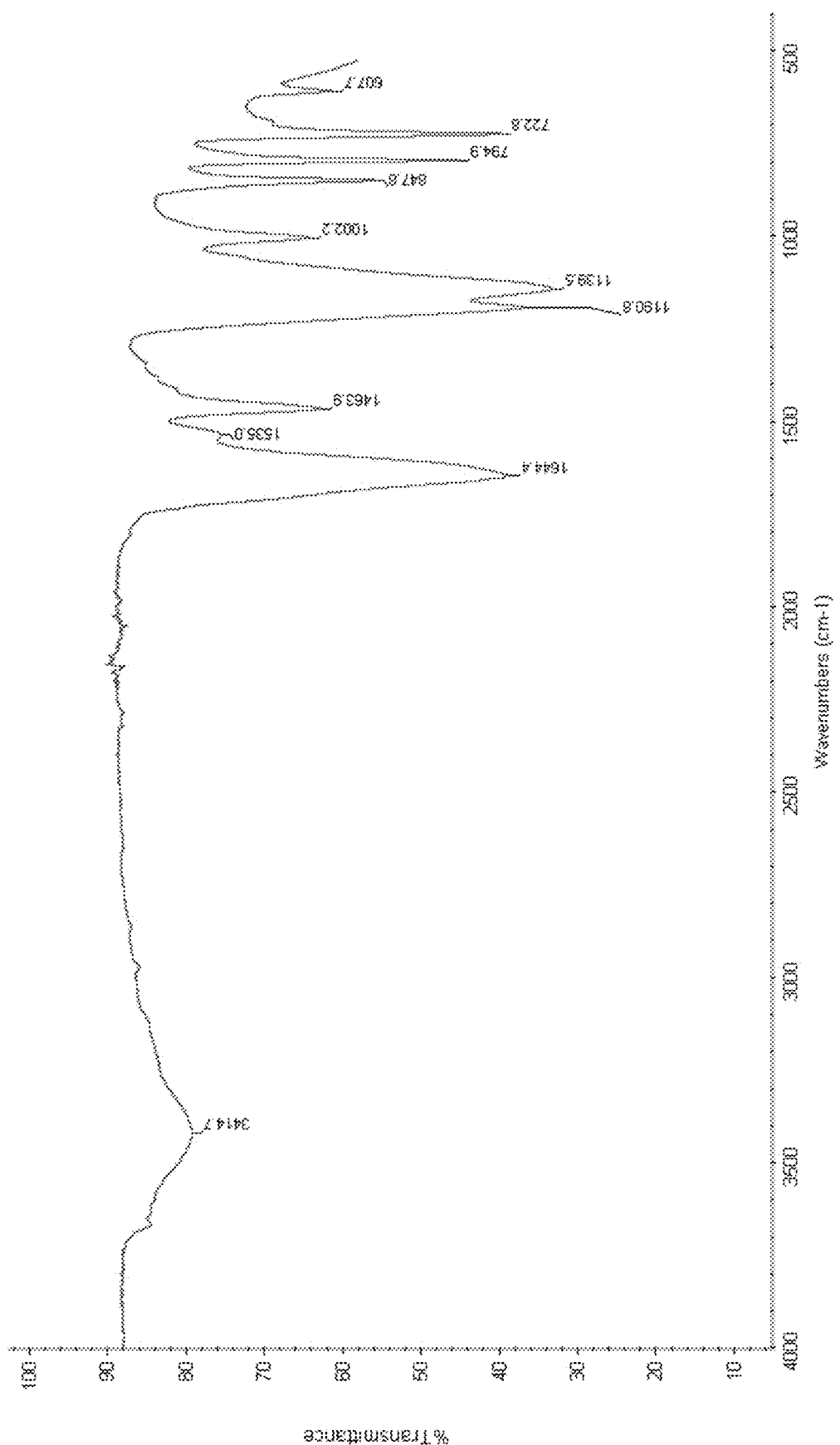
FIG. 3A is an FTIR plot of a synthesized manganese trifluoroacetate, according to embodiments of the present invention.
Figure 3B:
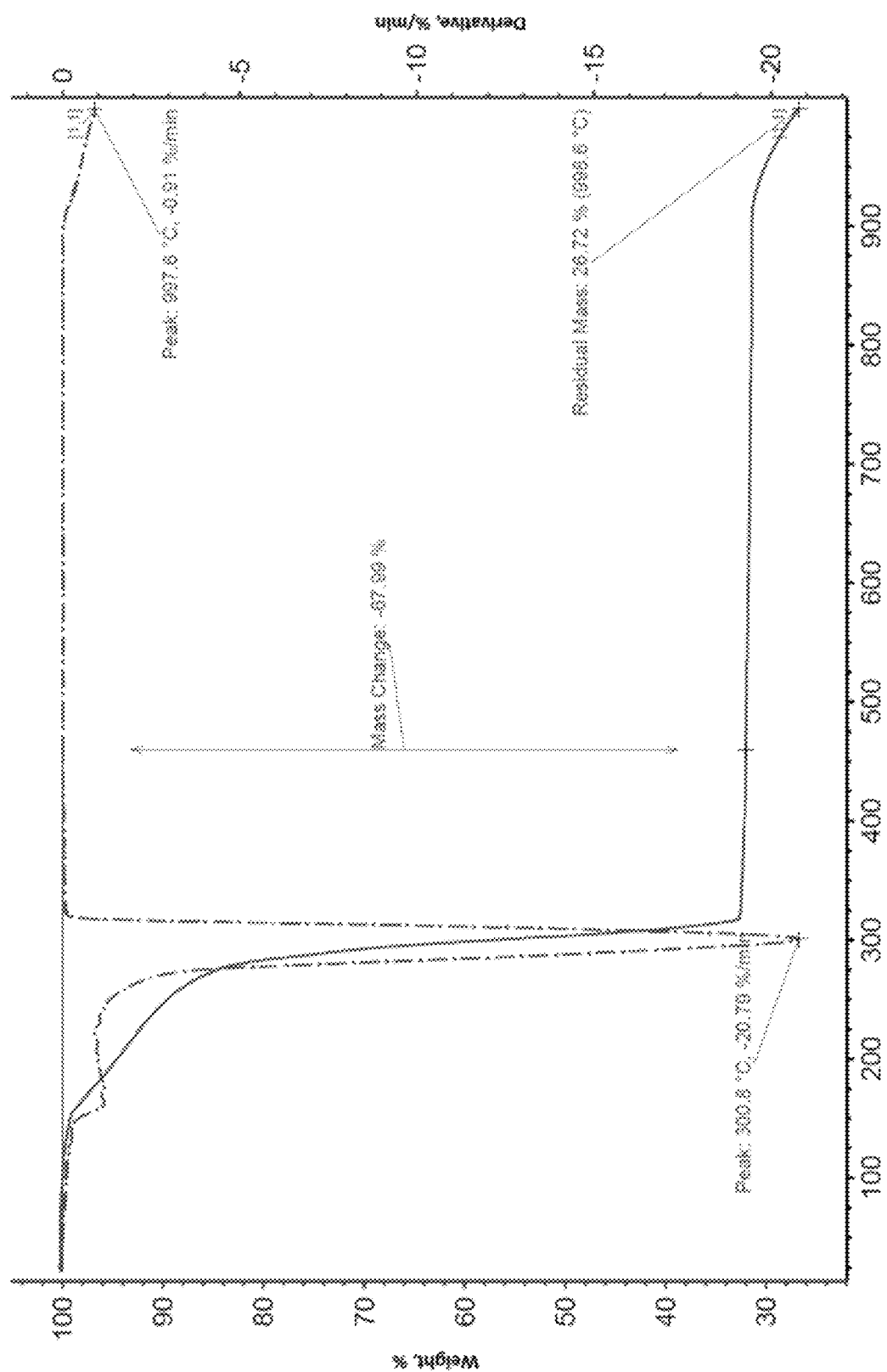
FIG. 3B is a TGA plot of a synthesized manganese trifluoroacetate, according to embodiments of the present invention.
Figure 3C:
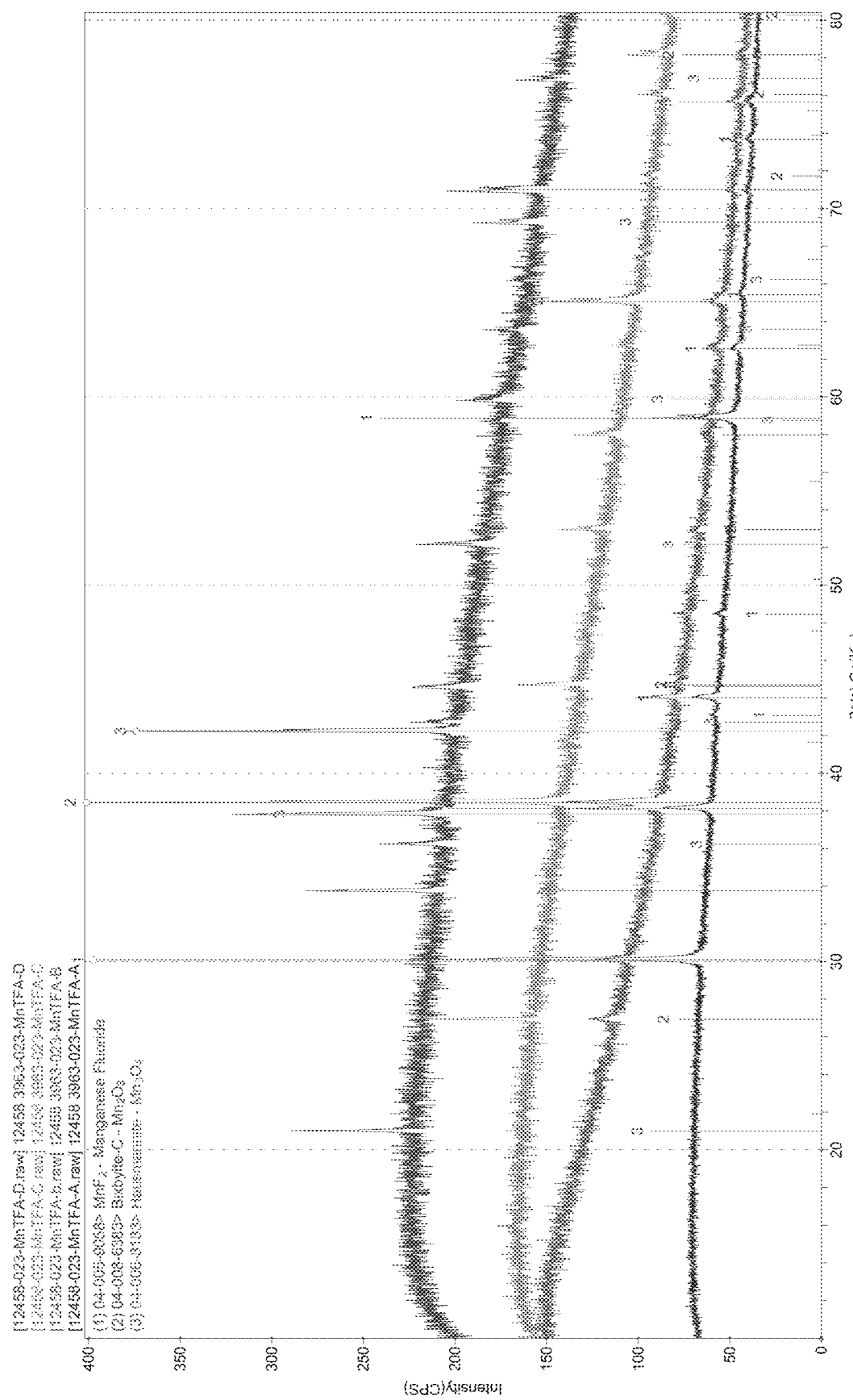
FIG. 3C illustrates XRD patterns of the thermolysis products of manganese trifluoroacetate according to embodiments of the present invention.

Manganese OPr and manganese TFA salts were characterized by thermogravimetric (TGA), x-ray diffraction (XRD), and Fourier transform infrared (FTIR) analyses. FIGS. 2A and 2B are FTIR and TGA plots, respectively, of the synthesized manganese OPr, and FIG. 2C illustrates XRD patterns of manganese OPr and its thermolysis products. FIGS. 3A and 3B are FTIR and TGA plots, respectively, of the synthesized manganese TFA, and FIG. 3C illustrates XRD patterns of manganese TFA and its thermolysis products. The results of thermolysis of the synthesized salts are summarized in Table 2.

TABLE 2

Summary of thermolysis of manganese OPr and manganese TFA

| Reactant | Thermolysis temperature, ° C. | Identified product or reaction |
|---|---|---|
| $Mn(COOC_2H_5)_2$ | 250 | $Mn_3O_4$ (poorly crystallized) |
| $Mn_3O_4$ | 500-750 | $Mn_2O_3$ |
| $Mn_2O_3$ | 1,000 | $Mn_3O_4$ |
| $Mn(COOCF_3) \cdot x\, H_2O$ | 150 | Loss of water of hydration |
| $Mn(COOCF_3)_2$ | 250 | $MnF_2$ |
| $MnF_2$ | 500-750 | $Mn_2O_3$ |
| $Mn_2O_3$ | 1,000 | $Mn_3O_4$ |

Single-source precursors were developed by evaluating the compatibility of various starting nitrate, acetate, OPr, and TFA salts of lithium, nickel, manganese, and cobalt, targeting the stoichiometric ratios identified above; inductively coupled plasma analyses of select precursors were consistent with the targeted stoichiometry. Precursors that showed no precipitation after storage for 1 day at ambient conditions are listed in Table 3.

TABLE 3

Precursors suitable for spray pyrolysis

| Precursor ID | Targeted Ni:Mn:Co stoichiometry | Precursor salts | | | |
|---|---|---|---|---|---|
| | | Li | Ni | Mn | Co |
| PRS010 | 3:1:1 | N | N | A | N |
| PRS011 | 3:1:1 | N | N | P | N |
| PRS012 | 3:1:1 | N | N | T | N |
| PRS017 | 3:1:1 | N | N, A | N, A, T | N |
| PRS018 | 3:1:1 | N | N | A, T | N |
| PRS019 | 3:1:1 | N | N | N | N |
| PRS020 | 3:1:1 | A | N | A | N |
| PRS023 | 3:1:1 | N | A | P | N |
| PRS024 | 3:1:1 | N | N, A | N, P, T | N |
| PRS032 | 8:1:1 | N | N, A | P | N |
| PRS033 | 8:1:1 | N | N, A | N, A, T | N |

A = acetate,
N = nitrate,
P = propionate,
T = trifluoroacetate

Example 2

Spray Pyrolysis in Air and Air Fluidized Bed Reactor Equipment Setup

A BGI Collison nebulizer (Model CN-24) and an air jet were used to generate an aerosol of the precursor materials via a three-jet nebulizer nozzle. The solution of the precursor materials in the nebulizer jar was maintained at a constant level during the operation using a peristaltic pump to meter solution in a timed sequence. The aerosol stream was directed through a narrow-necked, 100 mm diameter, preheated (500-750° C.), 760 mm long quartz tube held vertically over a 110 mm diameter filter. The pyrolyzed particles were collected onto a Whatman grade 41 filter paper held within a Pyrex filter holder. The pressure drop across the filter was manually controlled by a vacuum pump to maintain zero pressure on the nebulizer jar. The particles produced from the spray pyrolysis were submicron in size and thus tended to follow the air stream regardless of the gas velocity. The gases and solids were separated by filtration.

The fluidized bed reactor was constructed from Inconel 600 to resist oxidation and the formation of corrosion products that might contaminate the bed product; the inventors initially found that fluidized bed reactors made of quartz tended to become etched when reacting powders produced from manganese TFA-containing precursors. A porous, 25 mm stainless steel disk was welded into a 1 in. pipe to support the bed of material. About 440 $cm^3$/min of air was purged through the disk to provide the fluidization gas and maintain an oxidizing environment. The inventors found that the submicron-size particles had a natural tendency to agglomerate into larger particles. A pneumatic vibrator was attached to the bottom of the reactor to maintain bed movement during the heating cycle. In this Example, the spray pyrolysis and fluidized bed reaction were carried out separately, but it is expressly contemplated that the two systems can be operated simultaneously and can be configured for continuous operation, for example vertically.

Example 3

Spray Pyrolysis of Precursors

Figure 4:
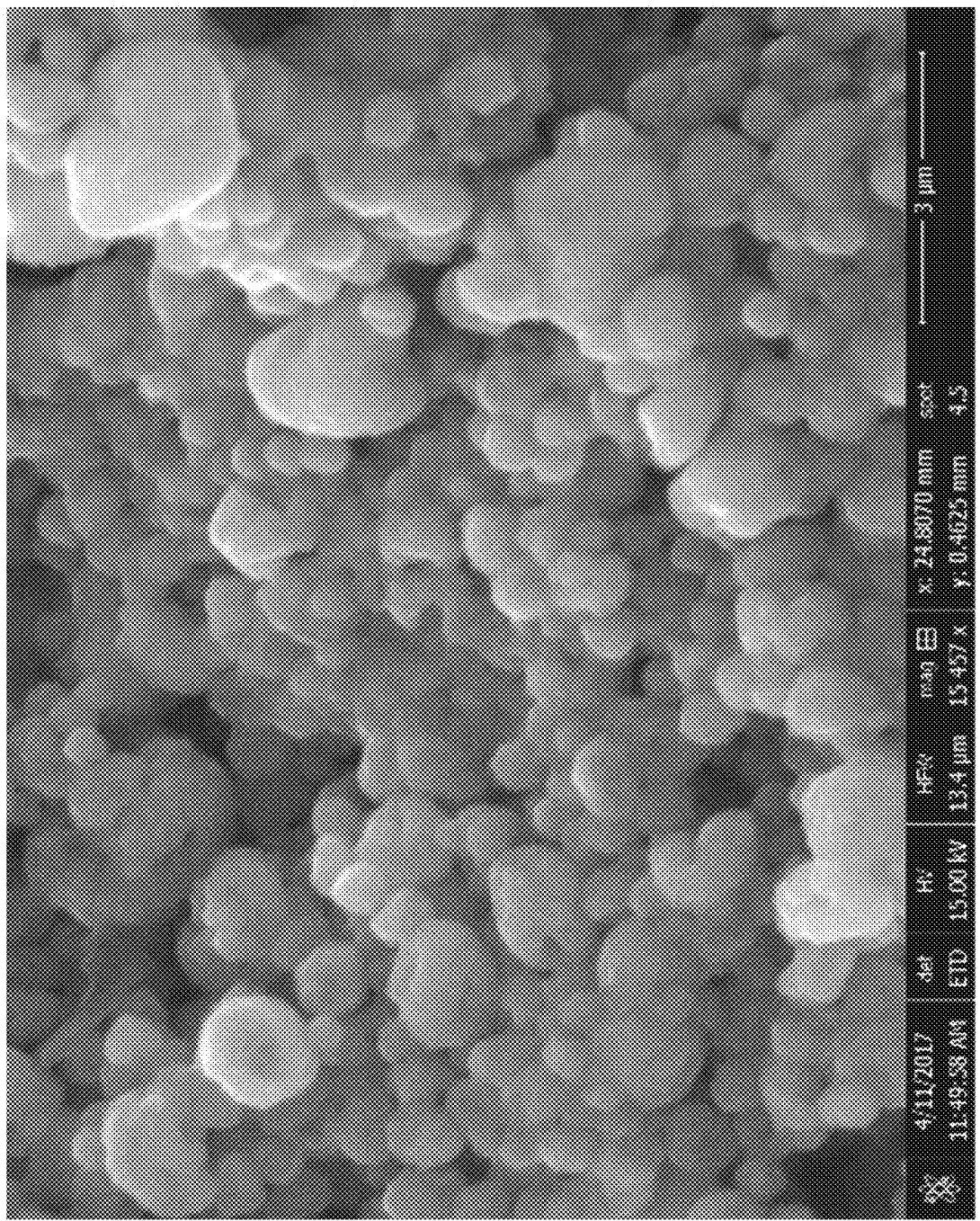
FIG. 4 is a scanning electron microscope (SEM) image of a spray-pyrolyzed NMC powder, according to embodiments of the present invention.

Spray pyrolysis of the precursors listed in Table 3 was conducted using the equipment setup described in Example 2. As illustrated in FIG. 4, the spray-pyrolyzed powders consisted of very fine, amorphous or poorly crystallized NMC particles. Inductively coupled plasma analyses of the powders showed stoichiometries consistent with those of the starting precursor solutions.

Example 4

Muffle Furnace Crystallization of Spray-Pyrolyzed Powders

Figure 5:
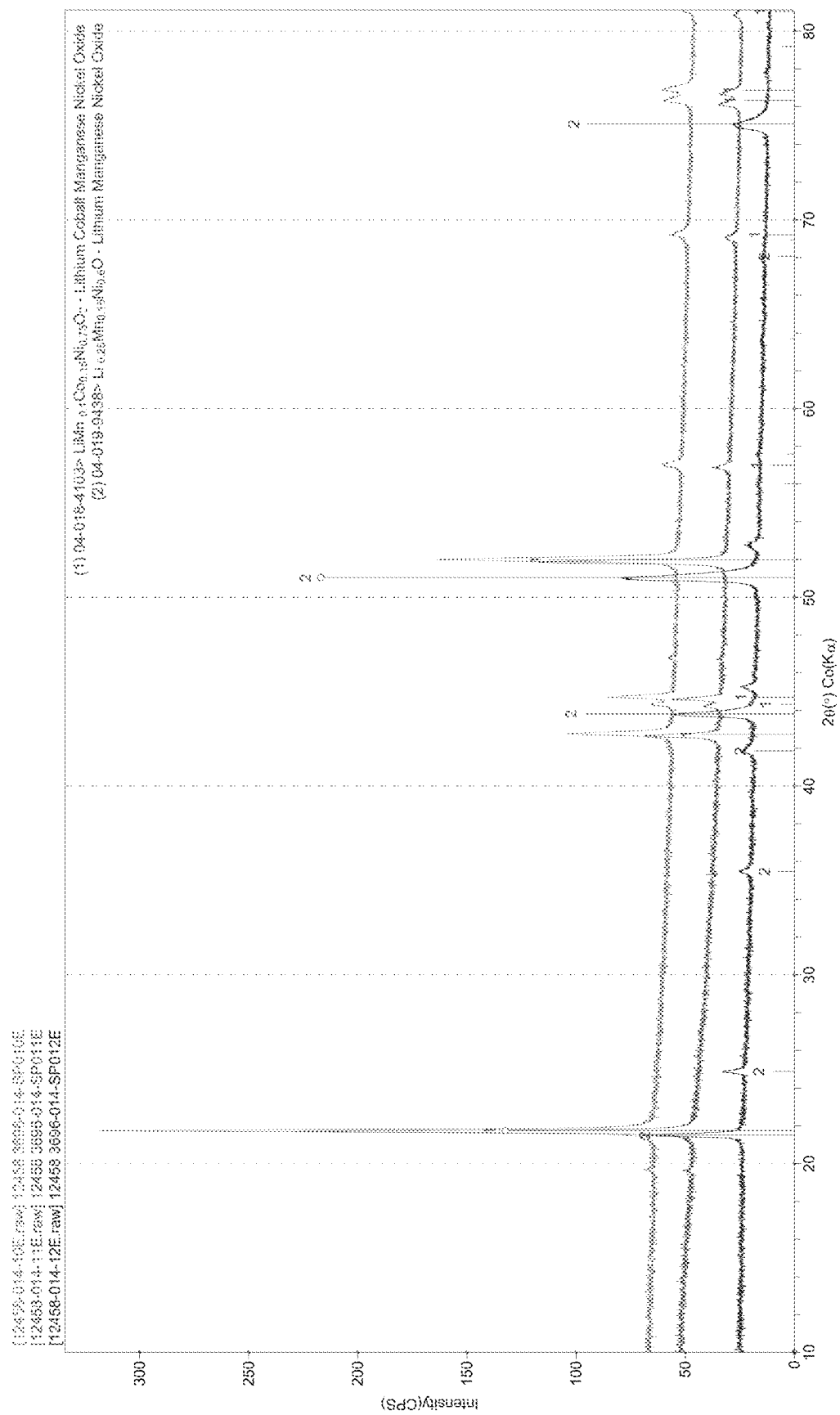
FIG. 5 illustrates XRD patterns of three NMC powders after crystallization in a muffle furnace, according to embodiments of the present invention.
Figure 6A:
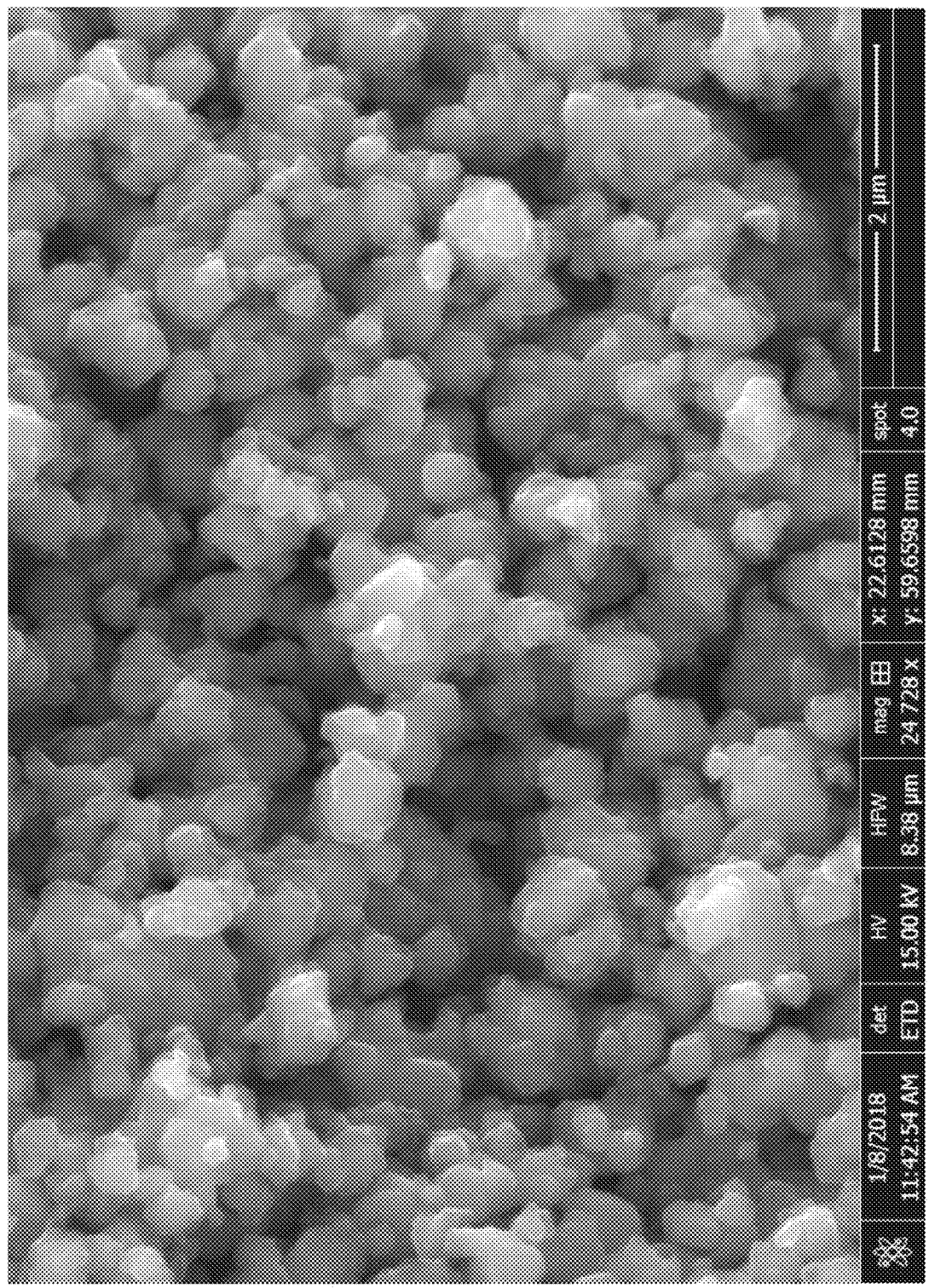
FIGS. 6A and 6B are SEM images of two NMC powders after crystallization in a muffle furnace, according to embodiments of the present invention.
Figure 6B:
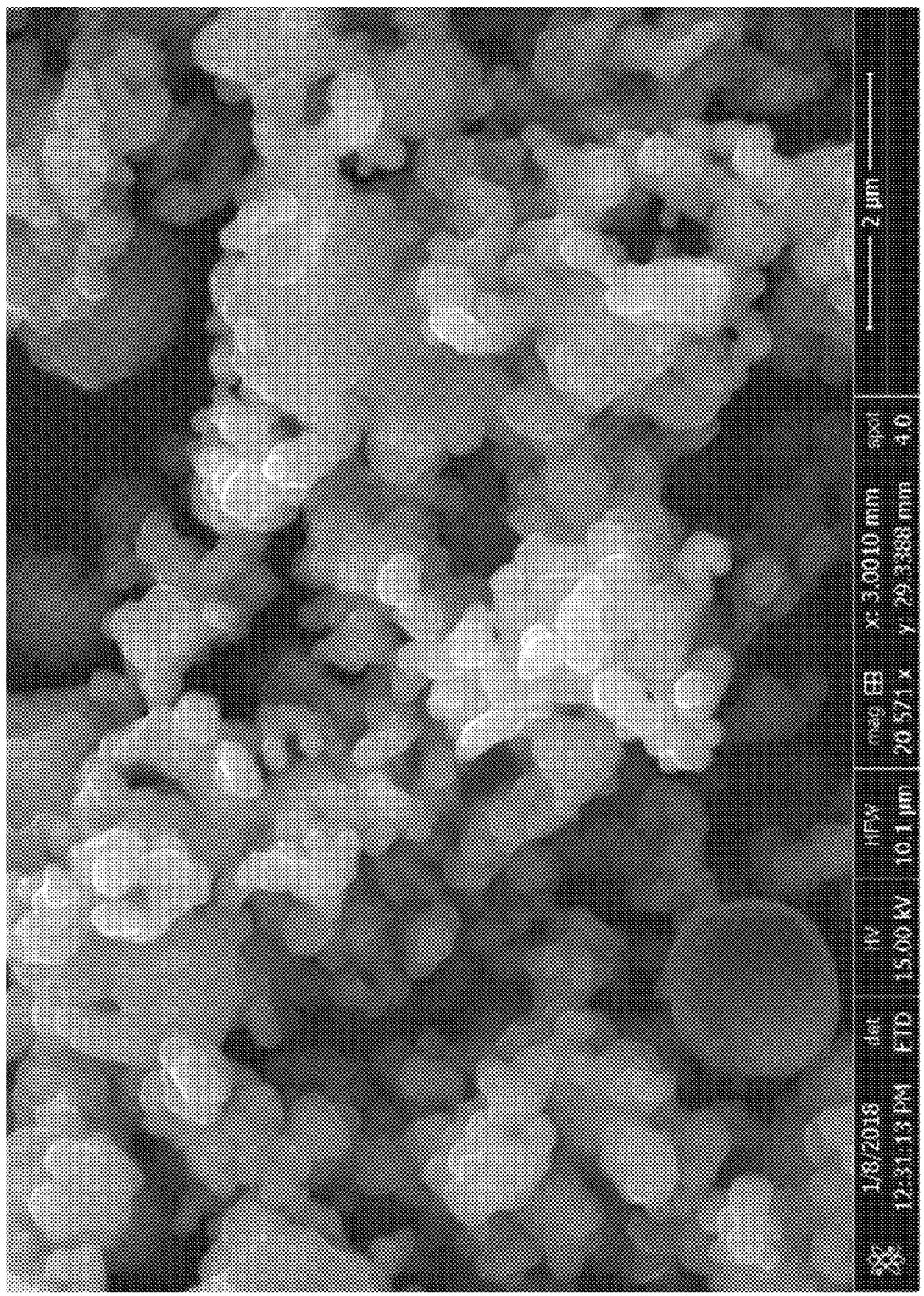

Spray-pyrolyzed NMC powders made from the precursors labeled PRS010, PRS011, and PRS012 in Table 3 were crystallized in a muffle furnace under the processing conditions described by D. F Lin et. al "Metal Segregation in Hierarchically Structured Cathode Materials for High-Energy Lithium Batteries," *Nature Energy* 1, no. 1 (2016) ("Lin"), which is incorporated herein by reference in its entirety; specifically, the temperature of the spray-pyrolyzed NMC powders were ramped to 875° C. at 2.5° C./min, held at 875° C. for 5 hours, and cooled down at 2.5° C./min. FIG. 5 illustrates XRD patterns of the three NMC powders (PRS010 at top, PRS011 in middle, PRS012 at bottom) after crystallization, and FIGS. 6A and 6B are scanning electron microscope (SEM) images of the powders made from the precursors labeled PRS011 and PRS012, respectively, after crystallization. As illustrated in FIGS. 5, 6A, and 6B, when manganese acetate or manganese OPr was used as the source of manganese, hexagonal nickel-rich NMC powders were produced, whereas when manganese TFA was used as the source of manganese, cubic submicron-sized NMC powders were produced.

Example 5

Air Fluidized Bed Reaction of Spray-Pyrolyzed Powders

The spray-pyrolyzed NMC powders made from the precursors listed in Table 3 that were not subjected to the muffle furnace crystallization of Example 4 were advanced to the fluidized bed reactor setup described in Example 2. The powders were screened by a 70 US mesh screen before introduction to the fluidized bed reactor. As in Example 4, the powders were ramped to 875° C. at 2.5° C./min, held at 875° C. for 5 hours, and cooled down at 2.5° C./min.

Figure 7:
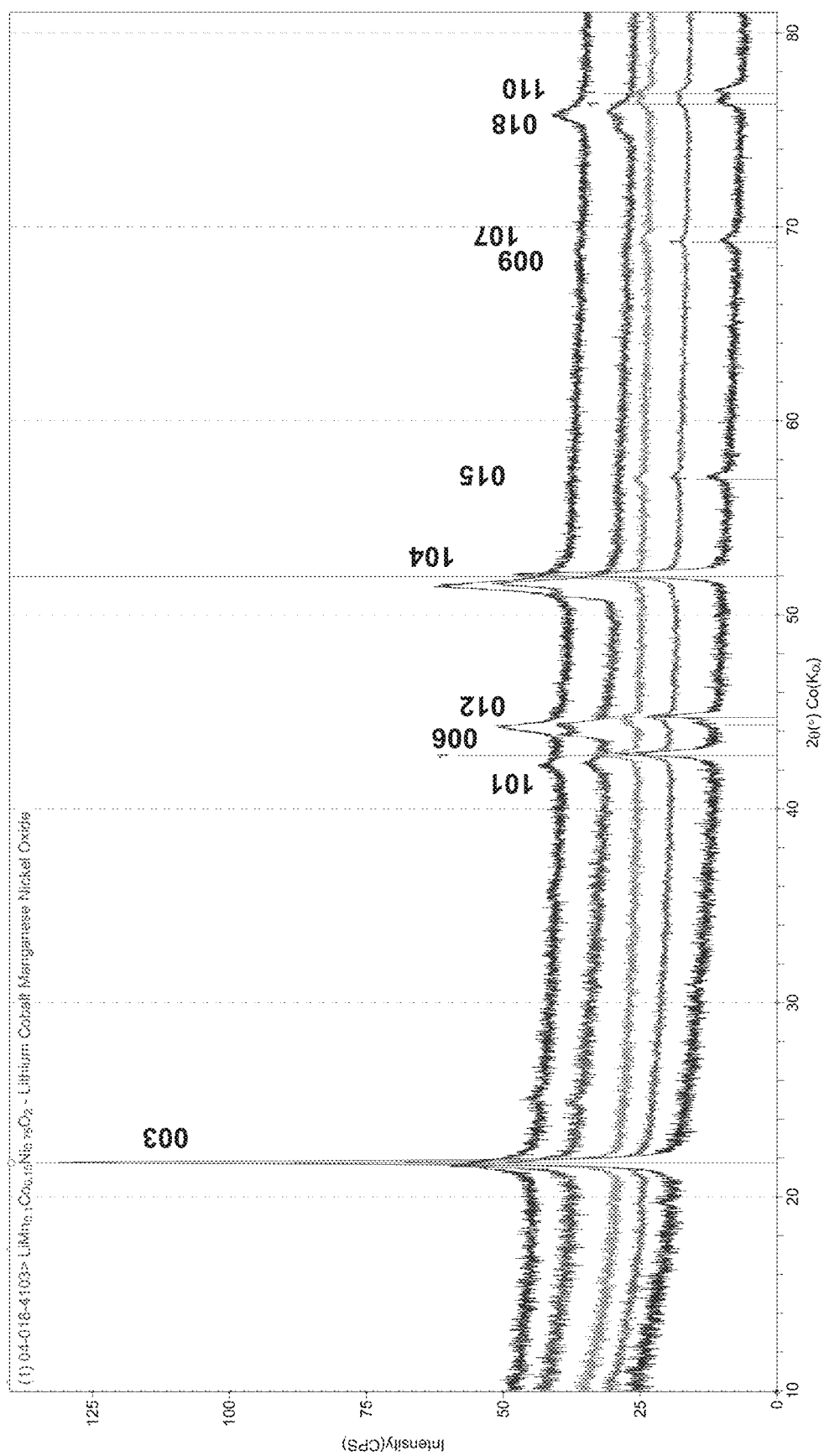
FIG. 7 illustrates the XRD patterns of five NMC powders pyrolyzed in air after reaction in a fluidized bed under air, according to embodiments of the present invention.
Figure 8A:
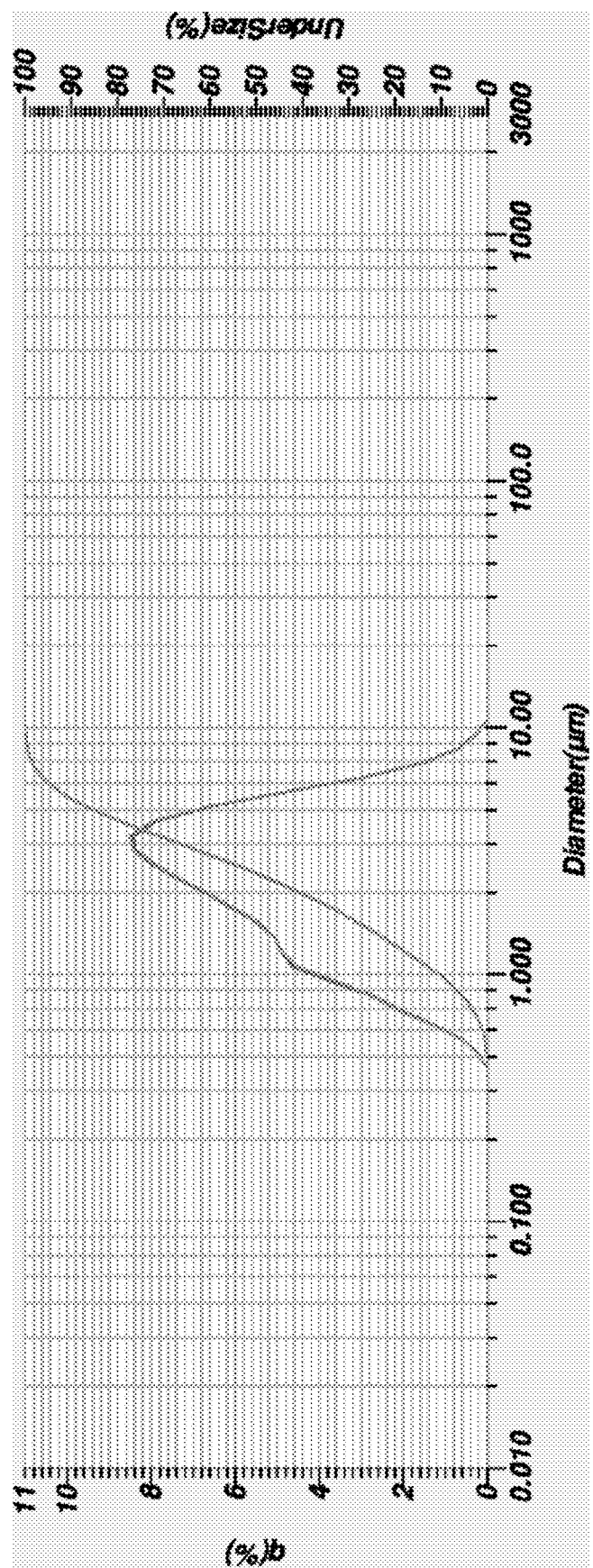
FIGS. 8A, 8B, and 8C are particle size distributions of a first NMC powder pyrolyzed in air before reaction in a fluidized bed, after reaction in a fluidized bed under air but before sonication, and after reaction in a fluidized bed under air and sonication, respectively, according to embodiments of the present invention.
Figure 8B:
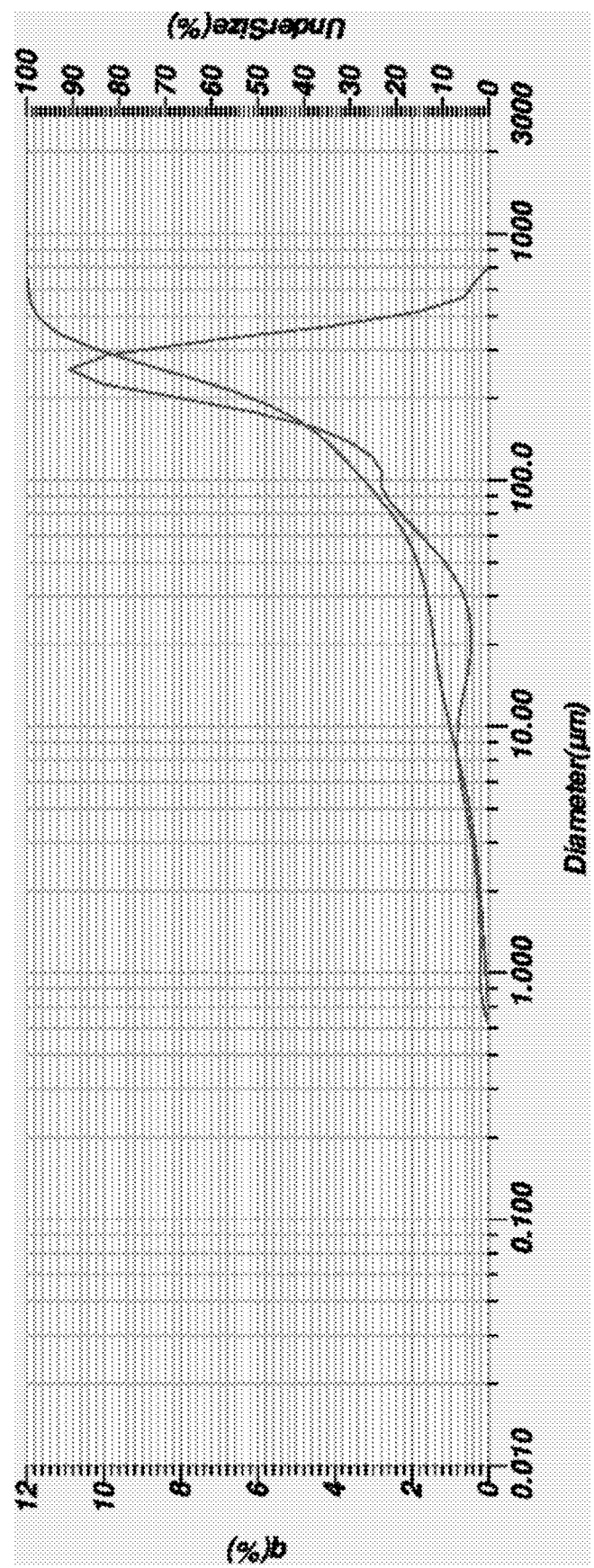
Figure 8C:
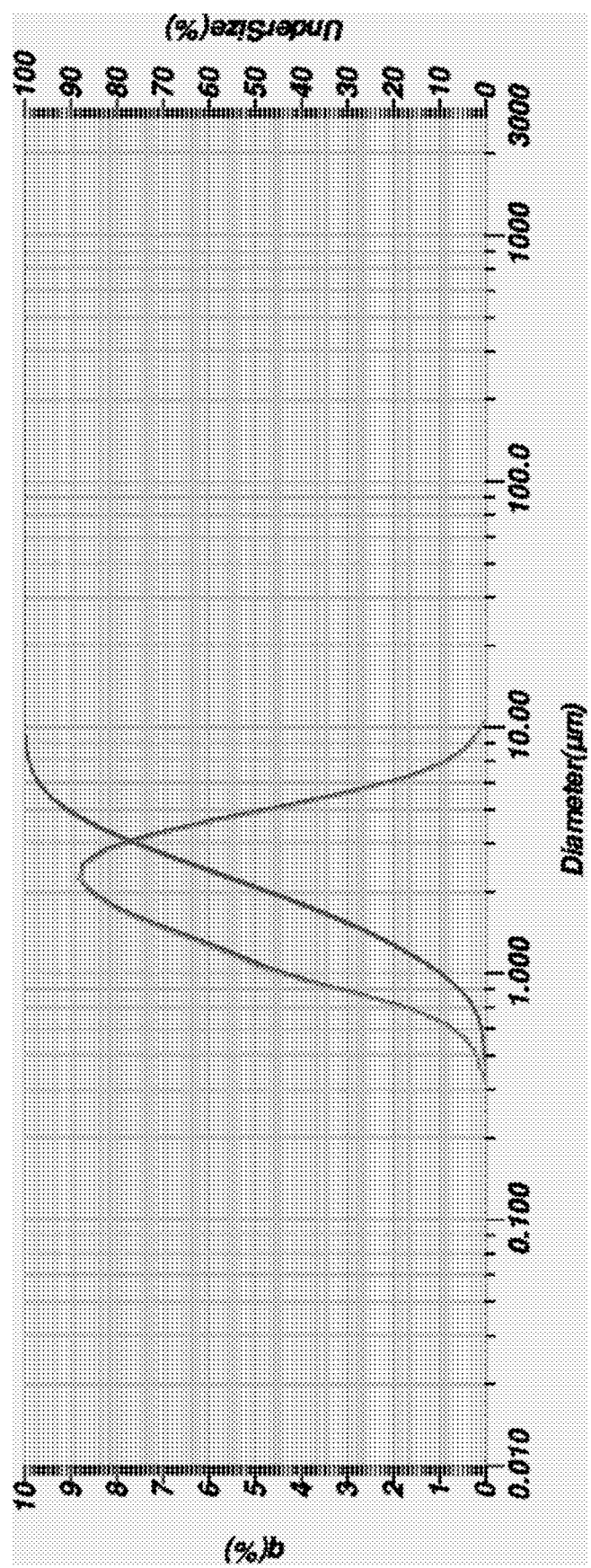
Figure 9A:
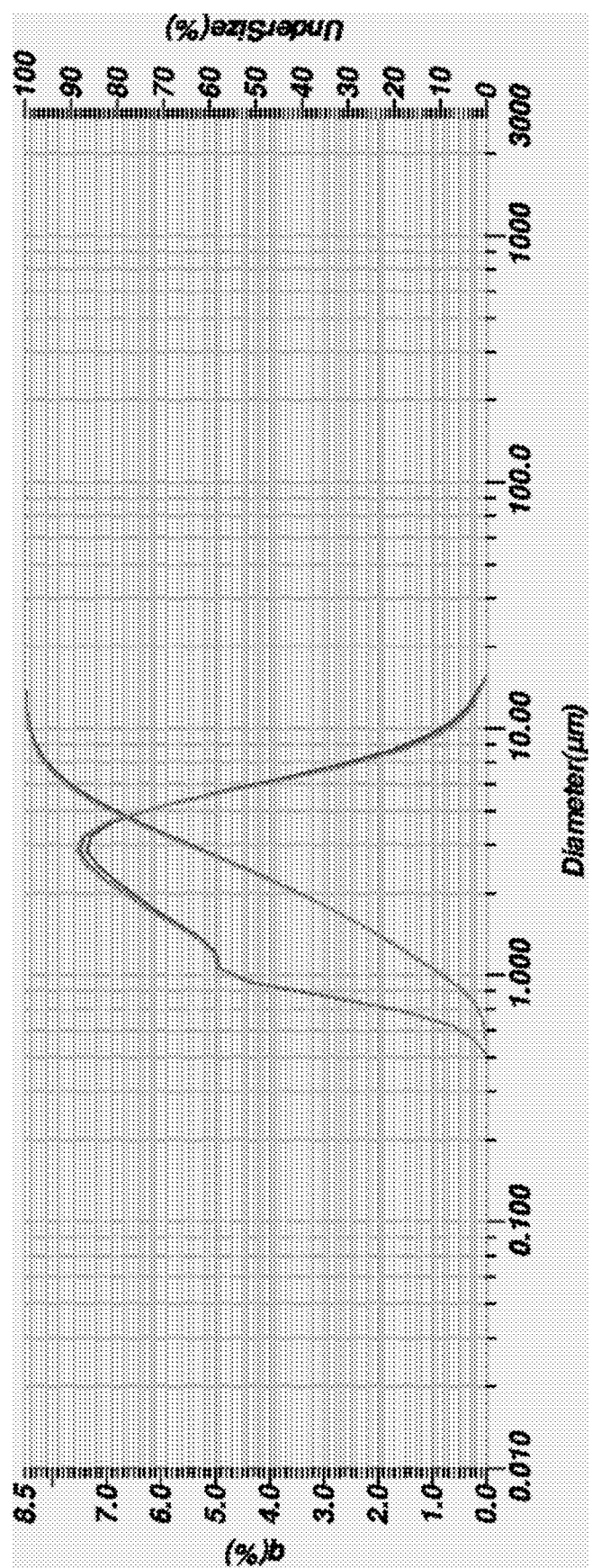
FIGS. 9A, 9B, and 9C are particle size distributions of a second NMC powder pyrolyzed in air before reaction in a fluidized bed, after reaction in a fluidized bed under air but before sonication, and after reaction in a fluidized bed under air and sonication, respectively, according to embodiments of the present invention.
Figure 9B:
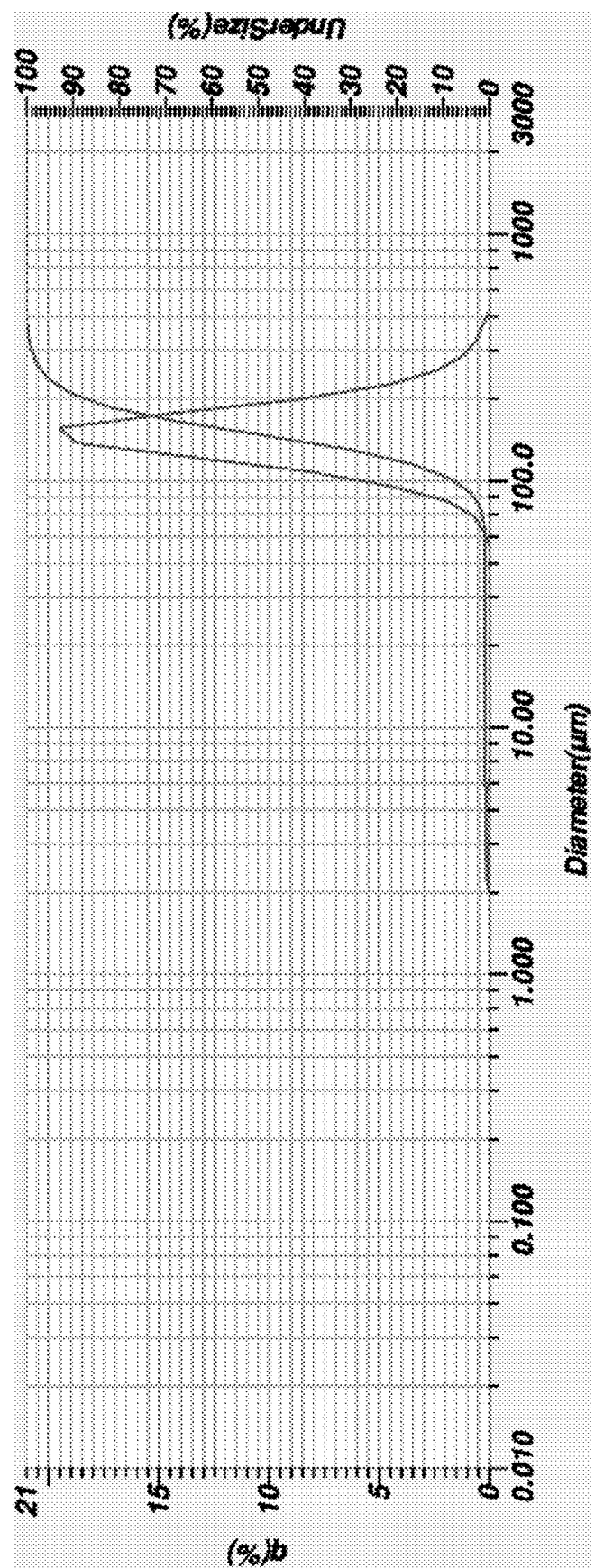
Figure 9C:
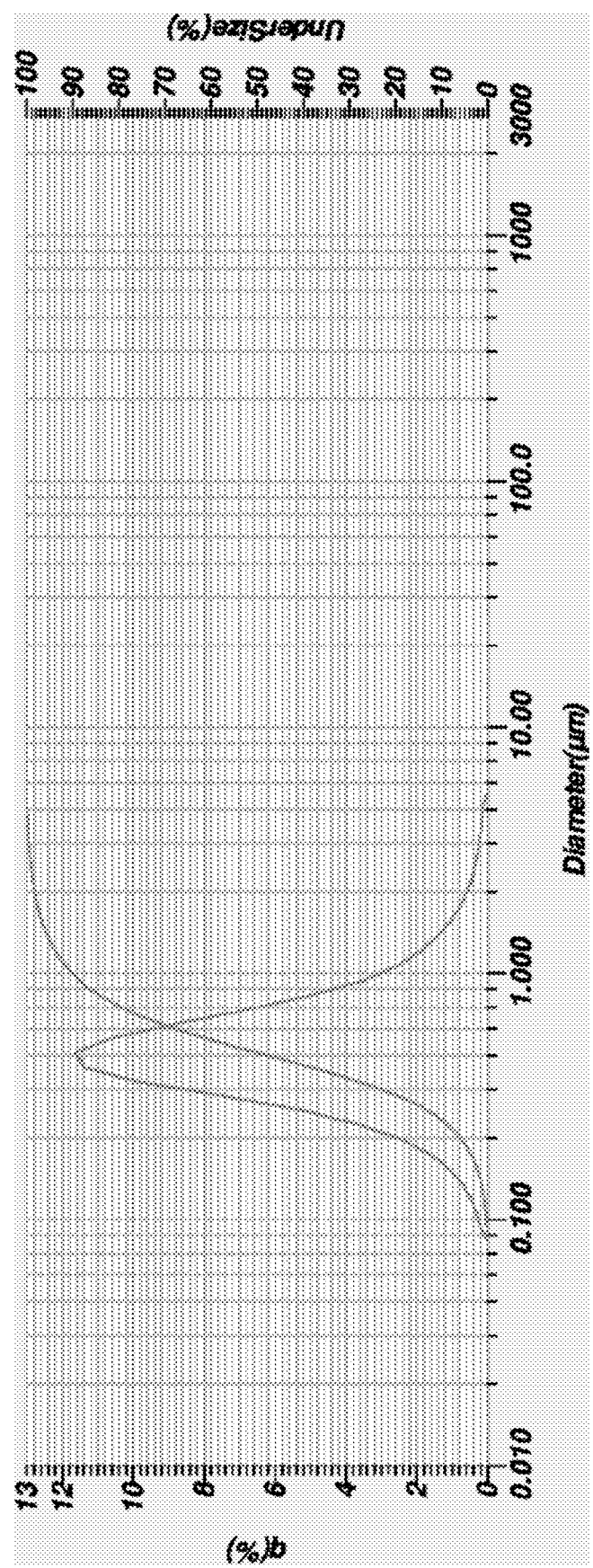
Figure 10A:
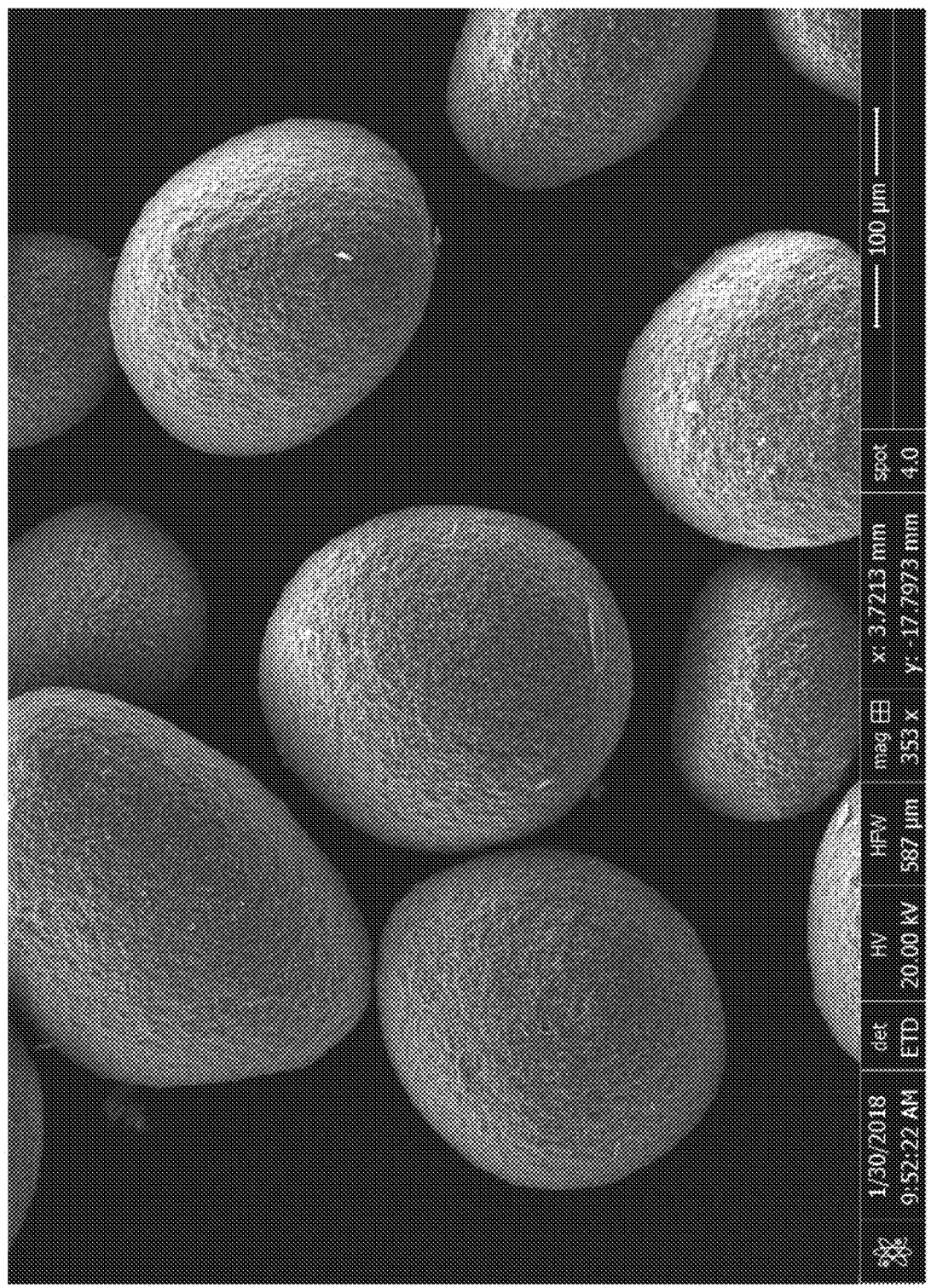
FIGS. 10A and 10B are SEM images of the powder of FIG. 8B.
Figure 10B:
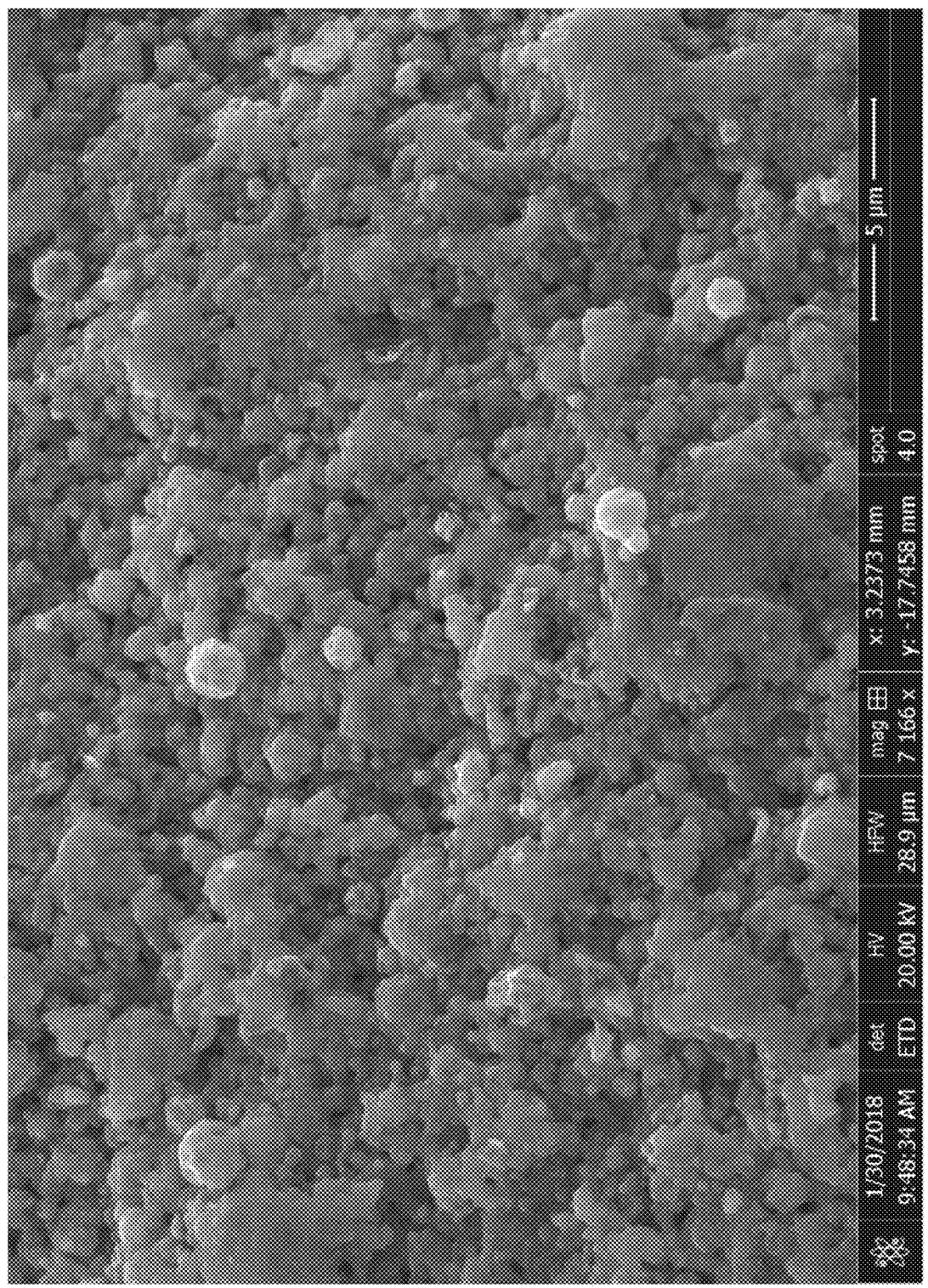
Figure 11A:
FIGS. 11A and 11B are SEM images of the powder of FIG. 9B.
Figure 11B:
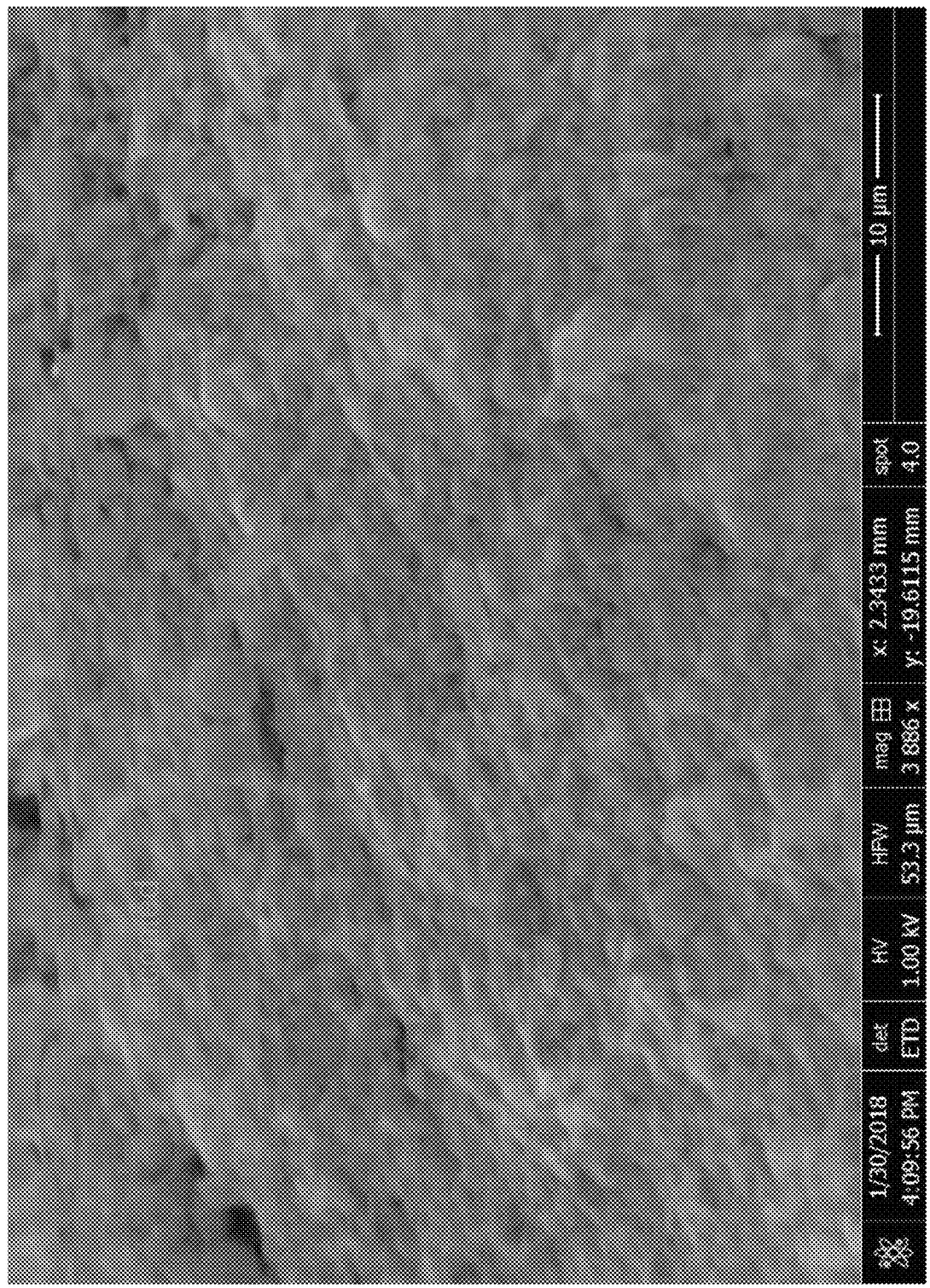
Figure 12A:
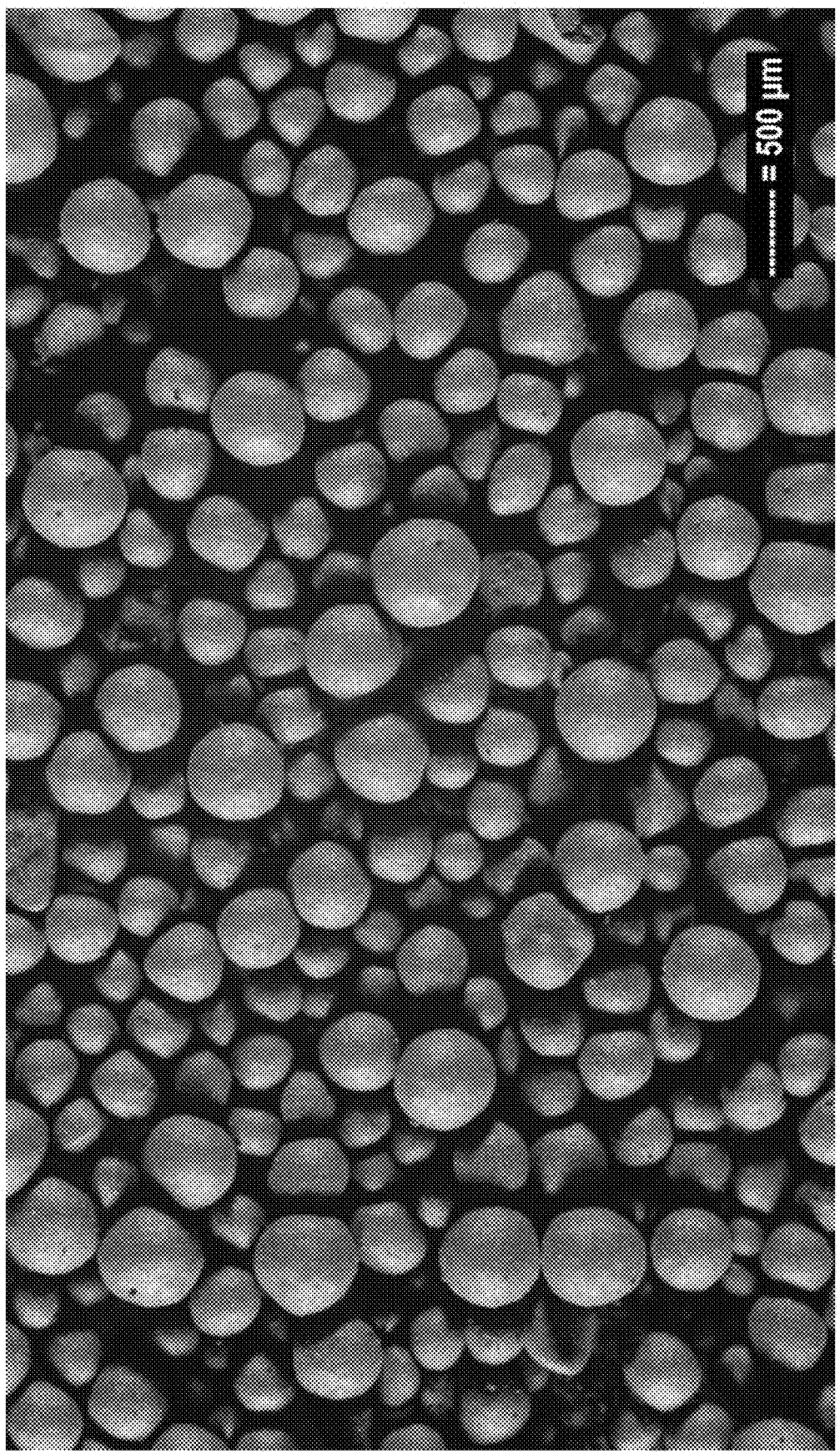
FIGS. 12A and 12B are an optical micrograph and a backscatter electron image, respectively, of the powder of FIG. 8B.
Figure 12B:
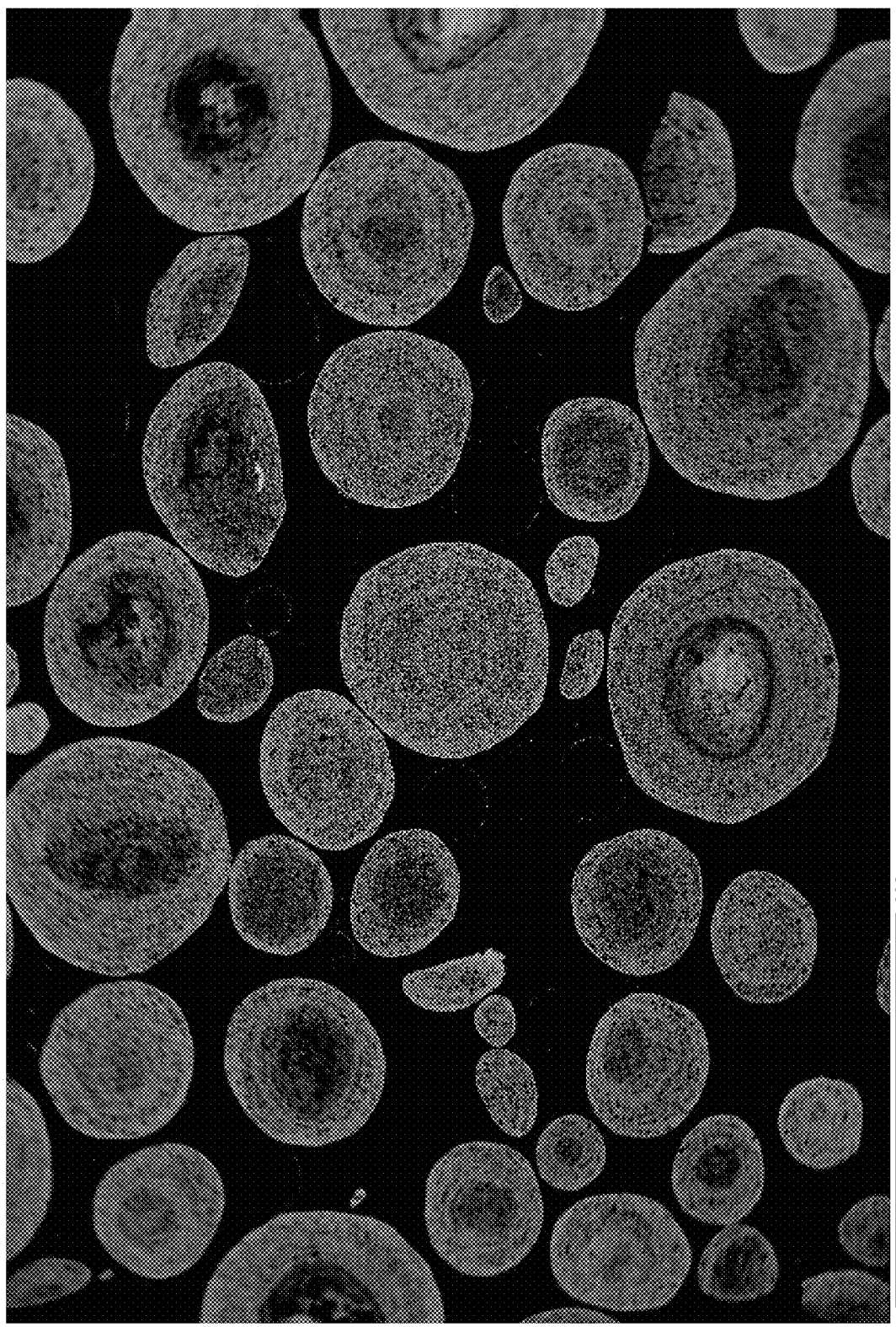
Figure 13A:
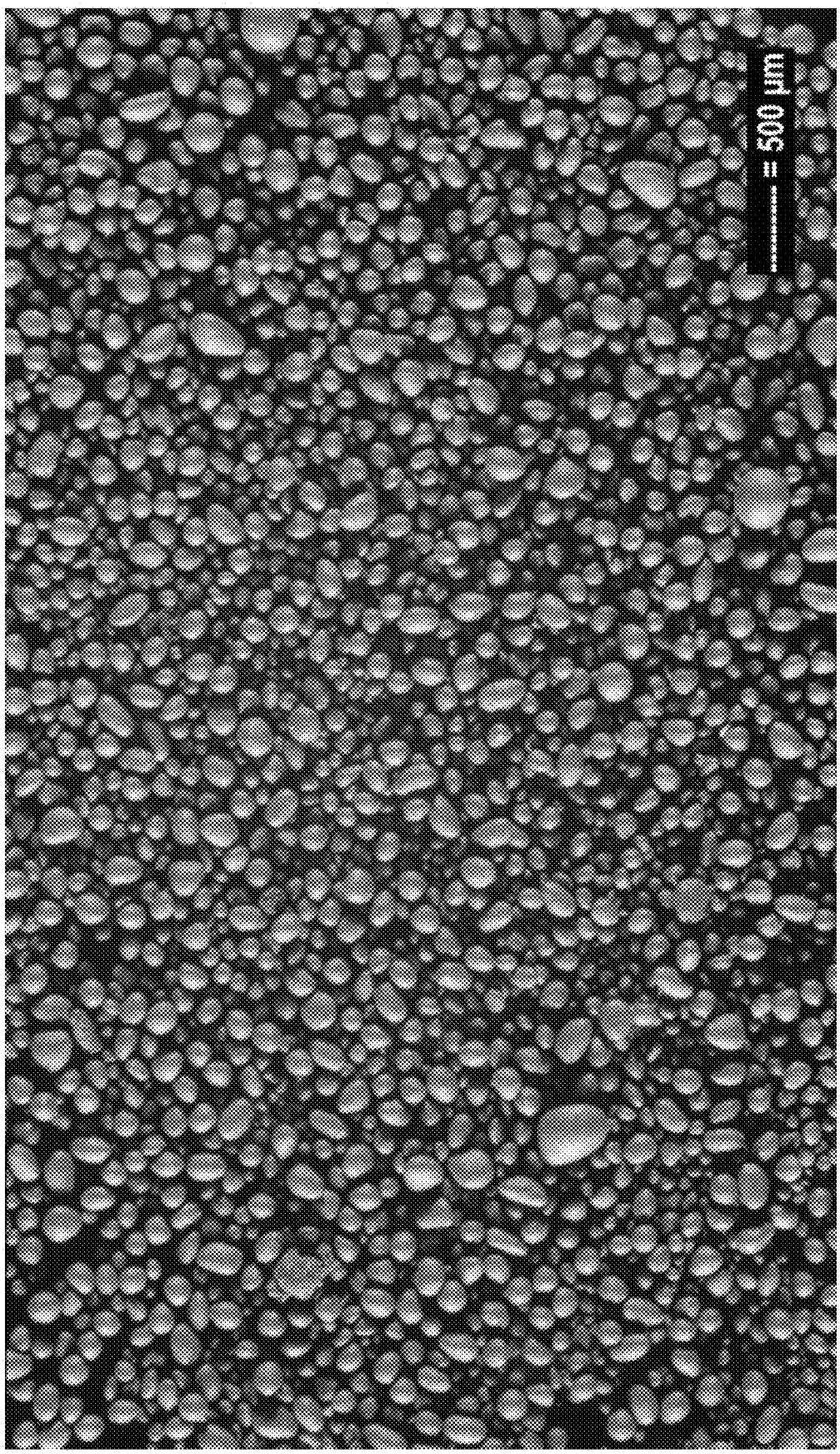
FIGS. 13A and 13B are an optical micrograph and a backscatter electron image, respectively, of the powder of FIG. 9B.
Figure 13B:
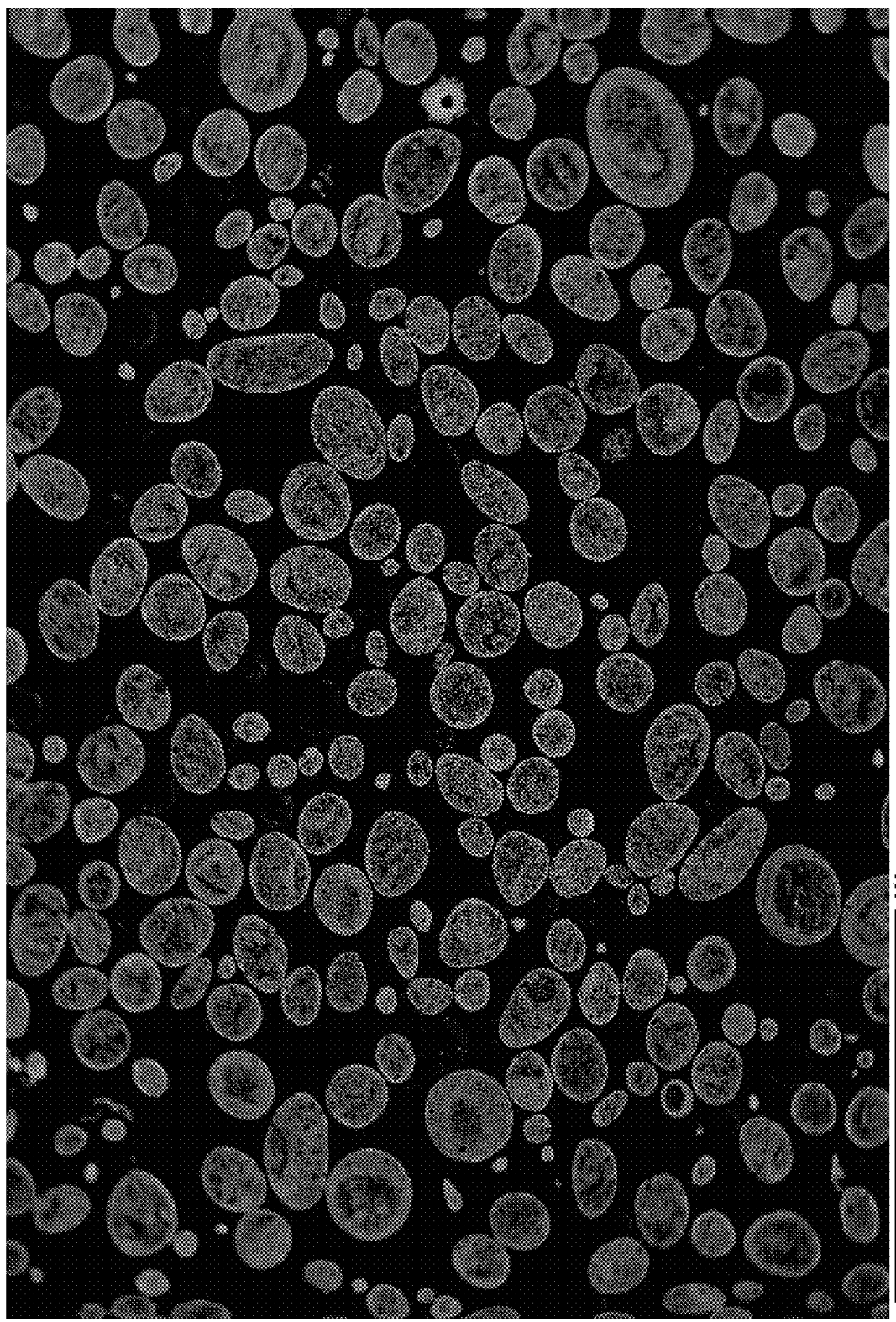
Figure 14A:
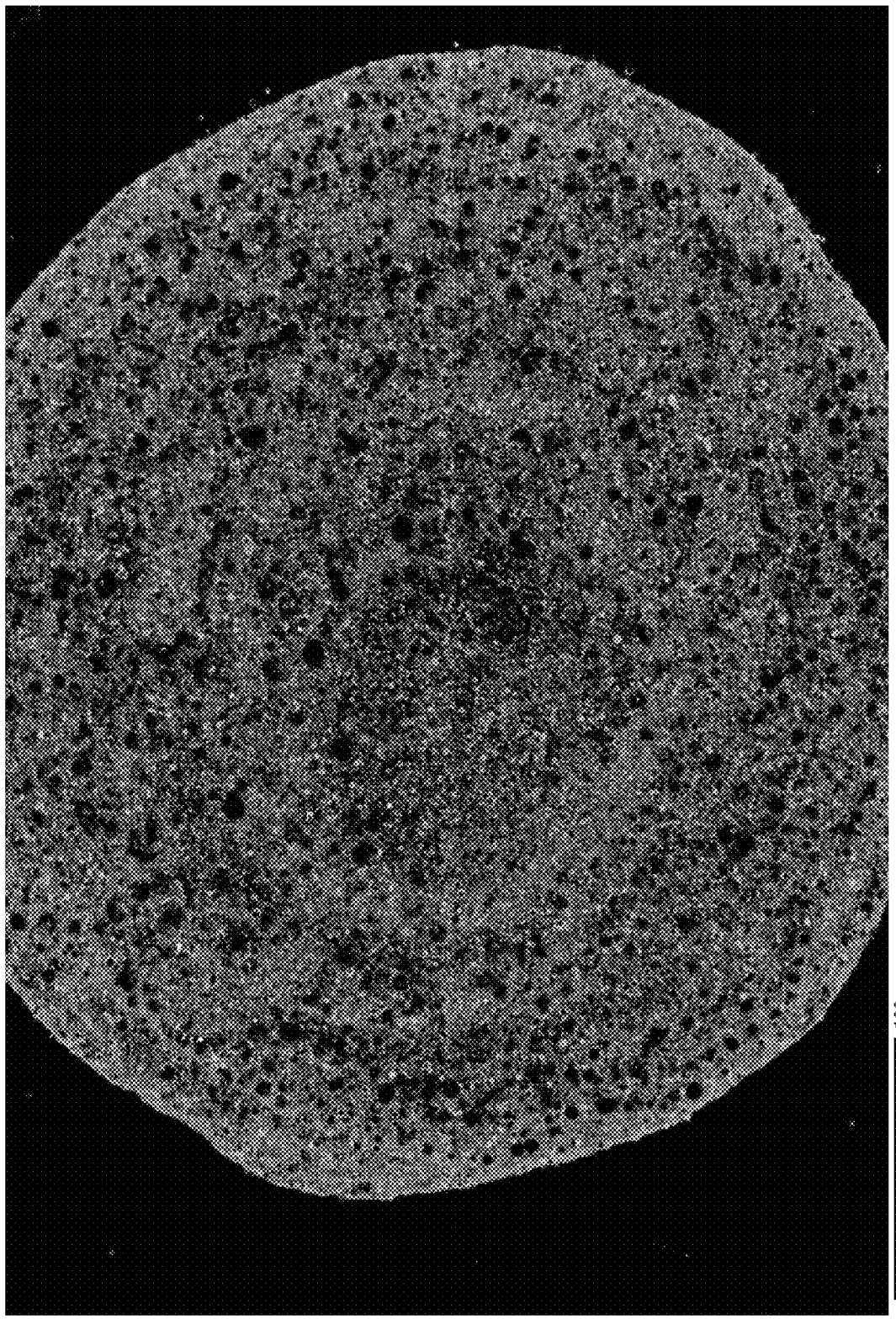
FIGS. 14A and 14B are a cross-sectional backscatter electron image and an electron microprobe line scan, respectively, of the powder of FIG. 8B.
Figure 14B:
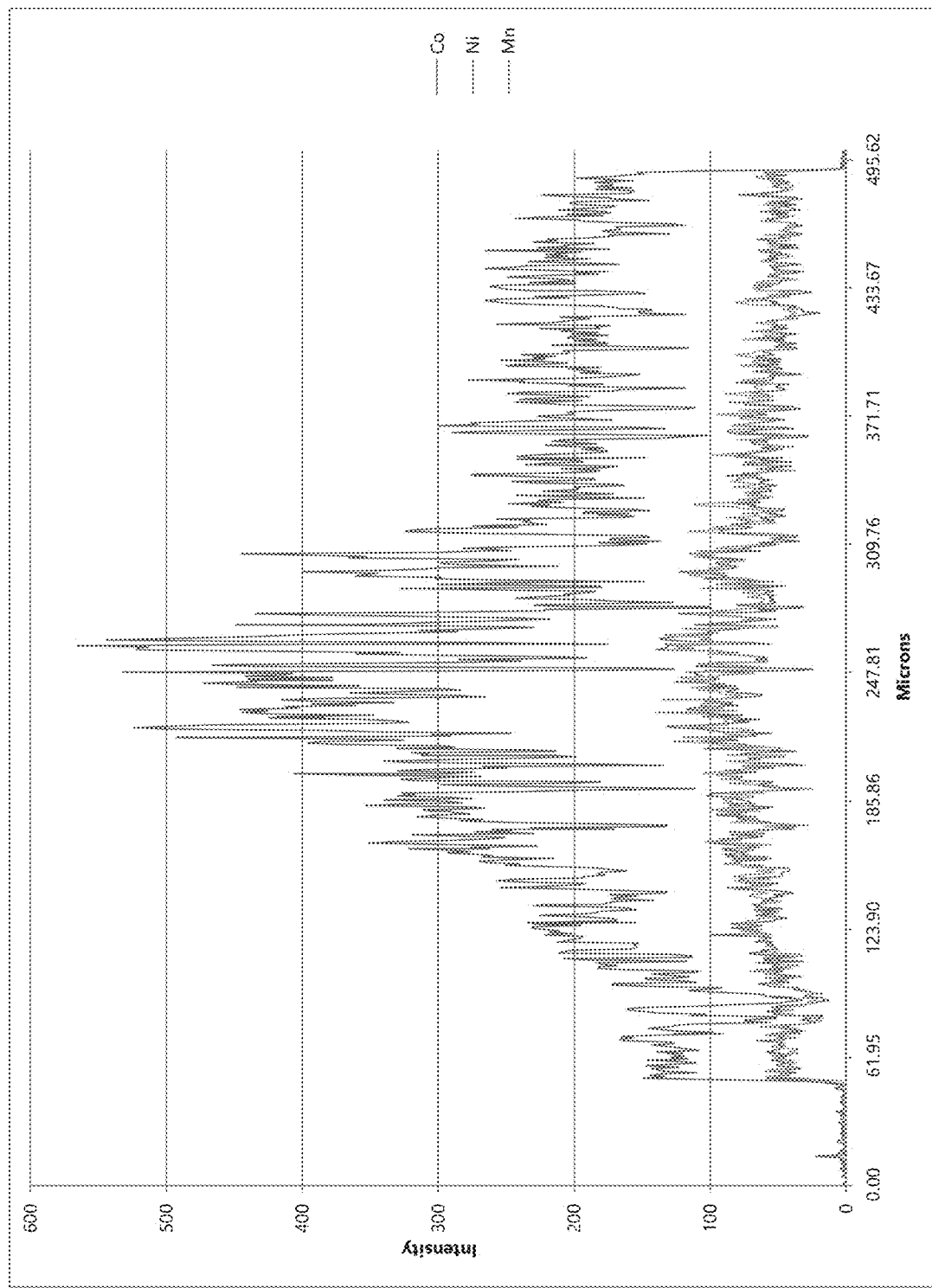
Figure 15A:
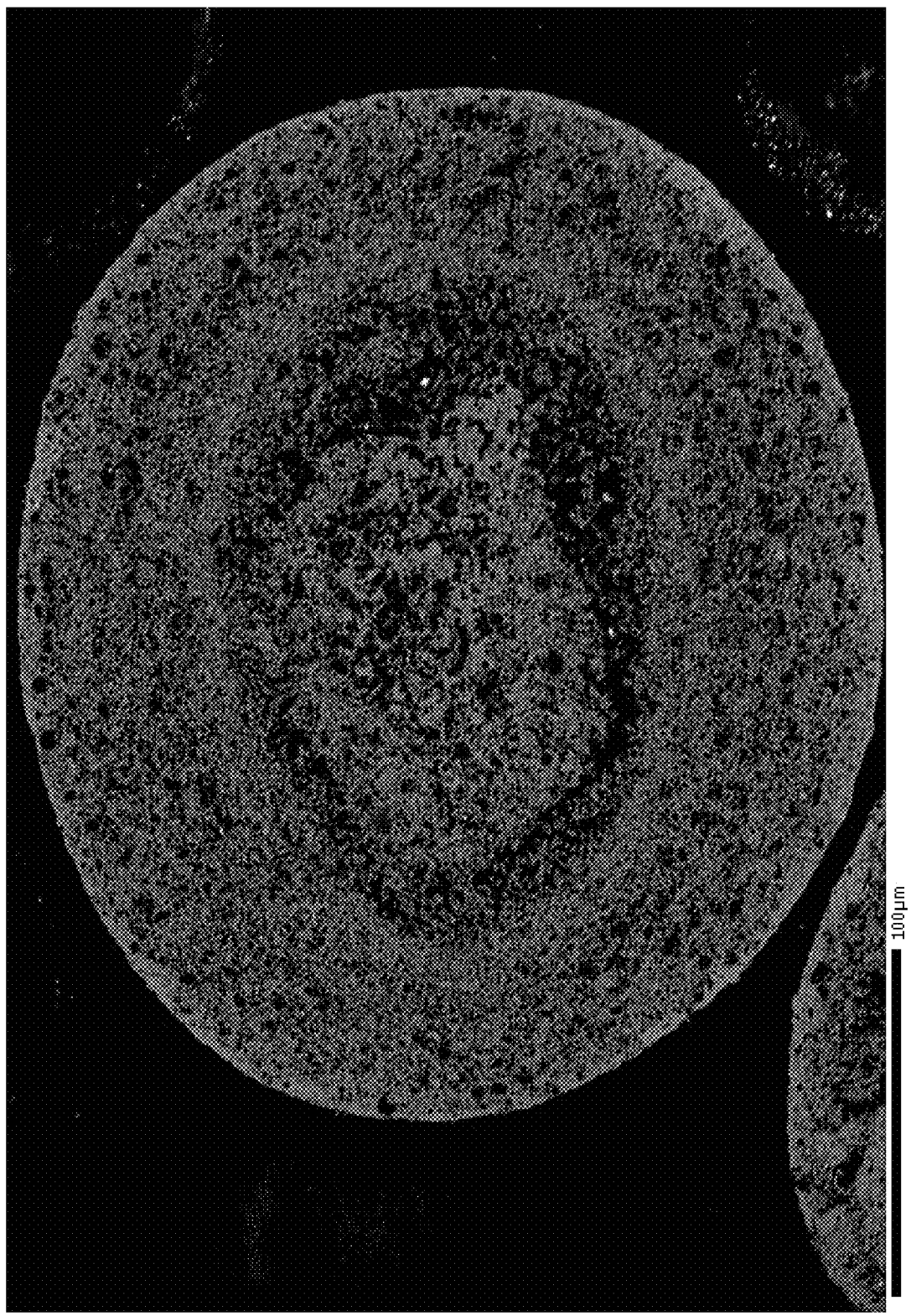
FIGS. 15A and 15B are a cross-sectional backscatter electron image and an electron microprobe line scan, respectively, of the powder of FIG. 9B.
Figure 15B:
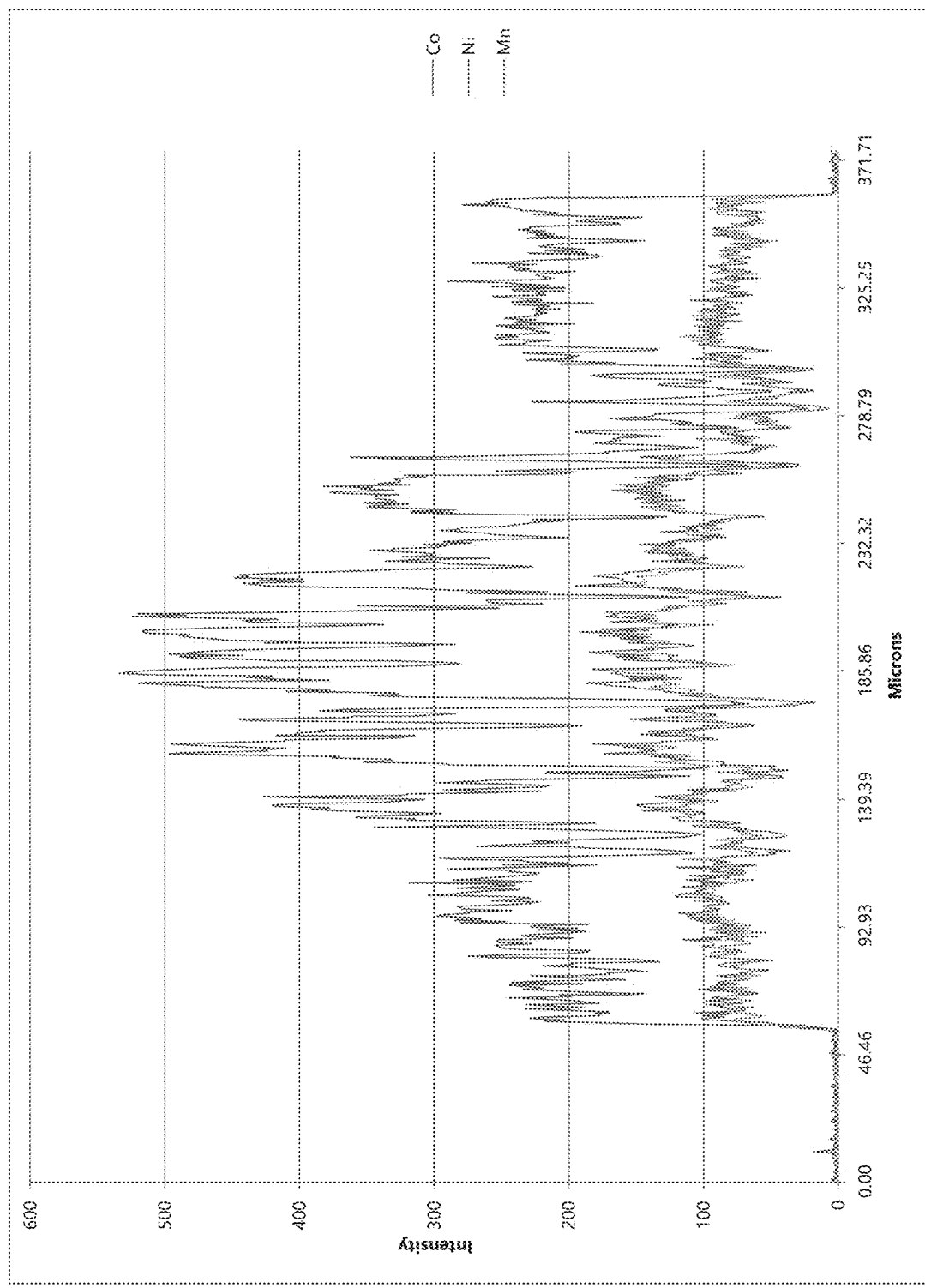
Figure 16:
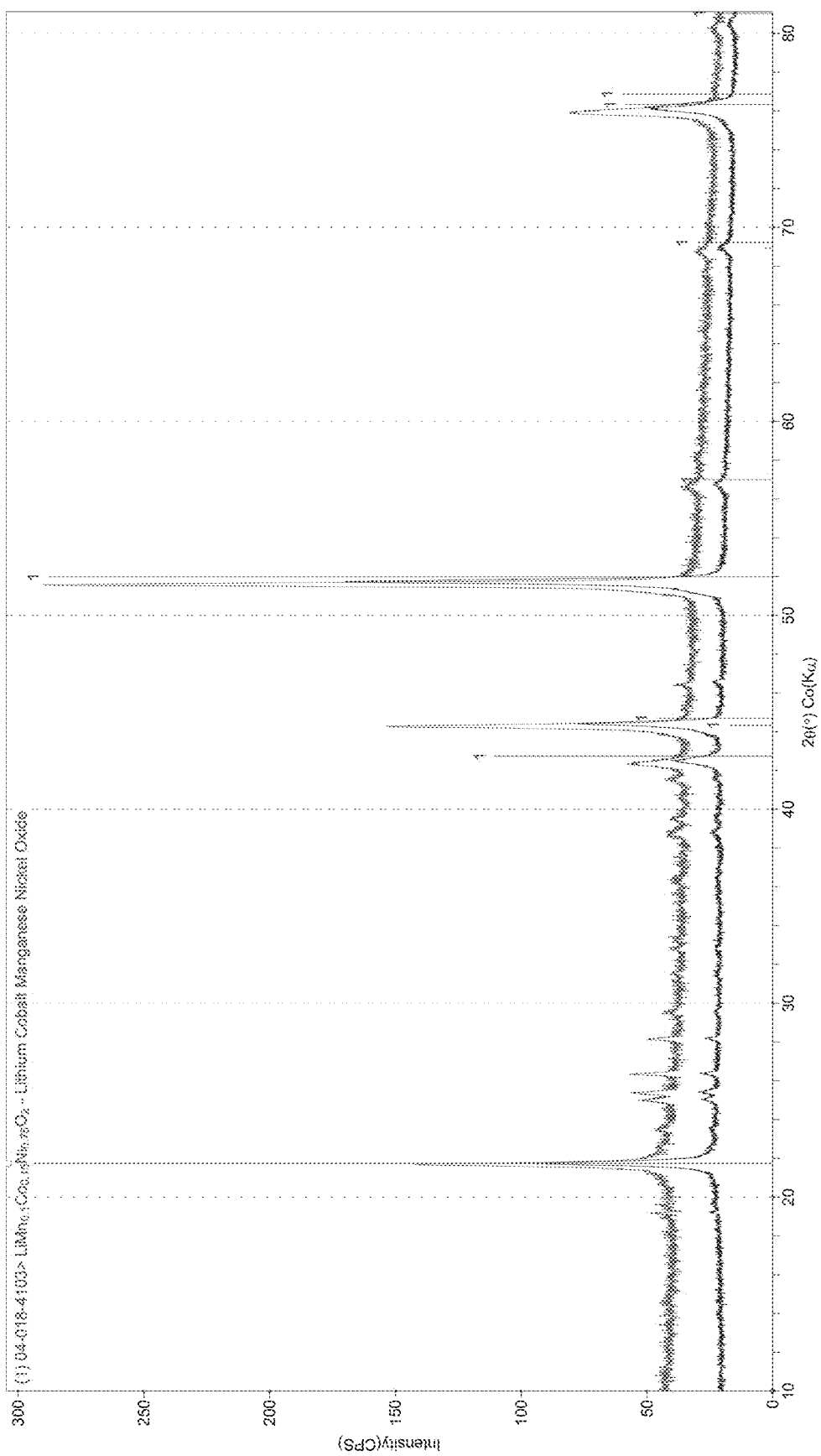
FIG. 16 illustrates XRD patterns of a third NMC powder after spray pyrolysis and after reaction in a fluidized bed, according to embodiments of the present invention.

FIG. 7 illustrates the XRD patterns of the powders made from precursors PRS017 (top curve), PRS018 (second from top), PRS019 (middle), PRS020 (second from bottom), and PRS023 (bottom) after the fluidized bed. FIGS. 8A, 8B, and 8C are particle size distributions of the powder made from precursor PRS017 before the fluidized bed, after the fluidized bed, and after the fluidized bed and sonication, respectively, and FIGS. 9A, 9B, and 9C are particle size distributions of the powder made from precursor PRS020 before the fluidized bed, after the fluidized bed, and after the fluidized bed and sonication, respectively. FIGS. 10A and 10B are SEM images of the powder made from precursor PRS017 after the fluidized bed, and FIGS. 11A and 11B are SEM images of the powder made from precursor PRS020 after the fluidized bed. FIGS. 12A and 12B are an optical micrograph and a backscatter electron image, respectively, of the powder made from precursor PRS017 after the fluidized bed, and FIGS. 13A and 13B are an optical micrograph and a backscatter electron image, respectively, of the powder made from precursor PRS020 after the fluidized bed. FIGS. 14A and 14B are a cross-sectional backscatter electron image and an electron microprobe line scan, respectively, of the powder made from precursor PRS017 after the fluidized bed, and FIGS. 15A and 15B are a cross-sectional backscatter electron image and an electron microprobe line scan, respectively, of the powder made from precursor PRS020 after the fluidized bed. FIG. 16 illustrates XRD patterns of the powder made from precursor PRS032 after spray pyrolysis (top curve) and after the fluidized bed (bottom curve).

As illustrated in FIGS. 7-16, when manganese TFA was used in combination with manganese acetate alone, manganese nitrate and manganese acetate, or manganese nitrate and manganese OPr, hexagonal nickel-rich NMC powders were produced; the shifted XRD pattern of the powder made from precursor PRS017 relative to other precursors (FIG. 7) indicates an increase in unit cell parameters. The particle size of the powders after spray pyrolysis was less than 10 which upon reaction in the fluidized bed formed soft agglomerates as large as 500 μm that easily disintegrated to particles 5 μm or smaller upon sonication. The fluidized powders consisted of spherical particles with a microgranular surface texture composed of fine crystallites; the powder prepared from precursor PRS017 appeared (FIGS. 10A, 10B, 12A) to be covered with an amorphous surface layer. Analysis of cross-sections of the fluidized powders by electron microprobe (FIGS. 14B, 15B; nickel is the top curve, while cobalt and manganese are the largely overlapping lower curves) showed some concentric zonation and internal porosity throughout the particles, and an increase in the nickel concentration toward the center or core of the spherical particles.

Example 6

Preparation and Characterization of Electrodes in Half Coin Cells

Cathode layers were prepared by mixing 90 wt % of the NMC powders made from precursors PRS010, PRS017, PRS019, PRS020, and PRS024 with 5 wt % carbon black and 5 wt % of a solution of polyvinylidene fluoride in N-methyl-2-pyrrolidone. The active material loading on the cathode was about 4.5 mg/cm². This slurry was spread onto aluminum foil and dried in a vacuum oven at 90° C. for about 8 hours, whereupon the electrodes were formed and dried in the vacuum oven at 90° C. for about a further 8 hours.

Half-cells were assembled using the NMC cathodes and lithium metal anodes in an argon-filled glovebox at room temperature. The electrolyte was a 1 M solution of lithium hexafluorophosphate in a mixture (3:7 by weight) of ethylene carbonate and ethyl-methyl carbonate. A porous polypropylene/polyethylene-porous polypropylene trilayer film (Celgard 2325) was used as the separator. Galvanostatic charge-discharge cycling was performed at room temperature in a voltage window of about 3.0 V to about 4.5 V.

Figure 17:
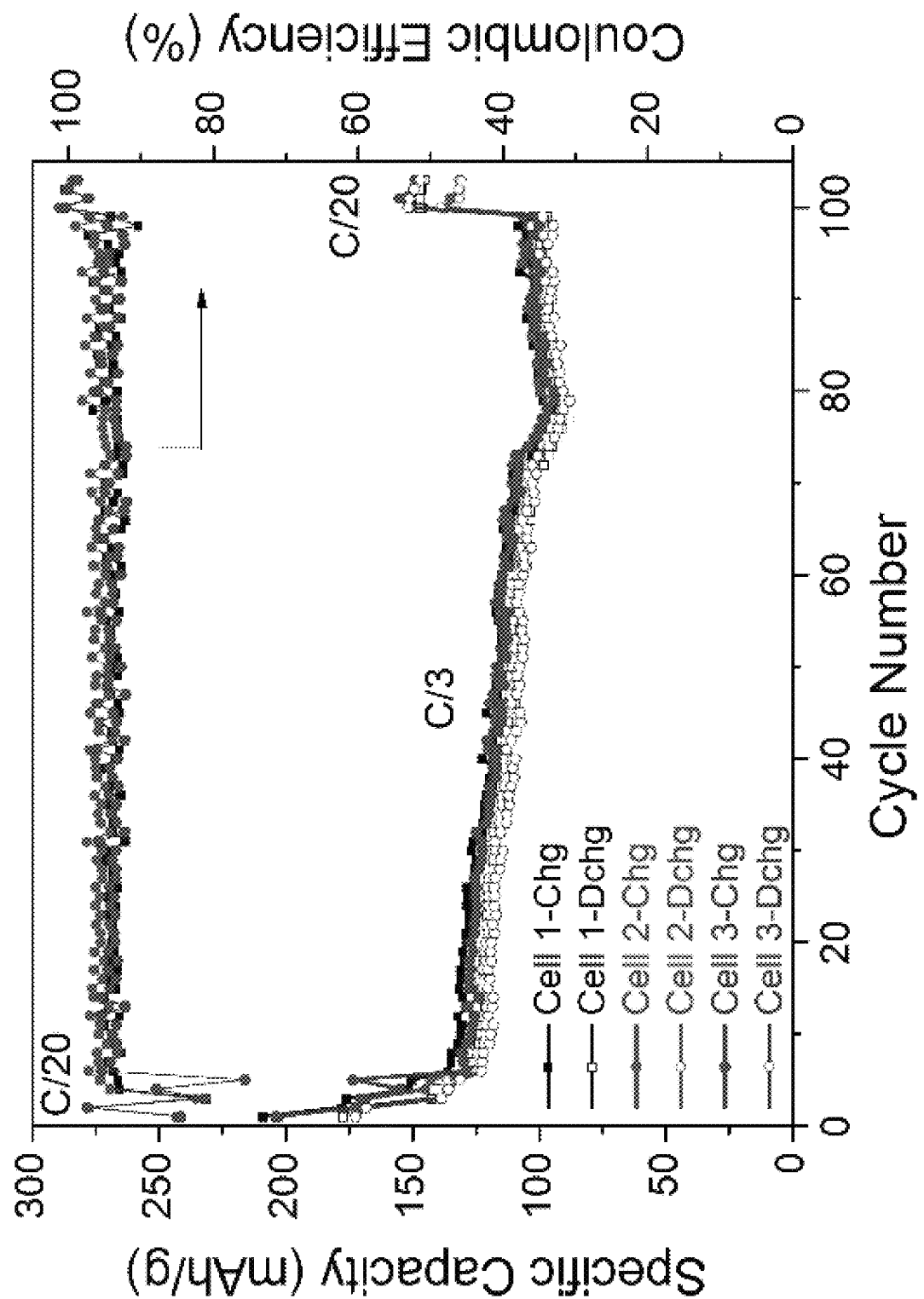
FIG. 17 is a graph of the capacity stability and coulombic efficiency of half-cells derived from a first fluidized NMC powder pyrolyzed in and subjected to fluidized bed reaction under air, according to the present invention.
Figure 18:
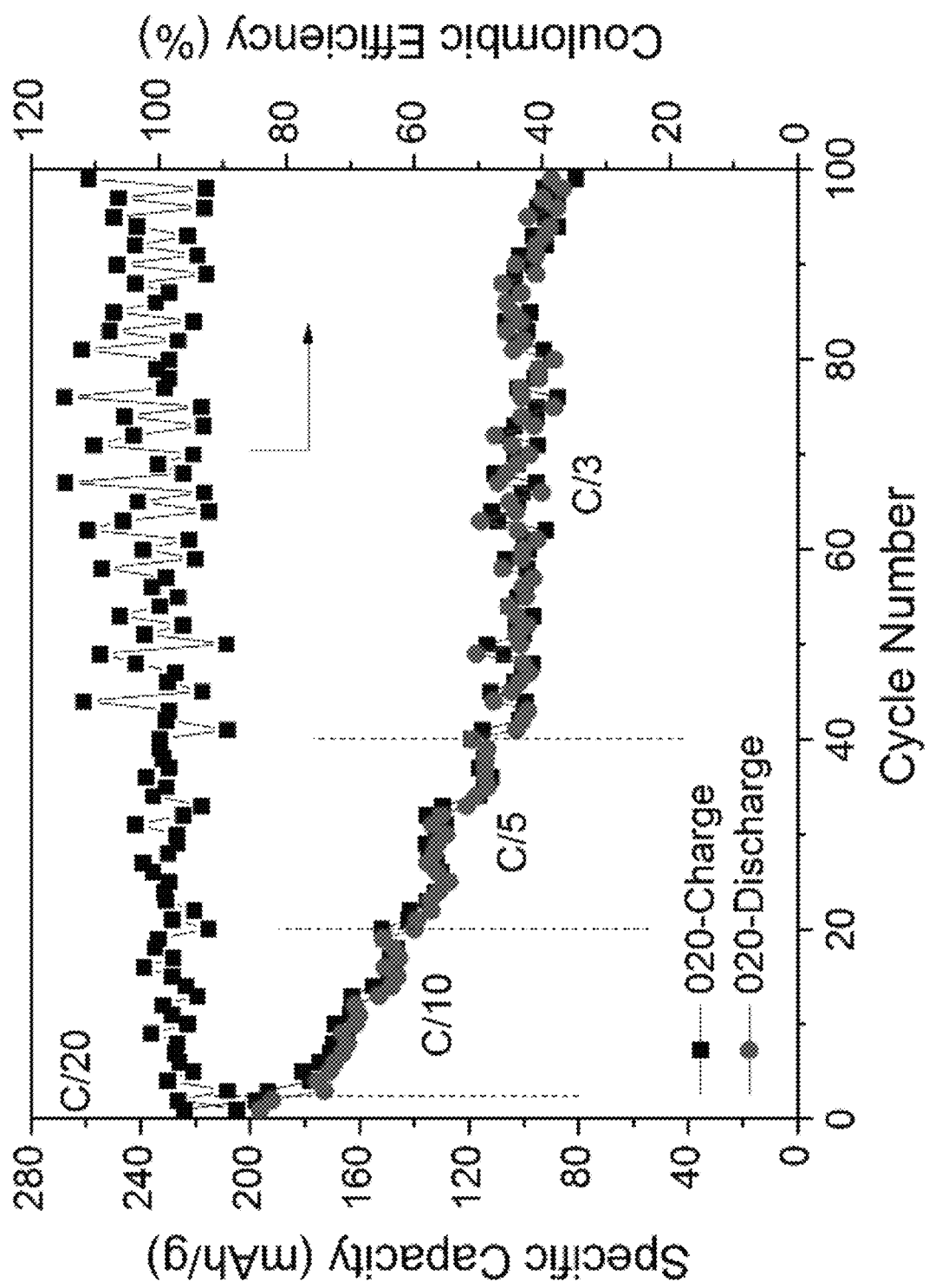
FIG. 18 is a graph of the capacity stability and coulombic efficiency of half-cells derived from a second fluidized NMC powder pyrolyzed in and subjected to fluidized bed reaction under air, according to the present invention.

FIGS. 17 and 18 illustrate the stability and coulombic efficiency of half-cells derived from precursors PRS010 and PRS020, respectively; several identical cells for each precursor were subjected to the cycling stability tests. Oscillation of the capacity and coulombic efficiency was likely caused by changes in ambient temperature.

Relative to cathodes derived from precursor PRS019, which was considered the control, all cathodes showed broadly similar performance characteristics; cathodes derived from precursors PRS017 and PRS020 had marginally better cycling performance. The initial specific capacity for cathodes derived from precursor PRS020 was 215 mAh/g, which is comparable to commercial NMC 622 materials.

Example 7

Construction and Testing of Full Coin Cells

Figure 19:
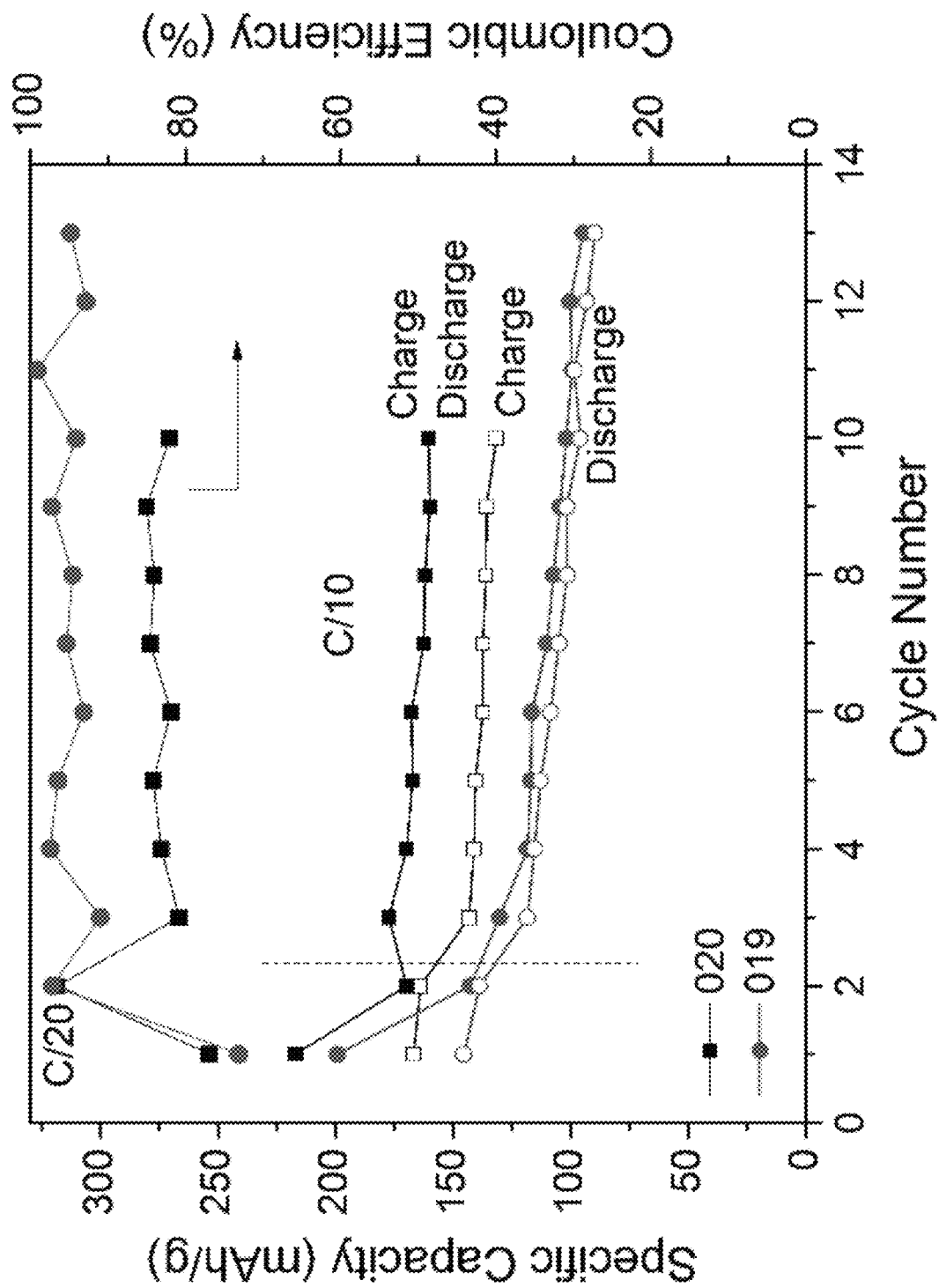
FIG. 19 is a graph of the capacity stability and coulombic efficiency of full cells derived from the fluidized NMC powders of FIGS. 17 and 18.

The cathodes derived from precursors PRS019 and PRS020 were used in full coin cell assemblies in combination with graphite anodes having 6 mg/cm² of active material loading. The diameters of the anode and cathode in the full cells were ⅝" and 9/16", respectively. The electrolytes and separators were the same as in Example 6. The galvanostatic charge-discharge cycling voltage window for the full cells was between about 3.0 V and about 4.4 V. As illustrated in FIG. 19, full cells assembled from the cathodes derived from precursor PRS020 exhibited higher capacity but lower coulombic efficiency than the full cells assembled from the cathodes derived from precursor PRS019.

Example 8

Powder Characterization After Coin Cell Testing

Figure 20A:
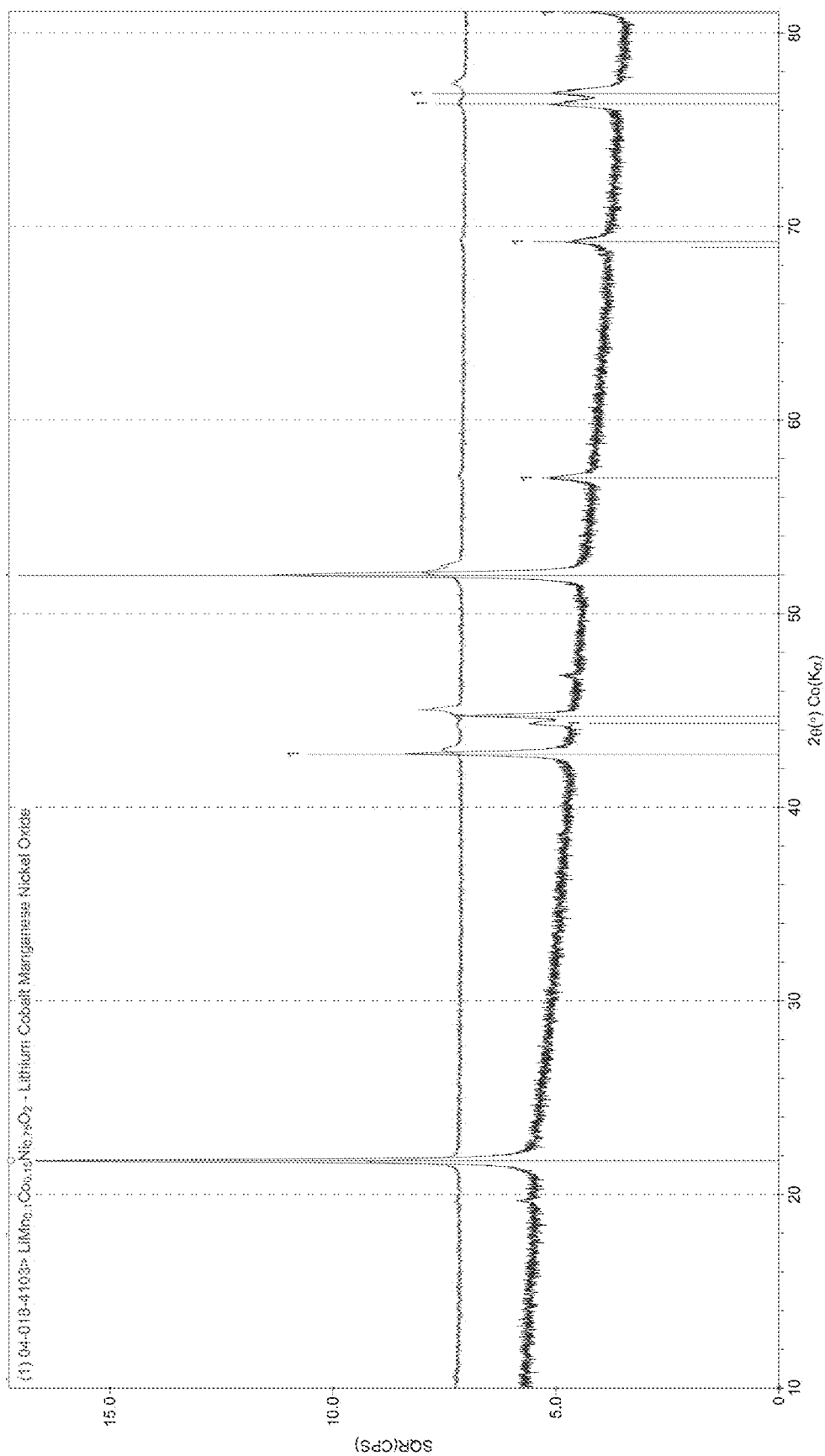
FIGS. 20A, 20B, and 20C compare the XRD patterns of the fresh powder and powder after cycling for first, second, and third fluidized NMC powders, respectively, according to the present invention.
Figure 20B:
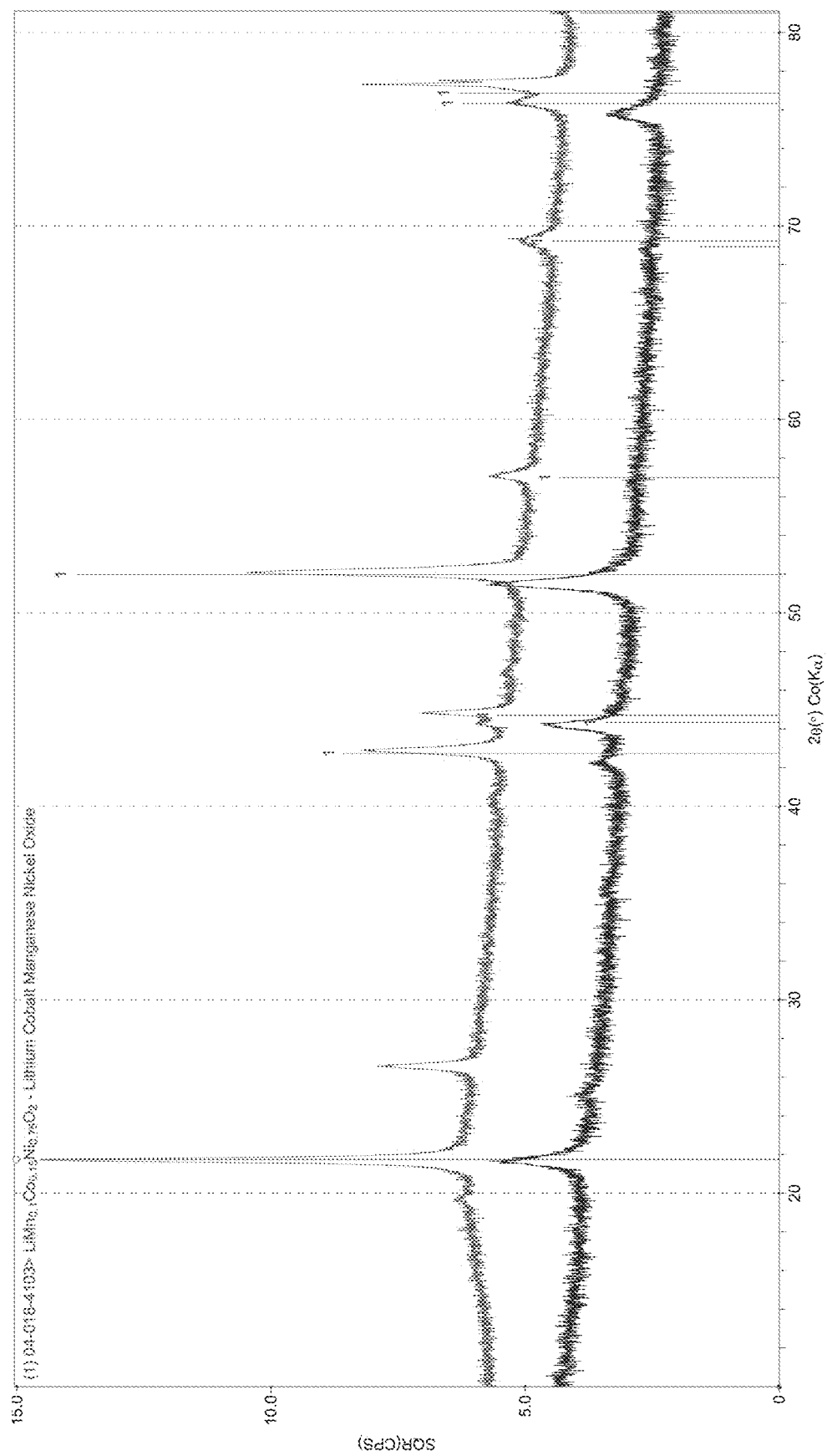
Figure 20C:
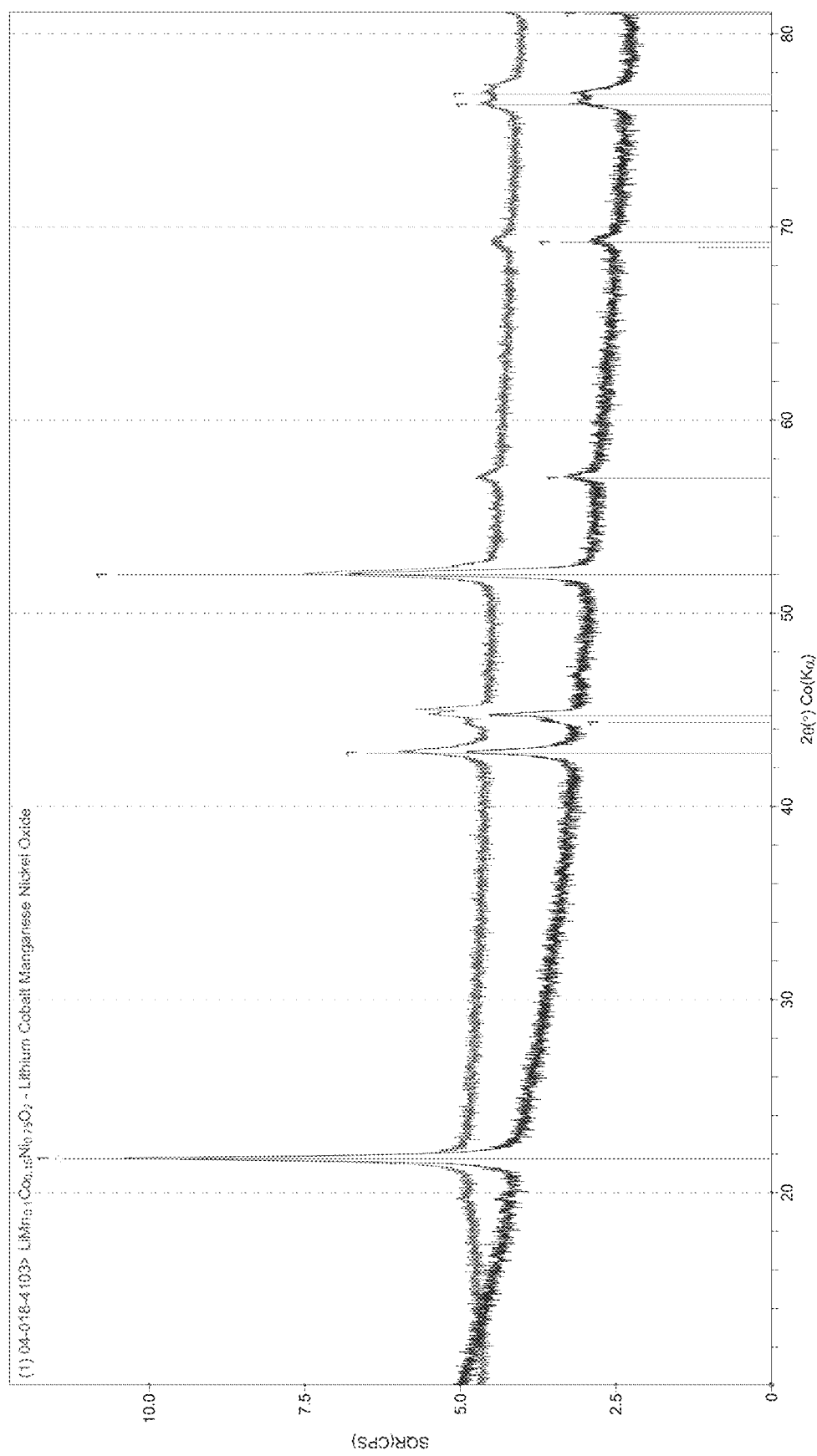
Figure 21A:
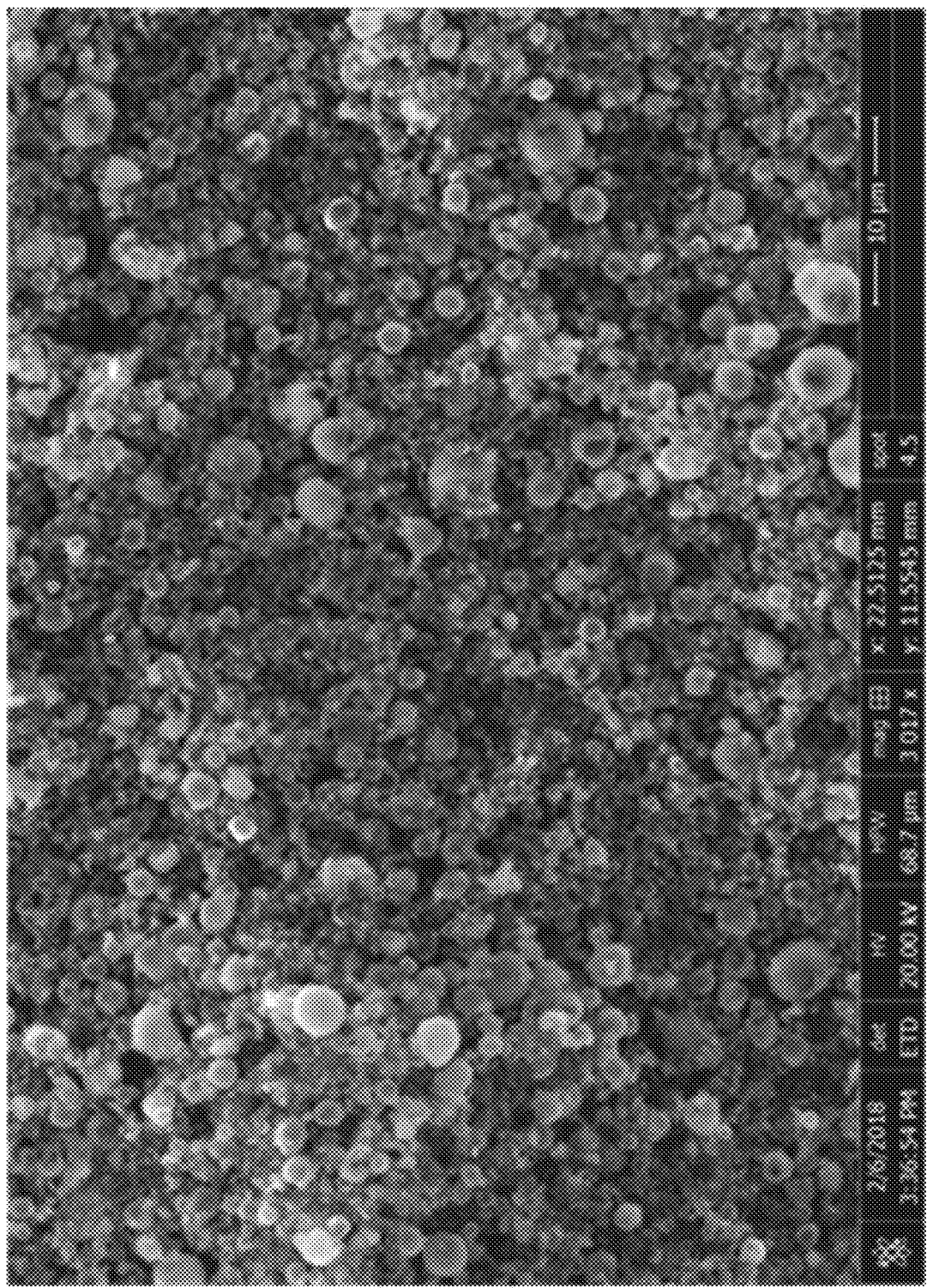
FIGS. 21A and 21B are post-cycling SEM images of the fluidized NMC powder of FIG. 20B.
Figure 21B:
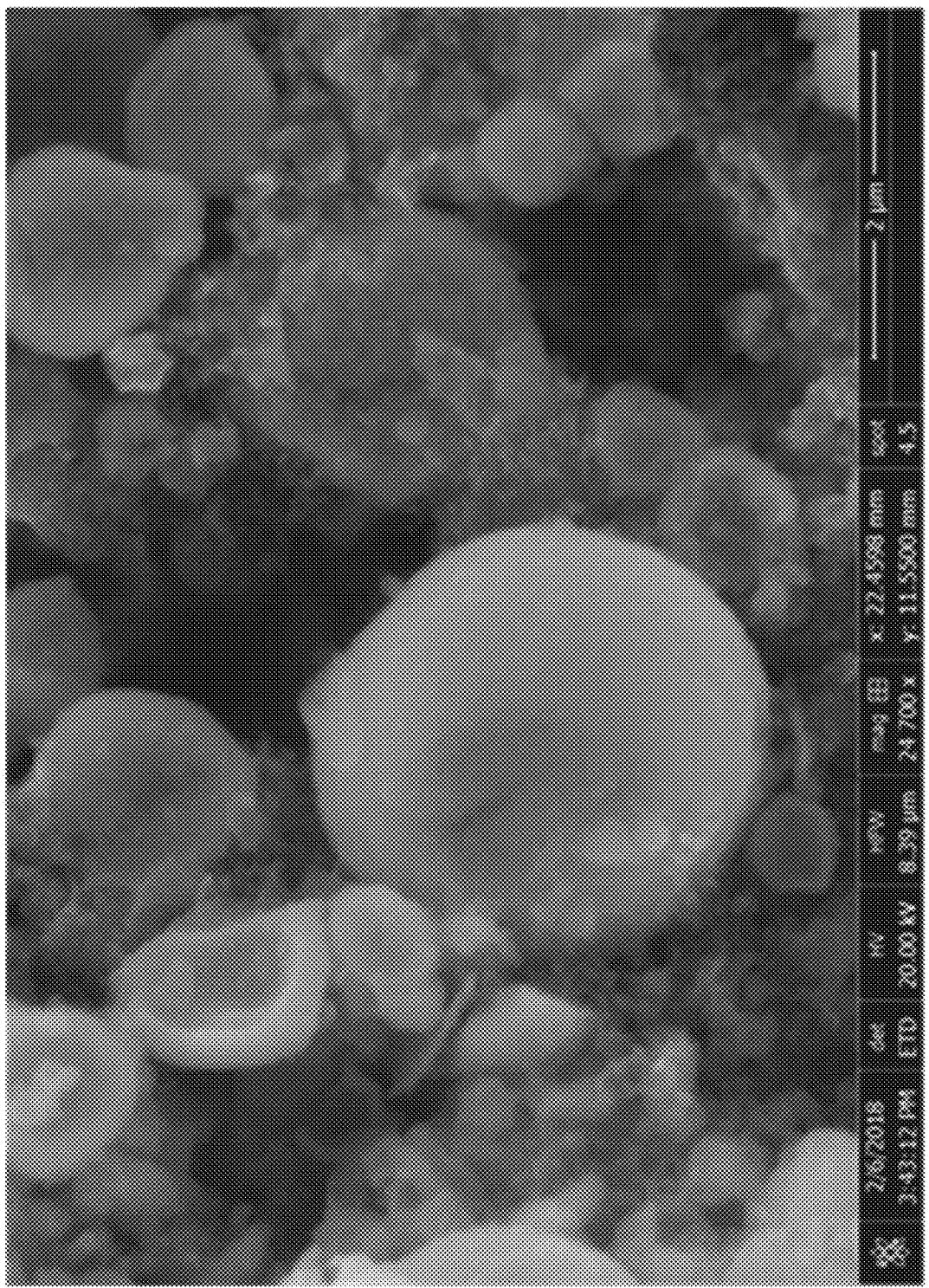
Figure 21C:
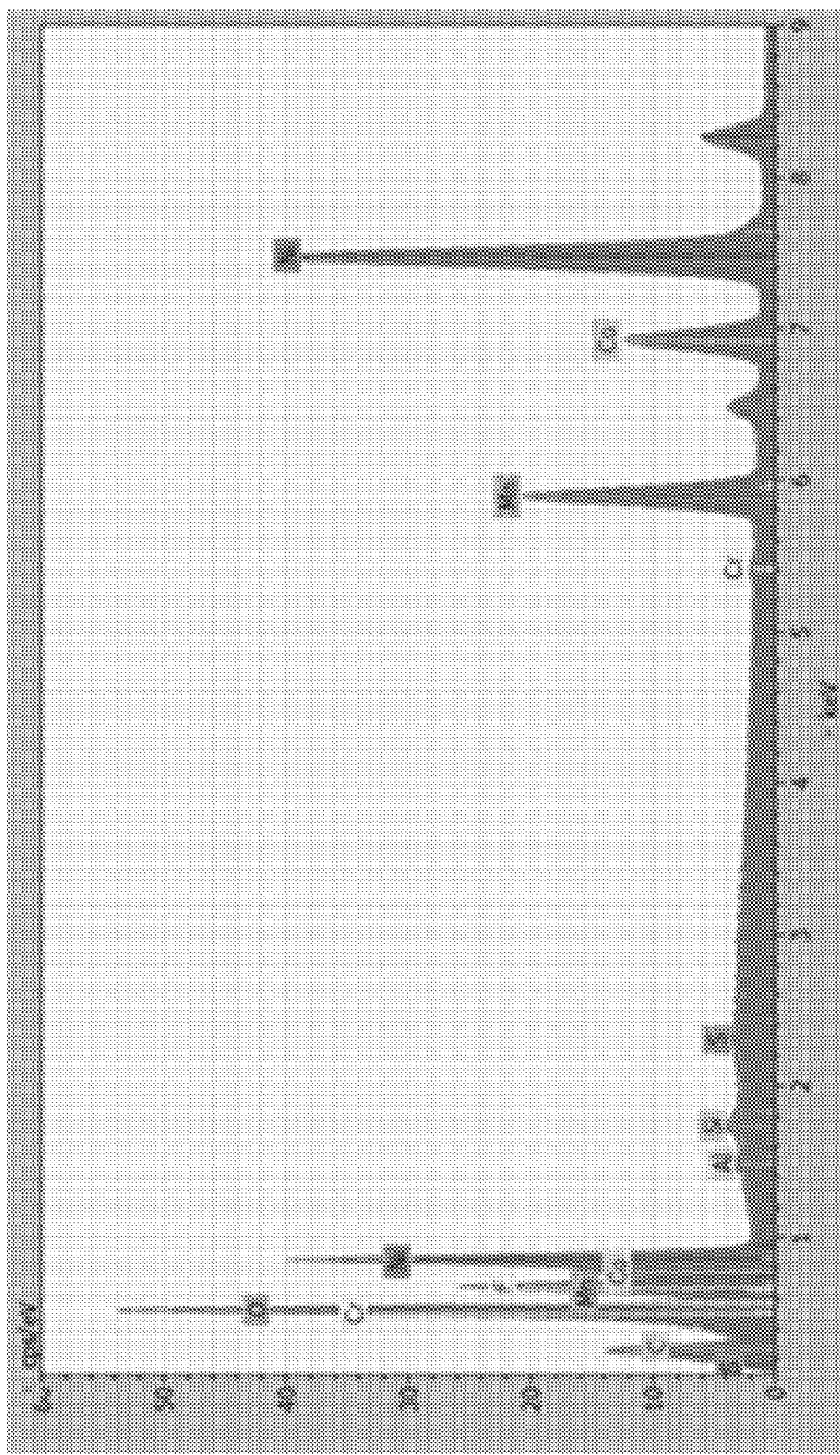
FIG. 21C illustrates post-cycling energy-dispersive X-ray spectroscopy (EDS) of the fluidized NMC powder of FIG. 20B.
Figure 22A:
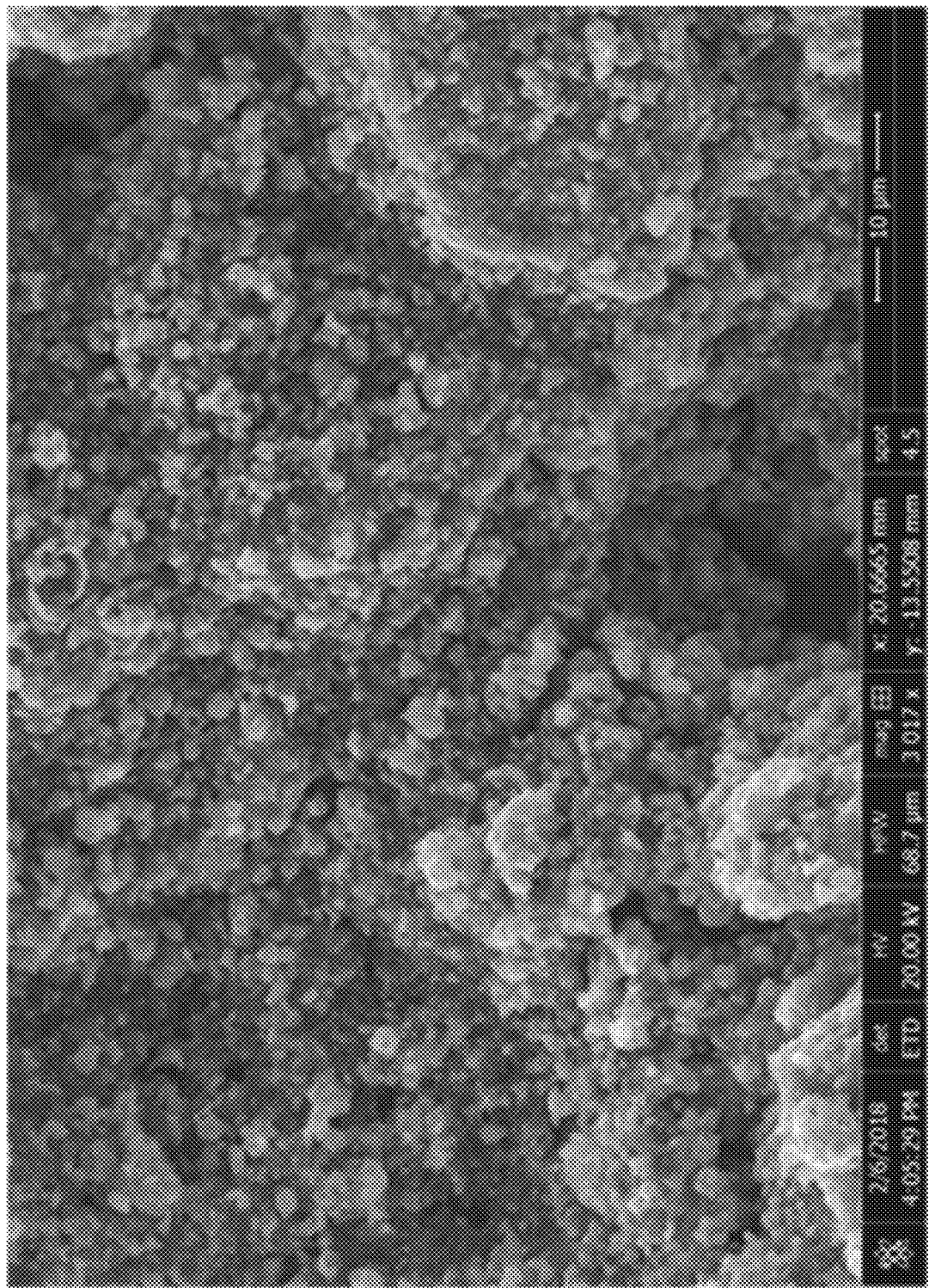
FIGS. 22A and 22B are post-cycling SEM images of the fluidized NMC powder of FIG. 20C.
Figure 22B:
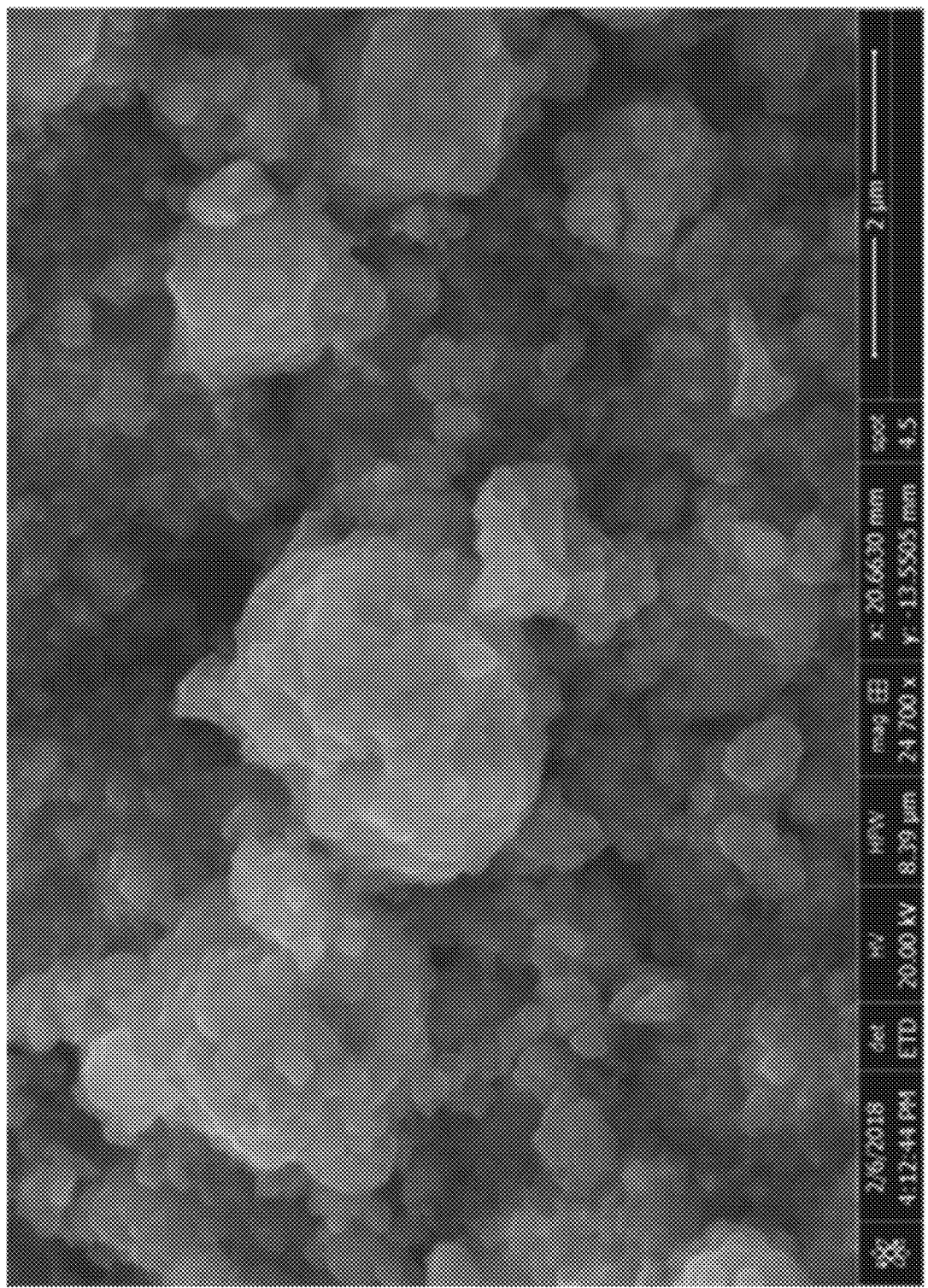
Figure 22C:
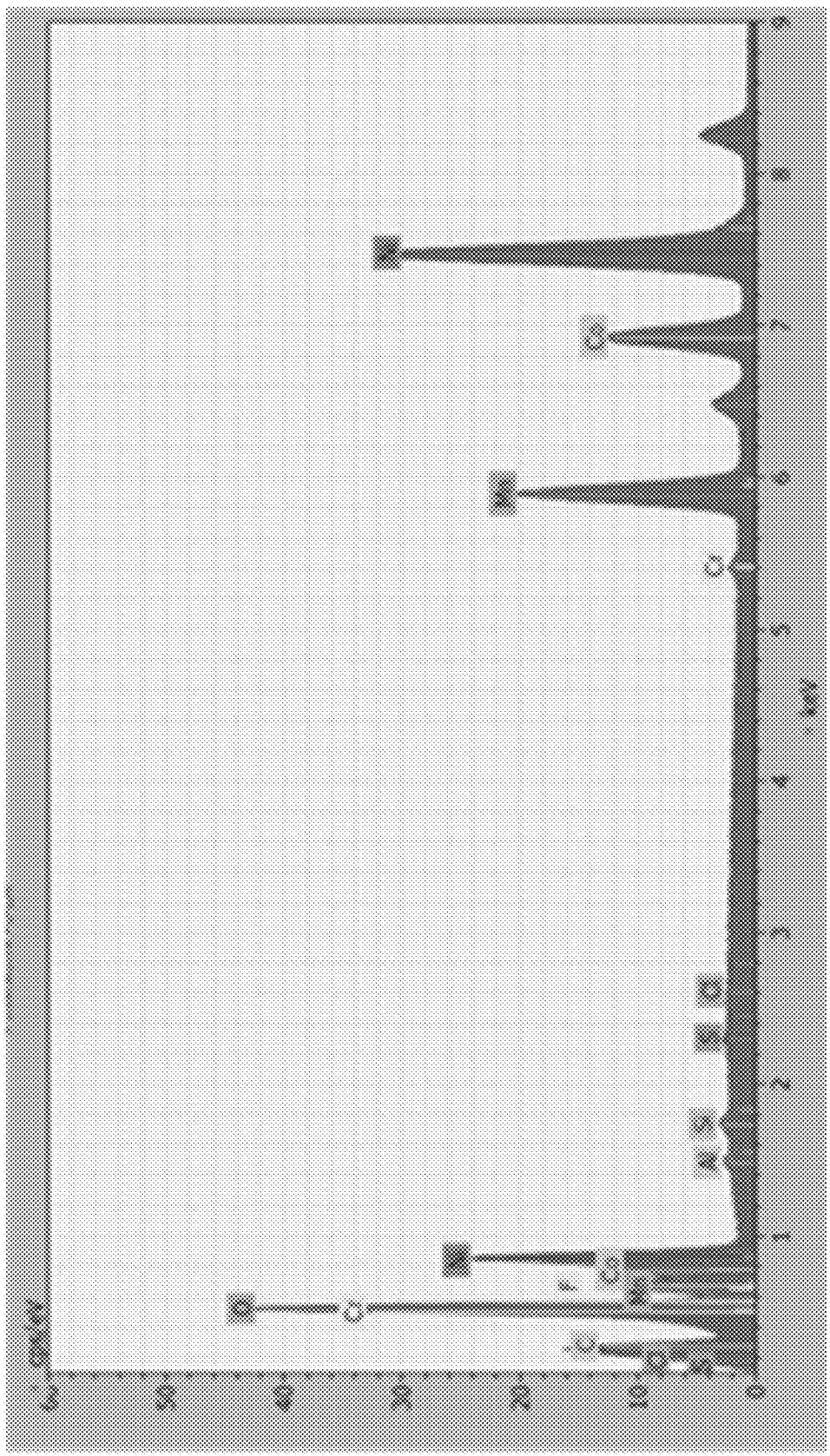
FIG. 22C illustrates post-cycling EDS of the fluidized NMC powder of FIG. 20C.

After cycling in the tests of Examples 6 and 7, XRD and SEM analyses of the NMC powders were undertaken. FIGS. 20A, 20B, and 20C compare the XRD patterns of the fresh powder (top curve) and powder after cycling (bottom curve) for the powders derived from precursors PRS010, PRS017, and PRS020, respectively. FIGS. 21A, 21B, 22A, and 22B are post-cycling SEM images of the powders derived from precursors PRS017 (FIGS. 21A, 21B) and PRS020 (FIGS. 22A, 22B). FIGS. 21C and 22C are post-cycling energy-dispersive spectroscopy of the powders derived from precursors PRS017 (FIG. 21C) and PRS020 (FIG. 22C).

As illustrated in FIGS. 20A through 22C, after cycling, the cathode powders retained the same hexagonal structure, but the crystallinity level was affected. Particles of the PRS017-based powder appeared more spherical than particles of the PRS020-based powder. The presence of fluoride in the EDS of the powders derived from PRS017 (FIG. 21C) suggests evidence for either fluoride doping or formation of a fluoride-rich surface layer, both of which are known to improve cathode performance.

Example 9

Spray Pyrolysis in Oxygen Gas ($O_2$) and Oxygen Gas Fluidized Bed Reactor Equipment Setup An aerosol of the precursor materials in oxygen gas ($O_2$) was generated via an ultrasonic nozzle (Spraying Systems Co., Model USN-3-316 VFU); the precursor material particles generally had a particle size of at least about 10 The solution of the precursor materials in the nebulizer jar was maintained at a constant level during the operation using a peristaltic pump to meter solution in a timed sequence. The aerosol stream was directed through a 100 mm diameter, preheated (500-750° C.), 760 mm long Inconel tube held vertically over a 110 mm diameter filter. The pyrolyzed particles were collected onto a Whatman grade 41 filter paper held within a Pyrex filter holder. The pressure drop across the filter was manually controlled by a vacuum pump to maintain zero pressure on the nebulizer jar. The particles produced from the spray pyrolysis were submicron in size and thus tended to follow the oxygen gas stream regardless of the gas velocity. The gases and solids were separated by filtration.

The fluidized bed reactor was constructed from Inconel 600 to resist oxidation and the formation of corrosion products that might contaminate the bed product; the inventors initially found that fluidized bed reactors made of quartz tended to become etched when reacting powders produced from manganese TFA-containing precursors. A porous, 25 mm stainless steel disk was welded into a 1 in. pipe to support the bed of material. About 440 cm³/min of $O_2$ gas was purged through the disk to provide the fluidization gas and maintain an oxidizing environment. The inventors found that the submicron-size particles had a natural tendency to agglomerate into larger particles. A pneumatic vibrator was attached to the bottom of the reactor to maintain bed movement during the heating cycle. In this Example, the spray pyrolysis and fluidized bed reaction were carried out separately, but it is expressly contemplated that the two systems can be operated simultaneously and can be configured for continuous operation, for example vertically.

Example 10

Spray Pyrolysis of Precursors

Spray pyrolysis of precursor PRS020 listed in Table 3 was conducted using the equipment setup described in Example 9. The spray-pyrolyzed powders consisted of very fine, amorphous or poorly crystallized NMC particles. Inductively coupled plasma analyses of the powders showed stoichiometries consistent with those of the starting precursor solutions.

Example 11

Oxygen Gas (O$_2$) Fluidized Bed Reaction of Spray-Pyrolyzed Powders

The spray-pyrolyzed NMC powder made in Example 10 were advanced to the fluidized bed reactor setup described in Example 9. The powder was screened by a 70 US mesh screen before introduction to the fluidized bed reactor. As in Example 5, the powders were ramped to 875° C. at 2.5° C./min, held at 875° C. for 5 hours, and cooled down at 2.5° C./min.

Figure 23:
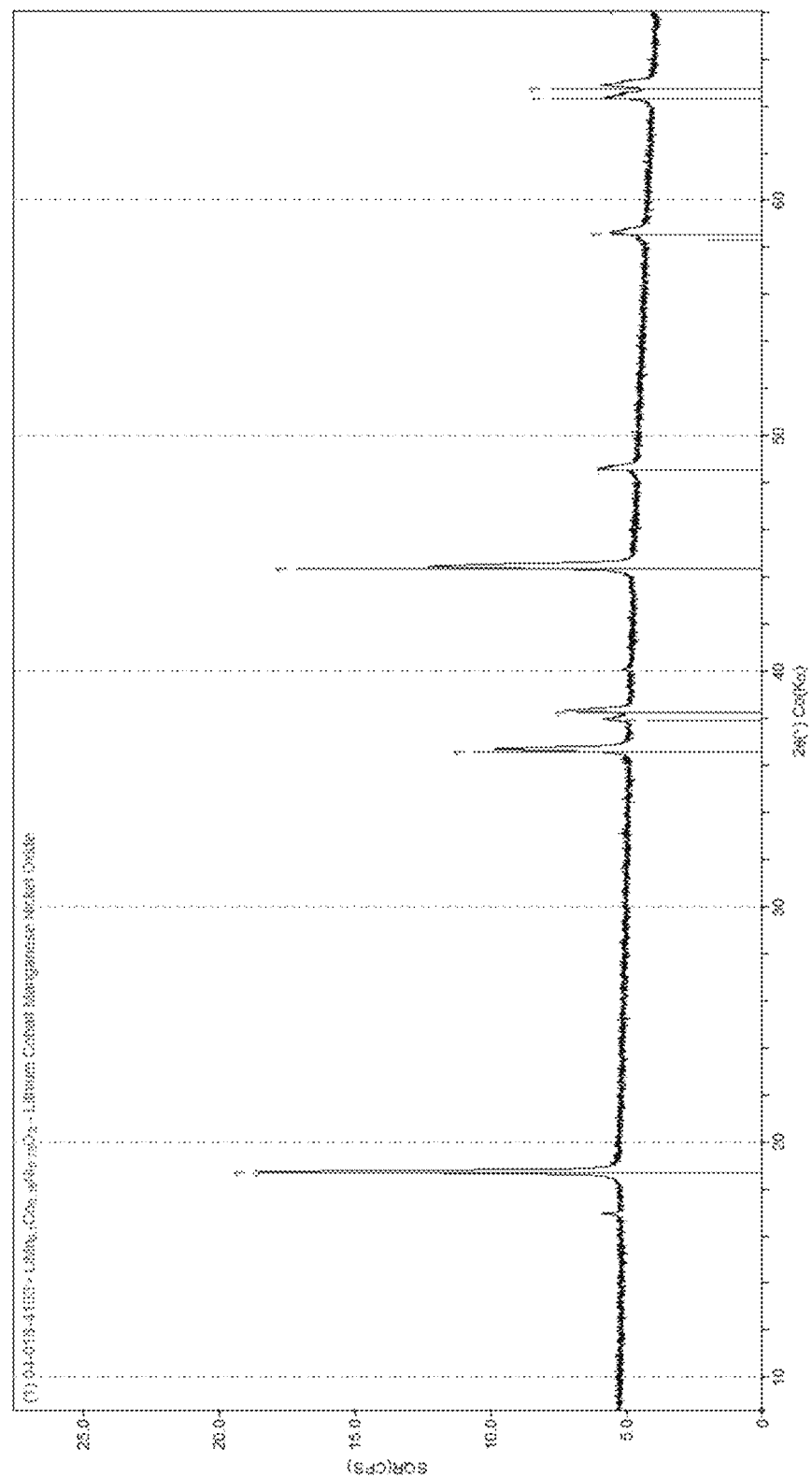
FIG. 23 illustrates the XRD patterns of an NMC powder spray-pyrolyzed in oxygen gas ($O_2$) using an ultrasonic nebulizer and after reaction in a fluidized bed under oxygen gas ($O_2$), according to embodiments of the present invention.
Figure 24A:
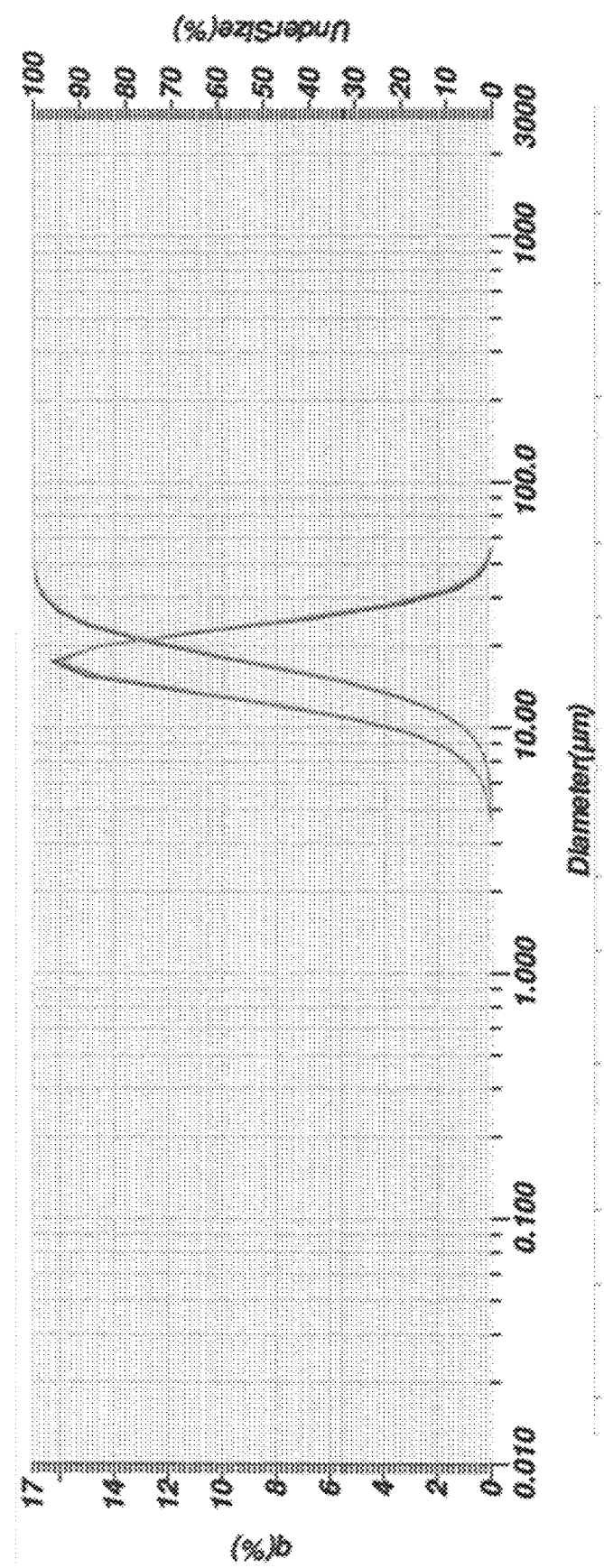
FIGS. 24A and 24B are particle size distributions of a second NMC powder spray-pyrolyzed in oxygen gas ($O_2$) using an ultrasonic nebulizer, before reaction in a fluidized bed and after reaction in a fluidized bed under oxygen gas ($O_2$), respectively, according to embodiments of the present invention.
Figure 24B:
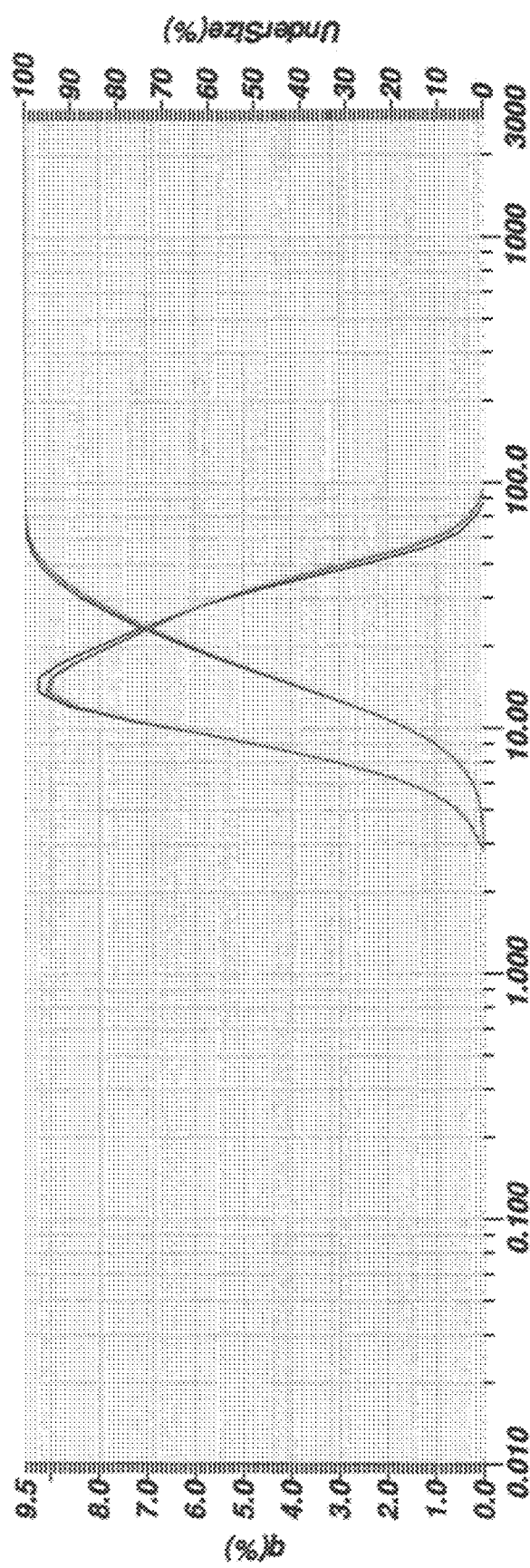

FIG. 23 illustrates the XRD patterns of the powder made from precursor PRS020 after the fluidized bed. FIGS. 24A and 24B are particle size distributions of the powder made from precursor PRS020 before the fluidized bed and after the fluidized bed.

Comparison of the XRD pattern of FIG. 23 against the PRS020 XRD pattern of FIG. 7 illustrates at least one significant difference: the doublet peak at a 20 value between 70° and 80° is clearer and better-defined. Likewise, comparison of the particle size distribution of FIGS. 24A and 24B against the particle size distribution of FIGS. 9A, 9B, and 9C reveals a larger average particle size and a larger proportion of particles having a particle size of at least about 10 μm. Without wishing to be bound by any particular theory, the present inventors hypothesize that spray-pyrolyzing the NMC powders of the invention in oxygen gas (O$_2$) rather than air, and/or using oxygen gas (O$_2$) rather than air as the fluidizing gas in the fluidized bed reactor, can result in a clearer and better-defined doublet peak in the XRD pattern and, on average, a larger particle size, which may at least partially explain the performance differences observed in the following Examples.

Example 12

Preparation and Characterization of Electrodes in Half Coin Cells

Cathode layers were prepared by mixing 90 wt % of the NMC powders made from precursor PRS020 with 5 wt % carbon black and 5 wt % of a solution of polyvinylidene fluoride in N-methyl-2-pyrrolidone. The active material loading on the cathode was about 4.5 mg/cm$^2$. This slurry was spread onto aluminum foil and dried in a vacuum oven at 90° C. for about 8 hours, whereupon the electrodes were formed and dried in the vacuum oven at 90° C. for about a further 8 hours.

Half-cells were assembled using the NMC cathodes and lithium metal anodes in an argon-filled glovebox at room temperature. The electrolyte was a 1 M solution of lithium hexafluorophosphate in a mixture (3:7 by weight) of ethylene carbonate and ethyl-methyl carbonate. A porous polypropylene/polyethylene-porous polypropylene trilayer film (Celgard 2325) was used as the separator. Galvanostatic charge-discharge cycling was performed at room temperature at a voltage of about 4.5 V.

Figure 25A:
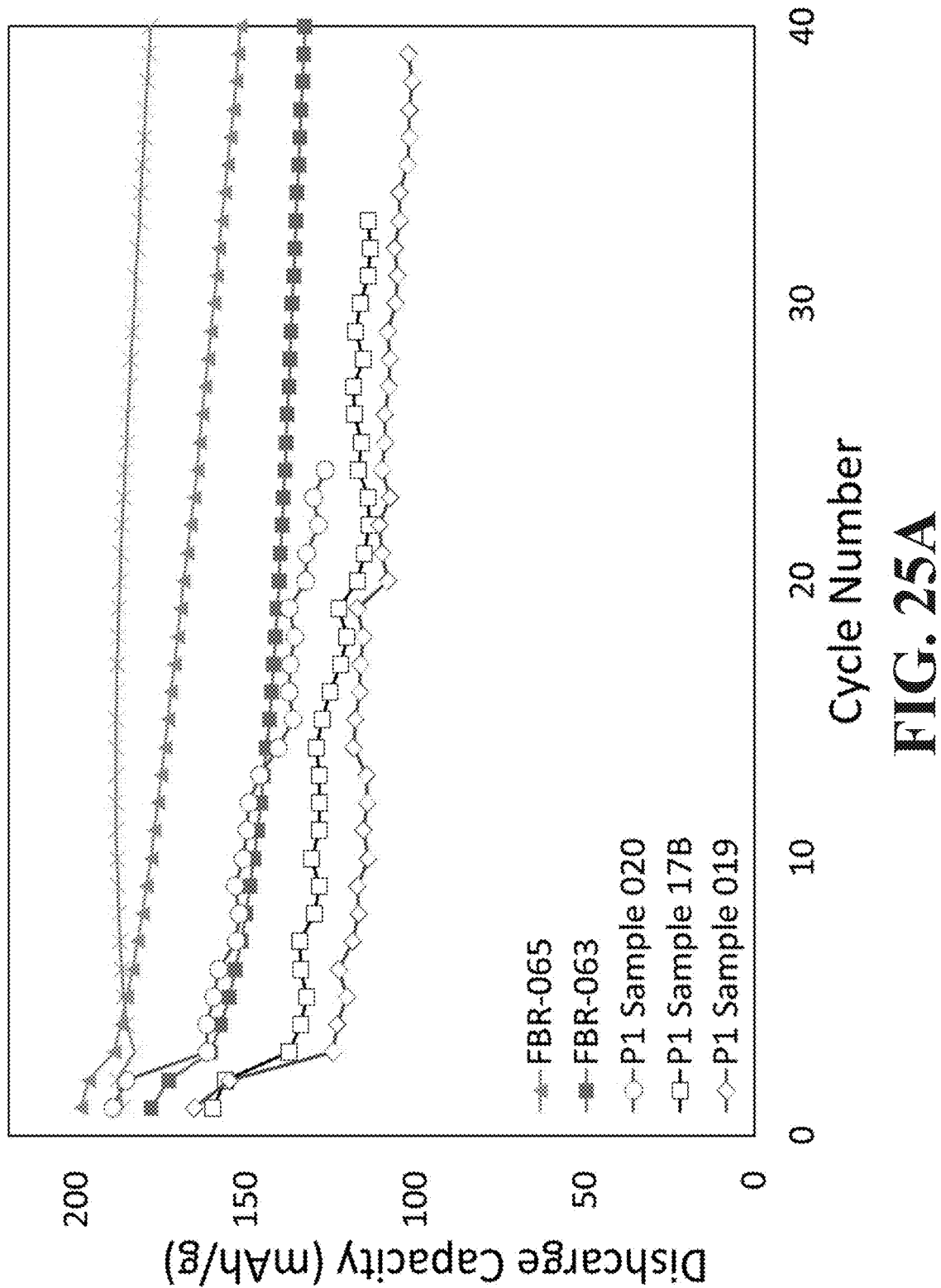
FIGS. 25A and 25B are graphs of the capacity stability and coulombic efficiency of half-cells derived from fluidized NMC powders spray-pyrolyzed in oxygen gas ($O_2$) using an ultrasonic nebulizer and subjected to fluidized bed reaction under oxygen gas ($O_2$), according to the present invention.

FIG. 25A illustrates the stability of discharge capacity over 40 cycles of half-cells derived from precursor PRS020; several identical cells for each precursor were subjected to the cycling stability tests. As illustrated in FIG. 23A, relative to the cathodes tested in Examples 6 and 7 (labeled as "P1 sample 17B," "P1 sample 019," and "P1 sample 020" in FIG. 23A), the cathodes prepared according to this Example (labeled as "FBR-063" and "FBR-065") showed broadly improved performance characteristics. The initial specific capacity for FBR-065 cathodes was 189 mAh/g, which is comparable to or even slightly greater than commercial NMC 532 materials (not labeled in the legend, but illustrated by X symbols), which were tested as a control.

Figure 25B:
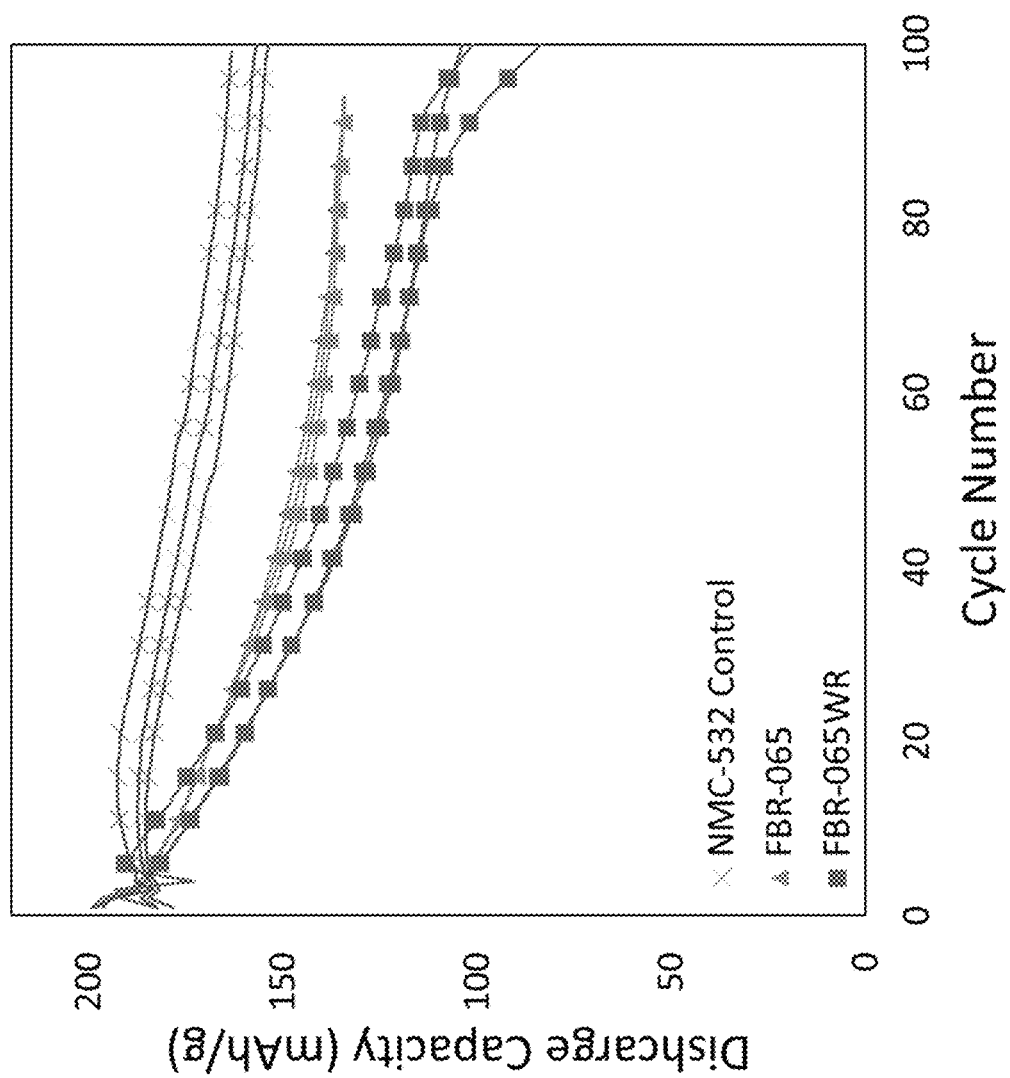

FIG. 25B illustrates the stability of discharge capacity over 100 cycles of half-cells including FBR-065 and FBR-065WR cathodes; three cathodes of each type (as well as three cathodes of the NMC 532 control) were subjected to the cycling stability tests at room temperature at a voltage of about 4.5 V. Cathodes labeled FBR-065WR were made from a powder that was washed with water to remove excess lithium and subjected to additional heating in a muffle furnace as described in Example 4, while cathodes labeled "FBR-065" were made from a powder that was not subjected to this additional processing. As illustrated in FIG. 23B, the initial specific discharge capacities, as measured after three cycles of FBR-065 (average 189.1 mAh/g) and FBR-065WR (average 186.9 mAh/g), were similar to or slightly higher than that of the NMC 532 control (average 182.9 mAh/g). Capacity retention values for each of the three types of electrode are shown in Table 4.

TABLE 4

Capacity retention values of electrodes from O$_2$-pyrolyzed powders

| Cathode material | Initial capacity (mAh/g) | Capacity loss after... | | |
|---|---|---|---|---|
| | | 17 cycles | 40 cycles | 80 cycles |
| FBR-065 | 189.1 | 9.4% | 19.8% | 27.7% |
| FBR-065WR | 186.9 | 11.7% | 25.7% | 39.1% |
| NMC 532 (control) | 182.9 | <1% | 2.6% | 11.1% |

The invention illustratively disclosed herein suitably may be practiced in the absence of any element which is not specifically disclosed herein. It is apparent to those skilled in the art, however, that many changes, variations, modifications, other uses, and applications of the invention are possible, and also changes, variations, modifications, other uses, and applications which do not depart from the spirit and scope of the invention are deemed to be covered by the invention, which is limited only by the claims which follow.

The foregoing discussion of the invention has been presented for purposes of illustration and description. The foregoing is not intended to limit the invention to the form or forms disclosed herein. In the foregoing Detailed Description of the Invention, for example, various features of the invention are grouped together in one or more embodiments for the purpose of streamlining the disclosure. The features of the embodiments of the invention may be combined in alternate embodiments other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description of the Invention, with each claim standing on its own as a separate preferred embodiment of the invention.

Moreover, though the description of the invention has included description of one or more embodiments and certain variations and modifications, other variations, combinations, and modifications are within the scope of the invention, e.g. as may be within the skill and knowledge of those in the art, after understanding the present disclosure. It is intended to obtain rights which include alternative embodiments to the extent permitted, including alternate, interchangeable, and/or equivalent structures, functions, ranges, or steps to those claimed, whether or not such alternate, interchangeable, and/or equivalent structures, functions, ranges, or steps are disclosed herein, and without intending to publicly dedicate any patentable subject matter.

The invention claimed is:

1. A method for synthesizing a lithium-nickel-manganese-cobalt oxide (NMC) powder having a layered structure, comprising:
   (a) spray-pyrolyzing a liquid mixture comprising at least one lithium salt, at least one nickel salt, at least one manganese salt, and at least one cobalt salt at a temperature of less than about 750° C. to form an amorphous NMC powder comprising oxides of lithium, nickel, manganese, and cobalt, wherein a ratio of a molar concentration of lithium in the mixture to a combined molar concentration of nickel, manganese, and cobalt in the mixture is between about 0.9 and about 1.1; and
   (b) reacting the amorphous NMC powder in a fluidized bed reactor at a temperature of less than about 1,000° C. to crystallize the NMC powder.

2. The method of claim 1, wherein a concentration of nickel in a primary particle of the NMC powder decreases with increasing distance from a center of the primary particle and a concentration of manganese in the primary particle increases with increasing distance from the center of the primary particle.

3. The method of claim 2, wherein the NMC powder comprises a substantially spherical secondary particle having a surface texture composed of primary particles.

4. The method of claim 1, wherein the liquid mixture comprises at least one inorganic salt and at least one metalorganic salt.

5. The method of claim 1, wherein a molar concentration of manganese in the mixture and a molar concentration of cobalt in the mixture are approximately equal, and wherein a ratio of a molar concentration of nickel in the mixture to the sum of the molar concentrations of manganese and cobalt in the mixture is between about 0.5 and about 4.

6. The method of claim 1, wherein the mixture of salts is defined by at least one condition selected from the group consisting of:
   (i) the at least one lithium salt comprises at least one selected from the group consisting of lithium carboxylate, fluorinated lithium carboxylate, lithium nitrate, and another water-soluble lithium salt;
   (ii) the at least one nickel salt comprises at least one selected from the group consisting of nickel carboxylate, fluorinated nickel carboxylate, nickel nitrate, and another water-soluble nickel salt;
   (iii) the at least one manganese salt comprises at least one selected from the group consisting of manganese carboxylate, fluorinated manganese carboxylate, manganese nitrate, manganese propionate, manganese trifluoroacetate, and another water-soluble manganese salt; and
   (iv) the at least one cobalt salt comprises at least one selected from the group consisting of cobalt carboxylate, fluorinated cobalt carboxylate, cobalt nitrate, and another water-soluble cobalt salt.

7. The method of claim 6, wherein the at least one lithium salt comprises at least one of lithium acetate and lithium nitrate, the at least one nickel salt comprises nickel nitrate, the at least one manganese salt comprises at least one of manganese acetate and manganese trifluoroacetate, and the at least one cobalt salt comprises cobalt nitrate.

8. The method of claim 1, wherein the temperature in step (a) is at least about 500° C.

9. The method of claim 1, wherein the temperature in step (b) is about 875° C.

10. The method of claim 1, wherein step (b) is conducted for no more than about five hours.

11. The method of claim 1, wherein at least one of steps (a) and (b) is carried out under an atmosphere comprising at least one gas selected from the group consisting of air, oxygen gas ($O_2$), and combinations and mixtures thereof.

* * * * *